(12) United States Patent
Kondo

(10) Patent No.: US 10,715,800 B2
(45) Date of Patent: Jul. 14, 2020

(54) IMAGE PROCESSING APPARATUS AND IMAGE PROCESSING METHOD

(71) Applicant: SONY CORPORATION, Tokyo (JP)

(72) Inventor: Kenji Kondo, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/325,303

(22) PCT Filed: Sep. 1, 2017

(86) PCT No.: PCT/JP2017/031541
§ 371 (c)(1),
(2) Date: Feb. 13, 2019

(87) PCT Pub. No.: WO2018/051811
PCT Pub. Date: Mar. 22, 2018

(65) Prior Publication Data
US 2019/0208197 A1    Jul. 4, 2019

(30) Foreign Application Priority Data

Sep. 16, 2016 (JP) .................................. 2016-181492

(51) Int. Cl.
*H04N 19/107* (2014.01)
*H04N 19/186* (2014.01)
(Continued)

(52) U.S. Cl.
CPC ........... *H04N 19/107* (2014.11); *H04N 19/13* (2014.11); *H04N 19/139* (2014.11);
(Continued)

(58) Field of Classification Search
CPC .... H04N 19/70; H04N 19/176; H04N 19/186; H04N 19/159; H04N 19/52; H04N 19/61;
(Continued)

(56) References Cited

U.S. PATENT DOCUMENTS

2016/0100189 A1    4/2016 Pang et al.
2016/0227245 A1*   8/2016 Liu ........................ H04N 19/52
2016/0241868 A1    8/2016 Li et al.

FOREIGN PATENT DOCUMENTS

EP          2685724 A2    1/2014
WO    WO 2009/001864 A1   12/2008
(Continued)

OTHER PUBLICATIONS

Jun. 6, 2019, European Search Report issued for related EP Application No. 17850714.1.

(Continued)

*Primary Examiner* — Obafemi O Sosanya
(74) *Attorney, Agent, or Firm* — Paratus Law Group, PLLC

(57) ABSTRACT

The present disclosure relates to an image processing apparatus and an image processing method each of which causes an encoding efficiency of information indicating a prediction mode of a color component in the case where a prediction mode of a luminance component of an image is an intra BC prediction mode to be enhanced. In the case where a prediction mode of a luminance component of an image is an intra BC prediction mode, an encoding section encodes prediction mode information indicating a prediction mode of a color component of the image by using, as a context, that the prediction mode of the luminance component of the image is the intra BC prediction mode. The present disclosure, for example, can be applied to an image encoding apparatus or the like.

16 Claims, 36 Drawing Sheets

(51) Int. Cl.
    *H04N 19/139*    (2014.01)
    *H04N 19/463*    (2014.01)
    *H04N 19/593*    (2014.01)
    *H04N 19/13*     (2014.01)
    *H04N 19/52*     (2014.01)
    *H04N 19/70*     (2014.01)
    *H04N 19/159*    (2014.01)
    *H04N 19/176*    (2014.01)

(52) U.S. Cl.
    CPC ......... *H04N 19/159* (2014.11); *H04N 19/176* (2014.11); *H04N 19/186* (2014.11); *H04N 19/463* (2014.11); *H04N 19/52* (2014.11); *H04N 19/593* (2014.11); *H04N 19/70* (2014.11)

(58) Field of Classification Search
    CPC .... H04N 19/593; H04N 19/51; H04N 19/513; H04N 19/107
    See application file for complete search history.

(56) References Cited

FOREIGN PATENT DOCUMENTS

WO    WO 2013/116081 A2    8/2013
WO    WO 2016/029144 A1    2/2016

OTHER PUBLICATIONS

Dai et al., Improved Signaling and Binarization of Chroma Intra Prediction Mode, Joint Collaborative Team on Video Coding (JCT-VC) of ITU-T SG16 WP3 and ISO/IEC JTC1/SC29/WG11, Jan. 20-28, 2011, pp. 1-5, 4th Meeting: Daegu, KR.

Zhang et al., Rotate Intra Block Copy for Still Image Coding, IEEE International Conference on Image Processing (ICIP), Sep. 2015, pp. 1-5, IEEE.

\* cited by examiner

IMAGE PROCESSING APPARATUS AND IMAGE PROCESSING METHOD

CROSS REFERENCE TO PRIOR APPLICATION

This application is a National Stage Patent Application of PCT International Patent Application No. PCT/JP2017/031541 (filed on Sep. 1, 2017) under 35 U.S.C. § 371, which claims priority to Japanese Patent Application No. 2016-181492 (filed on Sep. 16, 2016), which are all hereby incorporated by reference in their entirety.

TECHNICAL FIELD

The present disclosure relates to an image processing apparatus and an image processing method, and more particularly to an image processing apparatus and an image processing method each of which enables an encoding efficiency of information indicating a prediction mode of color components in the case where a prediction mode of a luminance component of an image is an intra BC prediction mode to be enhanced.

An encoding apparatus for performing encoding with HEVC (High Efficiency Video Coding) executes prediction processing with either an intra prediction mode or an inter prediction mode for a current block as a block of an encoding target, and generates a prediction block as a prediction image of the current block. Then, the encoding apparatus subjects a prediction residue as a difference between the prediction block and the current block to the orthogonal transformation, and performs quantization, thereby generating an encoded stream.

The encoded stream generated in such a manner is subjected to inverse quantization and inverse orthogonal transformation in a decoding apparatus. Then, the resulting prediction residue is added to the prediction block to generate a decoded image of the current block.

HEVC (High Efficiency Video Coding) version 1 adopts a mode called DC intra prediction, Planar intra prediction, and Angular intra prediction as a prediction mode in an intra prediction mode.

In addition, in HEVC-SCC (Screen Content Coding), Intra BC (Intra block copy) prediction mode in which the prediction block is generated by, like the inter prediction mode, referring to an encoded area within a screen image can also be used as one of intra prediction mode system prediction modes.

However, in the prediction processing of the intra BC prediction mode of HEVC-SCC, only parallel movement is performed for the encoded area within the screen image, thereby generating the prediction block. Therefore, it may be impossible to sufficiently enhance the accuracy of the prediction block.

Then, in the prediction processing in the intra BC prediction mode, it is devised that not only the parallel movement, but also the rotation is performed for the encoded area within the screen image, thereby generating the prediction block (for example, refer to NPL 1). In this case, not only the motion vector representing a direction and magnitude of the parallel movement, but also the rotational angle is included in the encoded stream.

On the other hand, a JVET (Joint Video Exploration Team) which explores next-generation video encoding of an ITU-T (International Telecommunication Union Telecommunication Standardization Sector) proposes that in I slice, a structure and encoding of CU of a luminance component (Luma) and a color component (Chroma) are controlled independently of each other.

CITATION LIST

Non Patent Literature

NPL 1
Z. Zhang, V. Sze, "Rotate Intra Block Copy for Still Image Coding," IEEE International Conference on Image Processing (IGIP), September 2015

SUMMARY

Technical Problem

In the case where the structure and the encoding of a CU of the luminance component and the color component are controlled independently of each other, not only the information indicating the prediction mode of the luminance component, but also the information indicating the prediction mode of the color component need to be included in the encoded stream. Therefore, it is desirable to efficiently encode the information indicating the prediction mode of the color component.

The present disclosure has been made in the light of such a situation, and enables an encoding efficiency of information indicating a prediction mode of a color component in the case where a prediction mode of a luminance component of an image is an intra BC prediction mode to be enhanced.

Solution to Problem

An image processing apparatus of a first aspect of the present disclosure is an image processing apparatus provided with an encoding section, in a case where a prediction mode of a luminance component of an image is an intra BC prediction mode, encoding information indicating a prediction mode of a color component of the image by using, as a context, that the prediction mode of the luminance component is the intra BC prediction mode.

An image processing method of the first aspect of the present disclosure corresponds to the image processing apparatus of the first aspect of the present disclosure.

In the first aspect of the present disclosure, in the case where the prediction mode of the luminance component of the image is the intra BC prediction mode, by using, as the context, that the prediction mode of the luminance component is the intra BC prediction mode, the information indicating the prediction mode of the color component of the image is encoded.

An image processing apparatus of a second aspect of the present disclosure is an image processing apparatus provided with a decoding section, in a case where a prediction, mode of a luminance component of an image is an intra BC prediction mode, decoding the information indicating a prediction mode of a color component of the image by using, as a context, that the prediction mode of the luminance component is the intra BC prediction mode.

An image processing method of the second aspect of the present disclosure corresponds to the image processing apparatus of the second aspect of the present disclosure.

In the second aspect of the present disclosure, in the case where the prediction mode of the luminance component of the image is the intra BC prediction mode, by using, as the context, that the prediction mode of the luminance component is the intra BC prediction mode, the information indicating the prediction mode of the color component of the image is decoded.

It should be noted that the image processing apparatus of each of the first aspect and the second aspect can be realized by causing a computer to execute a program.

For the purpose of realizing the image processing apparatus of each of the first aspect and the second aspect, the program which is caused to be executed by the computer can be provided by being transmitted through a transmission medium, or by being recorded in a recording medium.

Advantageous Effects

According to the first aspect of the present disclosure, the encoding can be performed in addition, according to the first aspect of the present disclosure, the encoding efficiency of the information indicating the prediction mode of the color component in the case where the prediction mode of the luminance component of the image is the intra BC prediction mode can be enhanced.

According to the second aspect of the present disclosure, the decoding can be performed. In addition, according to the first aspect of the present disclosure, the information indicating the prediction mode of the color component which is encoded so as to enhance the encoding efficiency in the case where the prediction mode of the luminance component of the image is the intra BC prediction mode can be decoded.

It should be noted that the effects described here are necessarily by no means limited, and any of the effects described in the present disclosure may also be offered.

DESCRIPTION OF EMBODIMENTS

Figure 1:
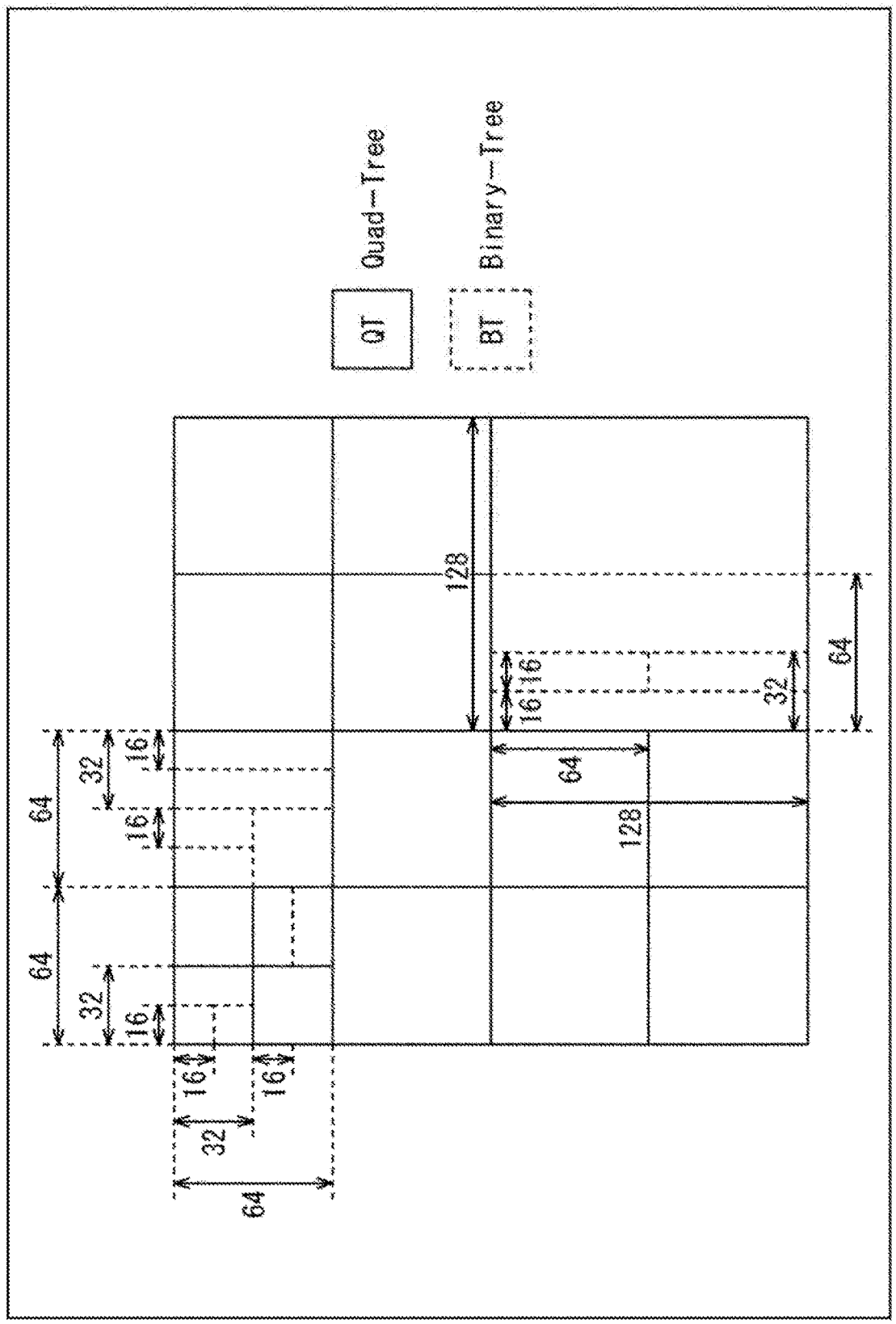
FIG. 1 is a diagram explaining a method of forming a CU.

Hereinafter, a description will be given with respect to modes for carrying out the present disclosure (hereinafter, referred to as embodiments). It should be noted that the description will be given in accordance with the following order.

1. First Embodiment: Image Encoding Apparatus and Image Decoding Apparatus (FIGS. 1 to 27)
2. Second Embodiment: Computer (FIG. 28)
3. Third Embodiment: Television Apparatus (FIG. 29)
4. Fourth Embodiment: Portable Telephone (FIG. 30)
5. Fifth Embodiment: Recording/reproducing Apparatus (FIG. 31)
6. Sixth Embodiment: Imaging Apparatus (FIG. 32)
7. Seventh Embodiment: Video Set (FIGS. 33 to 35)
8. Eighth Embodiment: Network System (FIG. 36)

First Embodiment (Explanation of Method of Forming CU)

In a past image encoding system such as MPEG2 (Moving Picture Experts Group 2 (ISO/IEC 13818-2)) or MPEG-4 Part10 (Advanced Video Coding, hereinafter referred to as AVC), encoding processing is executed in a processing unit called a macro block. The macro block is a block having a uniform size of 16×16 pixels. On the other hand, in the HEVC, the encoding processing is executed in a processing unit (coding unit) called a CU (Coding Unit). The CU is a block which is formed by recursively dividing an LCU (Largest Coding Unit) which is the largest encoding unit, and which has a variable size. The largest size of the selectable CU is 64×64 pixels. The smallest size of the selective CU is 8×8 pixels. A CU having the smallest size is called the a SCU (Smallest Coding Unit). It should be noted that the largest size of the CU is not limited to 64×64 pixels, and may be of the larger block size such as 128×128 pixels, or 256×256 pixels.

In such a manner, the CU having the variable size is adopted, and as a result, in the HEVC, the image quality and the encoding efficiency can be adaptively adjusted in response to the contents of the image. Prediction processing for prediction encoding is executed in a processing unit called a PU (Prediction Unit). The PU is formed by dividing the CU with one of some division patterns. In addition, the PU includes a processing unit called a PB (Prediction Block) for each luminance (Y) and color difference (Cb, Cr). Moreover, orthogonal transformation processing is executed in a processing unit called a TU (Transform Unit). The TU is formed by dividing the CU or the PU to a certain depth. In addition, the TU includes a processing unit (transform block) called a TB (Transform Block) for each luminance (Y) and color difference (Cb, Cr).

In the following, a description will be given by using a "block" as a partial area of an image (picture) or the processing unit in some cases (not a block in a processing section). The "block" in this case indicates an arbitrary partial area within the picture, and a size, a shape, characteristics, and the like thereof are not limited. In a word, an arbitrary partial area (processing unit) such as TB, TU, PB, PU, SCU, CU, LCU (CTB), a sub block, a macro block, a tile, or a slice are included in the "block" in this case.

FIG. 1 is a diagram explaining a method of forming a CU.

The CU in the first embodiment is formed by using a technology called a QTBT (Quad tree plus binary tree) described in JVET-O0024, "EE2.1: Quadtree plus binary tree structure integration with JEM tools."

Specifically, although in the HEVC, one Block is divided into 4 (=2×2) sub blocks, thereby forming the CU, in the first embodiment, one block is divided into 4 (=2×2) sub blocks, or 2 (=1×2, 2×1) sub blocks. That is, in the first embodiment, the division of one block into four or two sub blocks is recursively repeated, thereby forming the CU. As a result, a Quad-Tree shaped or Binary-Tree shaped tree structure is formed. It should be noted that in the first embodiment, each of the PU and the TU is identical to the CU.

(Configuration Example of Image Encoding Apparatus)

Figure 2:
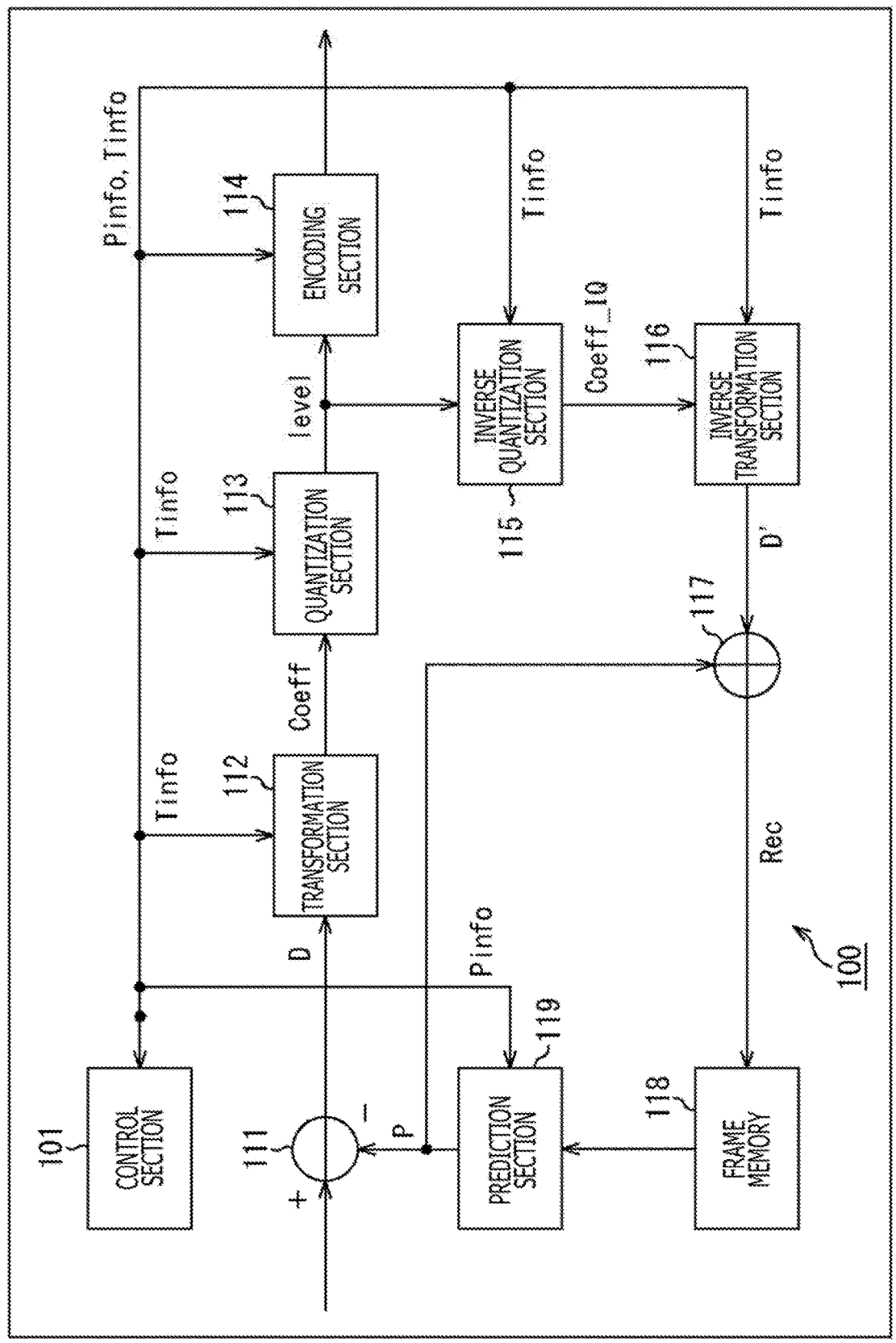
FIG. 2 is a block diagram depicting a configuration example of a first embodiment of an image encoding apparatus.

FIG. 2 is a block diagram depicting a configuration example of the embodiment of an image encoding apparatus as an image processing apparatus to which the present disclosure is applied. An image encoding apparatus 100 of FIG. 2 is an apparatus for encoding a prediction residue between an image and a prediction image thereof like the AVC or HEVC. For example, the image encoding apparatus 100 is implemented with the technology of the HEVC, or the technology proposed in the JVET.

Incidentally, FIG. 2 depicts main constituent elements such as a processing section or a flow of data, and the constituent elements depicted in FIG. 2 are not necessarily all the constituent elements. In a word, in the image encoding apparatus 100, a processing section which is not depicted in the form of a block in FIG. 2 may be present, or processing or flow of data which is not depicted in the form of an arrow or the like in FIG. 2 may be present.

The image encoding apparatus 100 of FIG. 2 has a control section 101, a calculation section 111, a transformation section 112, a quantization section 113, an encoding section 114, an inverse quantization section 115, an inverse transformation section 116, a calculation section 117, a frame memory 118, and a prediction section 119. The image encoding apparatus 100 performs the encoding for a luminance component Y and color components Cb and Cr of a picture as a moving image of YCbCr in a frame unit input for each CU.

Specifically, the control section 101 of the image encoding apparatus 100 sets encoding parameters (header information Hinfo, prediction information Pinfo, transformation information Tinfo, and the like) based on an input from the outside, Rate-Distortion Optimization (RDO) or the like. Incidentally, is the case where a slice including the CU as the encoding target is I slice, the control section 101 sets the prediction information Pinfo and the like for the luminance component Y, and the color component Cb, Cr independently of each other.

The header information Hinfo, for example, includes information such as a Video Parameter Set (VPS), a Sequence Parameter Set (SPS), a Picture Parameter Set (PPS), and a slice header (SH). For example, An SPS.IntraBCflag indicating whether or not the intra BC prediction mode of the luminance component Y is made valid, an SPS, intraBCchromaflag indicating whether or not the intra BC prediction mode of the color difference component is made valid, and the like are included in the SPS of the Header information Hinfo. Needless to say, the contents of the header information Hinfo are arbitrary, and any information other than the example described above may be included in the header information Hinfo.

For example, split flag as information indicating presence or absence of the division in the horizontal direction and in the vertical direction in each of division hierarchy layers at the time of formation of the PU(CU), that is, as information indicating the structure of the PU(CU), prediction mode information indicating the prediction mode of the PU, and the like are included in the prediction information Pinfo. Incidentally, in the case where the prediction mode of the PU of the color component Cr is not a CrossColor prediction mode (details will be described later), the prediction mode of the PU of the color component Cr is identical to the prediction mode of the PU of the color component Cb corresponding to the PU of that color component Cr. Needless to say, the contents of the prediction information Pinfo are arbitrary, and any information other than the example described above may be included in the prediction information Pinfo.

A TB Size TBSize as information indicating a size of the TB, and the like are included in the transformation information Tinfo. Needless to say, the contents of the transformation information Tinfo are arbitrary, and any information other than the example described above may be included in the transformation information Tinfo.

The control section 101 divides, on the basis of the set encoding parameters, the picture input to the image encoding apparatus 100 into the CUs (PU, TU), and sets the CUs (PU, TU) obtained through the division to the CUs (PU, TU) as the encoding target in order. The control section 101 supplies an image I of the CUs (PU, TU) as the encoding target to the calculation section 111.

In addition, the control section 101 supplies the encoding parameter thus set to each of the blocks. For example, the control section 101 supplies the header information Hinfo to each of the blocks. In addition, the control section 101 supplies the prediction information Pinfo to each of the prediction section 119 and the encoding section 114, and supplies the transformation information Tinfo to each of the transformation section 112, the quantization section 113, the inverse quantization section 115, and the inverse transformation section 116.

The calculation section 111 obtains a prediction residue D by subtracting the prediction image P of the PU supplied thereto from the prediction section 119 from the image I, and supplies the prediction residue D to the transformation section 112.

The transformation section 112 subjects the prediction residue D supplied thereto from the calculation section 111 to the orthogonal transformation or the like based on transformation information Tinfo supplied thereto from the control section 101 to derive a transformation coefficient Coeff. The transformation section 112 supplies the transformation coefficient Coeff to the quantization section 113.

The quantization section 113 scales (quantizes) the transformation coefficient Coeff supplied thereto from the transformation section 112 to derive a quantization transformation coefficient level level based on the transformation information Tinfo supplied thereto from the control section 101. The quantization section 113 supplies the quantization transformation coefficient level level to each of the encoding section 114 and the inverse quantization section 115.

The encoding section 114 encodes the quantization transformation coefficient level level or the like supplied thereto from the quantization section 113 by using a predetermined method. For example, the encoding section 114 transforms the encoding parameters (the header information Hinfo, the prediction information Pinfo, the transformation information Tinfo, and the like) supplied thereto from the control section 101 and the quantization transformation coefficient level level supplied thereto from the quantization section 113 into syntax values of the syntax elements along the definition of the syntax table. Then, the encoding section 114 subjects the syntax values to the encoding (the arithmetic encoding such as CABAC (Context-based Adaptive Binary Arithmetic Coding)).

For example, in the case where the prediction mode of the CU of the luminance component Y corresponding to the CU of the color component Cb or Cr as the encoding target is the intra BC prediction mode, the encoding section 114 encodes the syntax value of the prediction mode information of the CU of the color component Cb or Cr as the encoding target by using, as the context, that the prediction mode of the CU of the luminance component Y is the intra BC prediction mode.

The encoding section 114, for example, multiplexes the encoded data as the bit stream of the Syntax values obtained as a result of the encoding, and outputs the multiplexed data as the encoded stream.

The inverse quantization section 115 scales (inverse-quantizes) the value of the quantization transformation coefficient level level supplied thereto from the quantization section 113 based on the transformation information Tinfo supplied thereto from the control section 101 to derive a transformation coefficient Coeff_IQ after the inverse quantization. The inverse quantization section 115 supplies the transformation coefficient Coeff_IQ to the inverse transformation section 116. The inverse quantization performed by the inverse quantization section 115 is inverse processing of the quantization performed by the quantization section 113.

The inverse transformation section 116 subjects the transformation coefficient Coeff_IQ supplied thereto from the inverse quantization section 115 to the inverse orthogonal transformation or the like based on the transformation information Tinfo supplied thereto from the control section 101 to derive a prediction residue D'. The inverse transformation section 116 supplies the prediction residue D' to the calculation section 117. The inverse orthogonal transformation performed by the inverse transformation section 116 is the inverse processing of the orthogonal transformation performed by the transformation section 112, and is the processing similar to the inverse orthogonal transformation which is performed in an image decoding apparatus which will be described later.

The calculation section 117 adds the prediction residue D' supplied thereto from the inverse transformation section 116, and the prediction image P which is supplied thereto from the prediction section 119 and which corresponds to the prediction residue D' to each other to derive a local decoded image Rec. The calculation section 117 supplies the local decoded image Rec to the frame memory 118.

The frame memory 118 rebuilds the decoded image in a picture unit by using the local decoded image Rec supplied thereto from the calculation section 117, and stores the resulting image in a buffer within the frame memory 118. The frame memory 118 reads out the decoded image specified by the prediction section 119 as a reference image from the buffer, and supplies the decoded image to the prediction section 119. In addition, the frame memory 118 may store the header information Hinfo, the prediction information Pinfo, the transformation information Tinfo, and the like pertaining to the prediction of the decoded image in the buffer with the frame memory 118.

The prediction section 119 acquires the decoded image which is stored in the frame memory 118 as the reference image based on the prediction information Pinfo supplied thereto from the control section 101, and executes the prediction processing for the PU as the encoding target by using the reference image. In the case where the PU as the encoding target is the PU of the luminance component Y, the intra prediction processing as the prediction processing for the intra prediction mode, the intra BC prediction processing as the prediction processing for the intra BC prediction mode, or the inter prediction processing as the prediction processing for the inter prediction mode is executed as the prediction processing.

The intra prediction processing means the prediction processing for generating the block as the prediction image P, the block having the decoded PU size which is present in a direction indicated by the prediction mode for the PU within the reference image, with the same component of the same picture as that of the PU as the reference image. The intra BC prediction processing means the prediction processing for parallel-moving the block having the decoded PU size which is located at a distance of a motion vector away from the PU within the reference image to generate the prediction image P, with the same component of the same picture as that of the PU as the reference image. The inter prediction processing means the processing for parallel-moving the block having the decoded PU size which is located at a distance of a motion vector away from the PU within a reference image, with the same component as that of the PU of the picture which is decoded before the picture including the PU, thereby generating the block of interest as the prediction image P.

In addition, in the case where the PU as the encoding target is the color component Cb, the intra prediction processing, the intra BC prediction processing, the inter prediction processing, or LMchroma prediction processing as the prediction processing of the LMchroma prediction mode is executed as the prediction processing. The LMchroma prediction processing means the processing for transforming the pixel value of the luminance component Y in the same position as that of the PU by using the transformation parameters calculated with the decoded pixel value, thereby generating the prediction image P.

Moreover, in the case where the PU as the encoding target is the color component Cr, the intra prediction processing, the intra BC prediction processing, the inter prediction processing, the LMchroma prediction processing, or CrossColor prediction processing as the prediction processing for a CrossColor prediction mode is executed as the prediction processing. The CrossColor prediction processing means the processing for transforming the pixel value of the color component Cr in the same position as that of the PU with a predetermined transformation parameter, thereby generating the prediction image P. The predetermined transformation parameter is included in the prediction information Pinfo.

The prediction section 119 supplies the prediction image P generated as a result of the prediction processing to either the calculation section 111 or the calculation section 117.

(Configuration Example of Prediction Information Pinfo)

Figure 3:
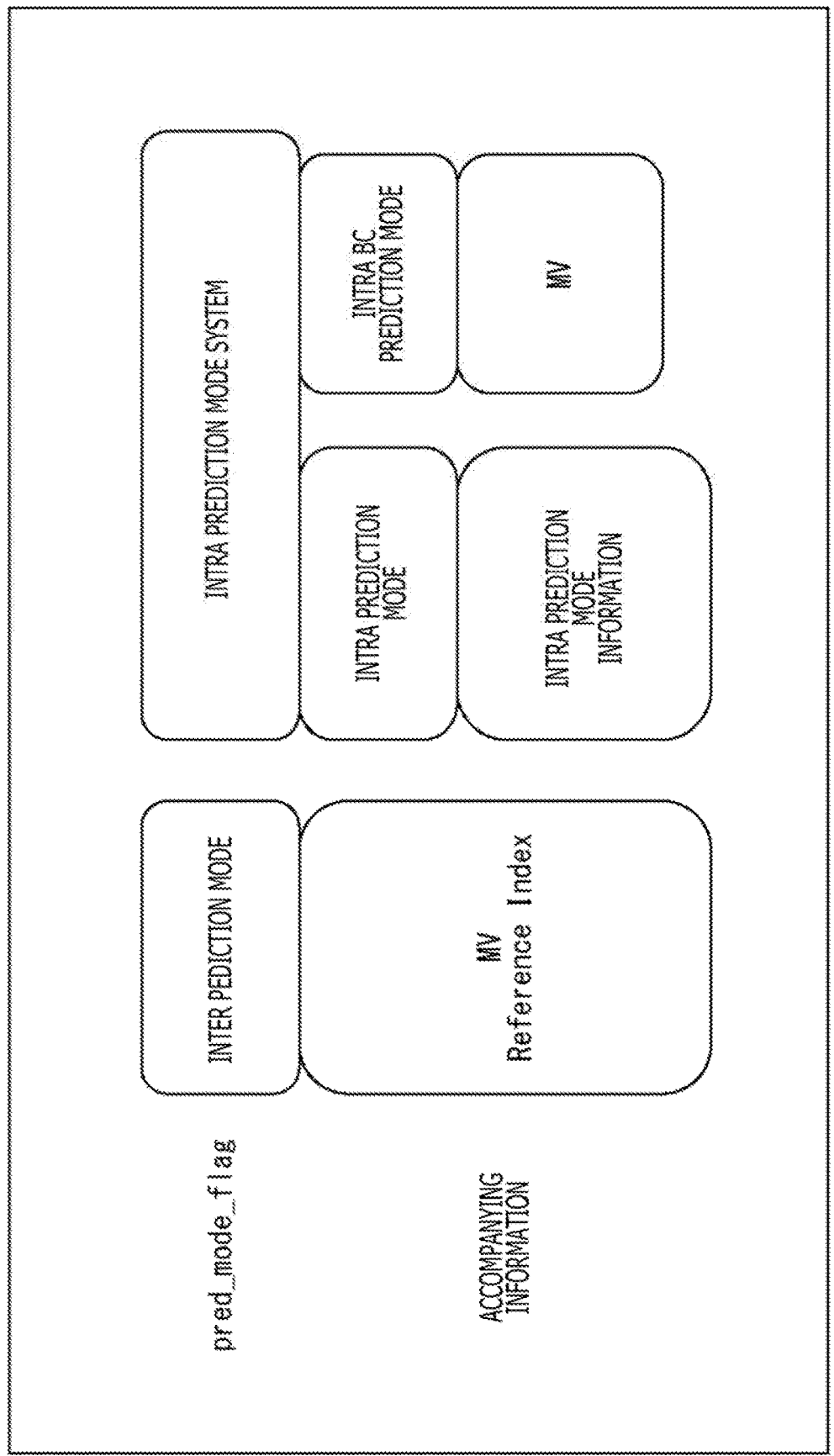
FIG. 3 is a view depicting a first example of a part of a configuration of prediction information.

FIG. 3 is a view depicting an example of a part of a configuration of the prediction information Pinfo.

As depicted in FIG. 3, pred_mode_flag of the prediction information Pinfo is the information indicating whether the prediction mode of the PU is the inter prediction mode, or the prediction mode of the intra prediction mode system (the intra prediction mode, the intra BC prediction mode, the LMchroma prediction mode, the CrossColor prediction mode).

In the case where pred_mode_flag indicates that the prediction mode of the PU is the inter prediction mode, pred_mode_flag is the prediction mode information. In this case, as depicted in FIG. 3, motion vector information indicating a Motion Vector (MV), with fractional precision, which is used in the inter prediction processing, Referenceindex as information used to specify the reference image, and the like are included in the prediction information Pinfo.

On the other hand, in the case where pred_mode_flag indicates that the prediction mode of the PU is the intra prediction mode system prediction mode, pred_mode_flag, and PU.IntraBCflag (PU.IntraBCmode) indicating whether nor not the prediction mode of the PU is the intra BC prediction mode are the prediction mode information.

In this case, when PU.IntraBCflag indicates that the prediction mode is not the intra BC prediction mode, the prediction mode information indicates the intra prediction mode. Then, PU.IntraBCflag indicating that the prediction mode is not the intra BC prediction mode, that is, the prediction mode is the intra prediction mode, the intra prediction mode, and the like are included in the prediction information Pinfo. The intra prediction mode means the information indicating the prediction modes called DC intra prediction, Planar intra prediction, and Angular intra prediction in the intra prediction mode of the PU.

On the other hand, when PU.IntraBCflag indicates that the prediction mode is the intra BC prediction mode, the prediction mode information indicates the intra BC prediction mode. Then, PU.IntraBCflag indicating that the prediction mode is the intra BC prediction mode, information indicating the motion vector (MV), with the integer precision or fractional pixel precision, which is used in the intra BC prediction, and the like are included in the prediction information Pinfo.

Incidentally, in the case where the PU is the PU of the color component Cb or Cr, there are a case where pred_mode_flag indicates that the prediction mode of the PU is the intra prediction mode system prediction mode and another case where the prediction mode is the LMchroma prediction mode. In this case, pred_mode_flag, and the information indicating that the prediction mode is the LMchroma prediction mode are included as the prediction mode information in the prediction information Pinfo.

In addition, in the case where the PU is the PU of the color component Cr, there are a case where pred_mode_flag indicates that the prediction mode of the PU is the intra prediction mode system mode and another case where the prediction mode is the CrossColor prediction mode. In this case, the information indicating that pred_mode_flag and the prediction mode are the CrossColor prediction mode is included as the prediction mode information in the prediction information Pinfo.

Although in an example of FIG. 3, the intra BC prediction mode is set as the intra prediction mode system prediction mode, the intra BC prediction mode may be set as the inter prediction mode system prediction mode. In this case, pred_mode_flag is the information indicating whether the prediction mode of the PU is the inter prediction mode system, or the intra prediction mode.

In addition, the prediction mode information indicating that the prediction mode is the intra BC prediction mode is pred_mode_flag indicating that the prediction mode is the inter mode prediction system prediction mode, and PU.IntraBCflag indicating that the prediction mode is the intra BC prediction mode. The prediction mode information indicating that the prediction mode is the inter prediction mode is pred_mode_flag indicating that the prediction mode is the inter prediction mode system prediction mode, and PU.IntraBCflag indicating that the prediction mode is not the intra BC prediction mode. The prediction mode information indicating that the prediction mode is the intra prediction mode is pred_mode_flag indicating that the prediction mode is the intra prediction mode.

(Explanation of Intra BC Prediction Processing)

Figure 4:
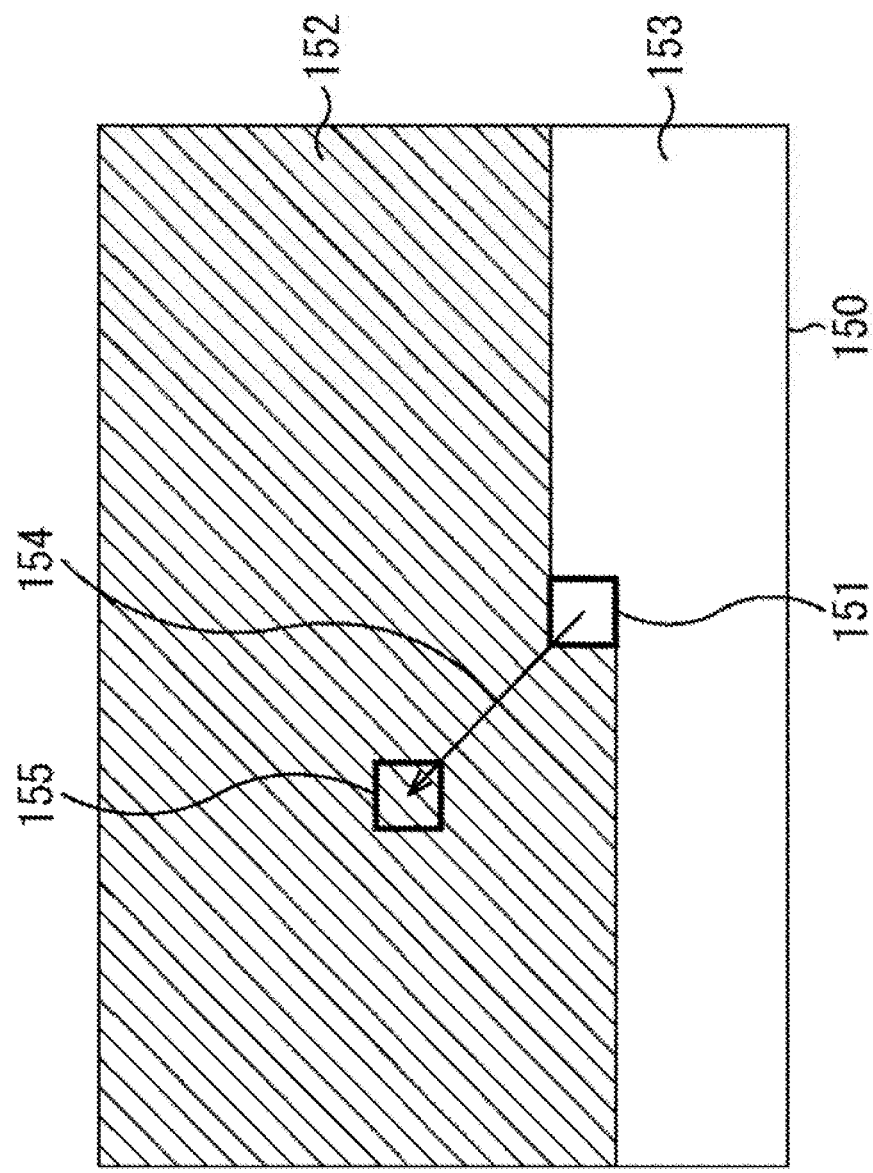
FIG. 4 is a view explaining intra BC prediction processing.

FIG. 4 is a view explaining the intra BC prediction processing executed by the prediction section 119 of FIG. 2.

As depicted in FIG. 4, in the case where the intra BC prediction processing is executed for a PU 156 as an encoding target of a picture 150, an upper side and left side area 152 with respect to the PU 156 is previously encoded, and decoded. However, a lower side and right side area 153 with respect to the PU 156 is not yet encoded. Therefore, the reference image is a decoded image in which only the area 152 is locally decoded.

The prediction section 119 executes the intra BC prediction processing for the PU 156 by using the reference image based on the motion vector information indicating a motion vector 154 included in the prediction information Pinfo. As a result, the decoded image of the decoded block 155, which is present at a distance of the motion vector 154 from the PU 156 within the picture 150 and has the same size as that of the PU 156, is generated as a prediction image P.

(Example of Format of Picture)

Figure 5:
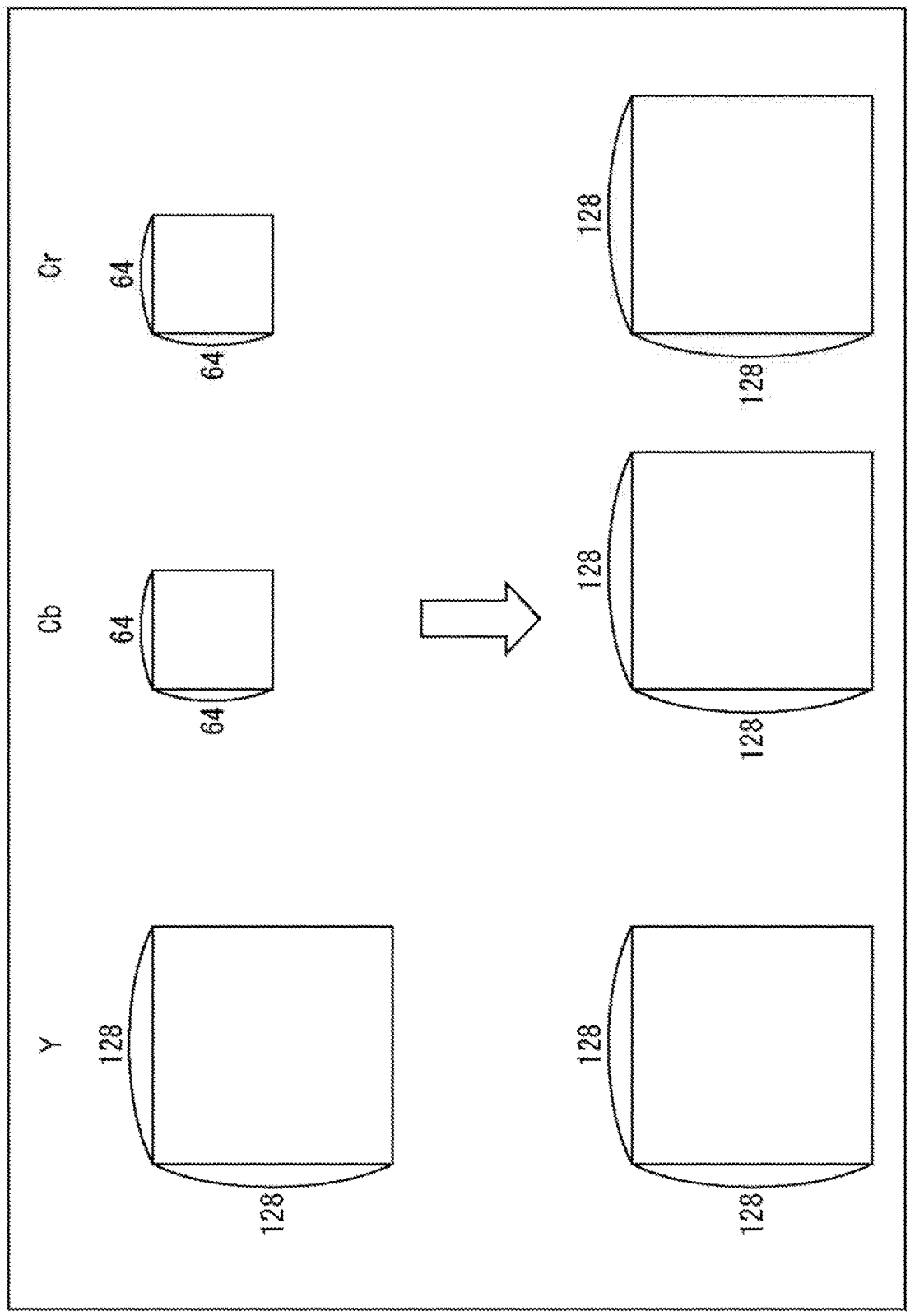
FIG. 5 is a view depicting a first example of a format of a picture.
Figure 6:
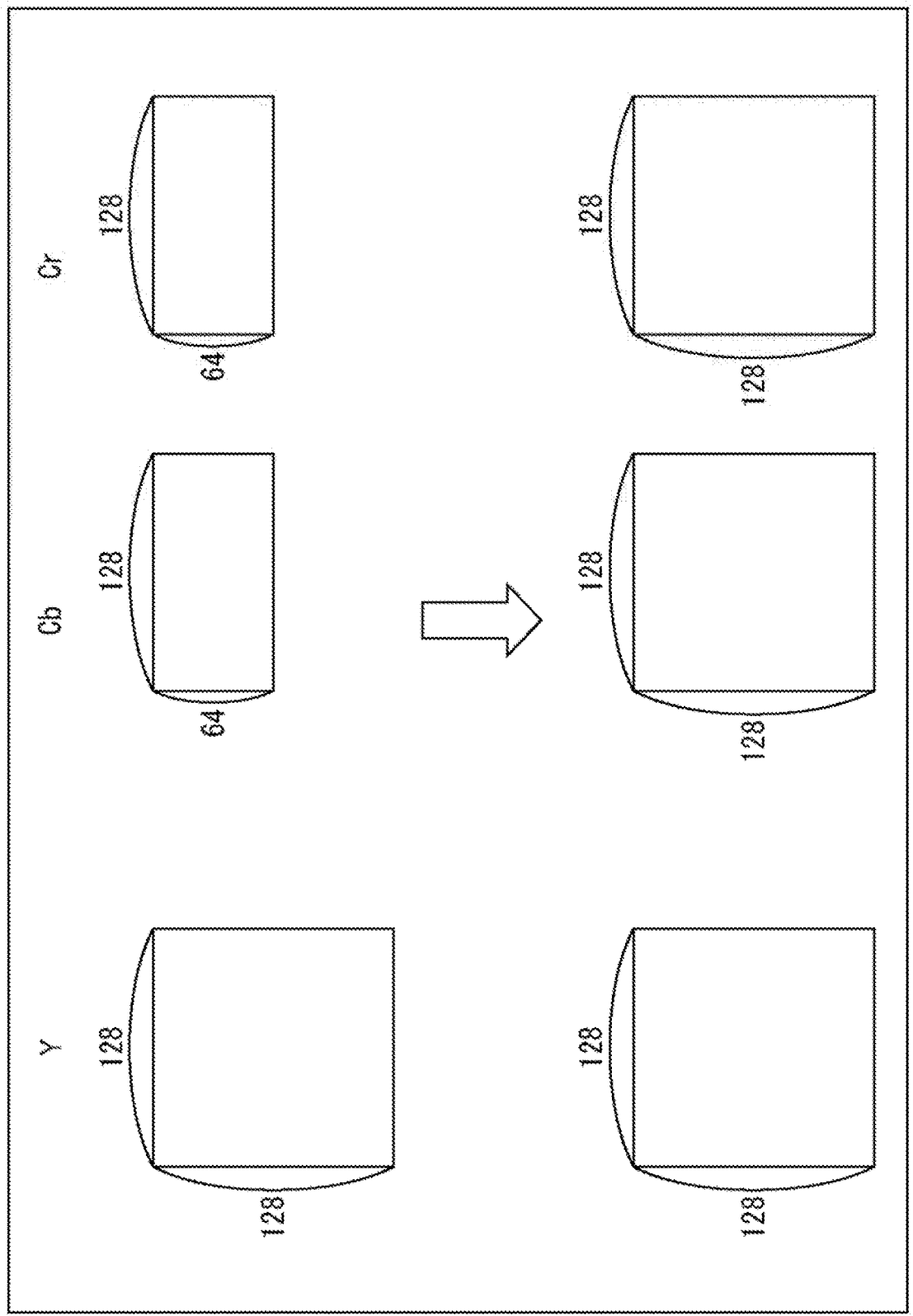
FIG. 6 is a view depicting a second example of the format of the picture.
Figure 7:
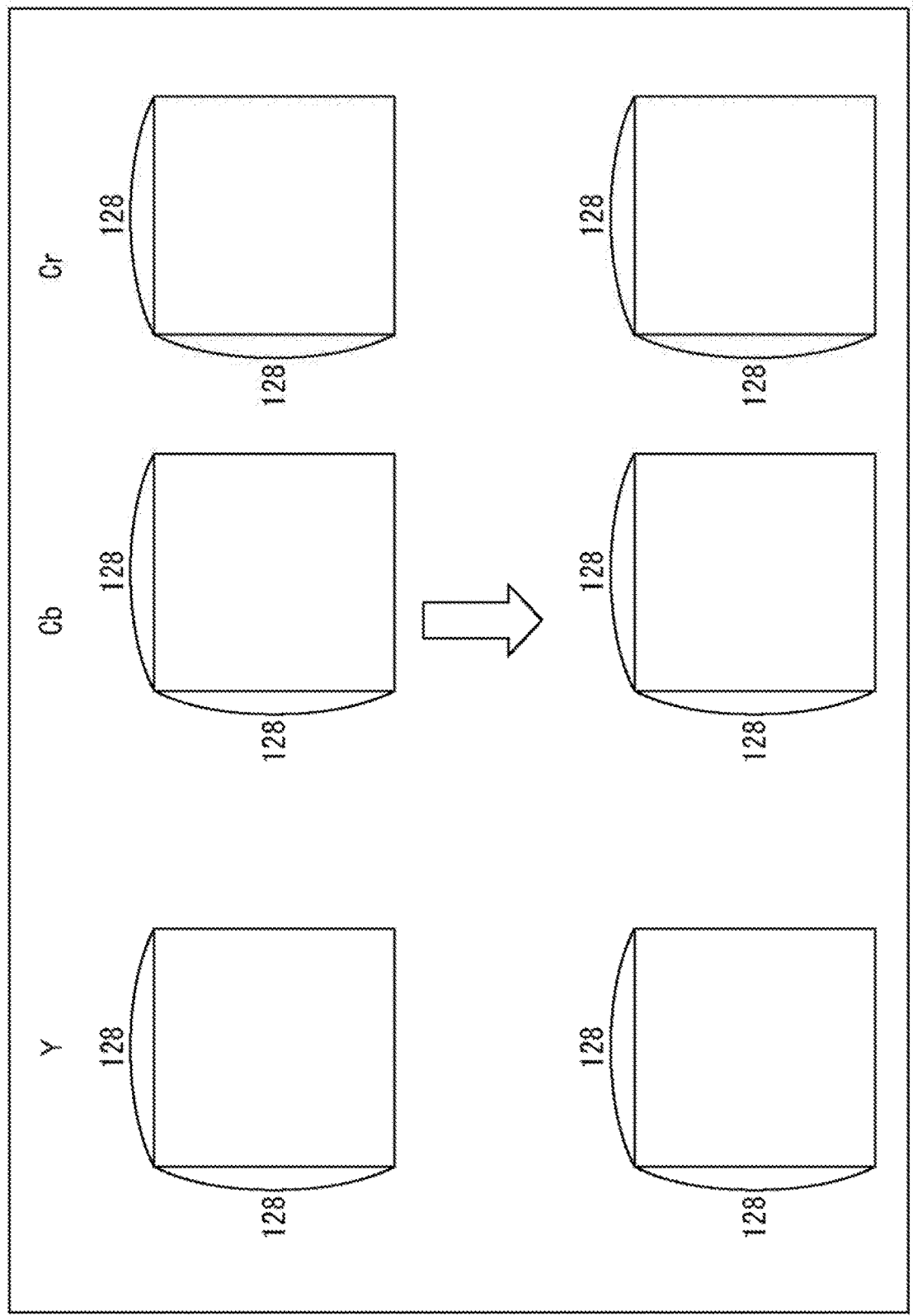
FIG. 7 is a view depicting a third example of the format of the picture.

FIGS. 5 to 7 are respectively views depicting examples of a format of a picture which is input to the image encoding apparatus 100.

As depicted in FIGS. 5 to 7, the picture input to the image encoding apparatus 100 is a YCbCr image. The format of the picture, as depicted in FIG. 5, may be YCbCr 420, as depicted in FIG. 6, may be YCbCr 422 or may be YCbCr 444.

In the YCbCr 420, the number of pixels in a horizontal direction and a vertical direction of the luminance component Y is ½ of the number of pixels in a horizontal direction and a vertical direction of the color components Cb and Cr. In addition, in the YCbCr 422, the number of pixels in the vertical direction of the luminance components Y is ½ of the number of pixels in the vertical direction of the color components Cb and Cr. The number of pixels in the horizontal direction of the luminance components Y is identical to the number of pixels in the horizontal direction of the color components Cb and Cr. In the YCbCr 444, the number of pixels in the horizontal direction and the vertical direction of the luminance component Y is identical to the number of pixels in the horizontal direction and the vertical direction of the color components Cb and Cr.

Therefore, for example, a size of the CU of the color components Cb and Cr corresponding to the CU of 128 (width)×128 (depth) pixels of the luminance component Y is 64×64 pixels in YCbCr 420, 126×64 pixels in YCbCr 422, and 128×128 pixels in YCbCr 444.

Therefore, in the case where the format of the picture is either the YCbCr 420 or the YCbCr 422, in referring to the CU of the luminance component Y corresponding to the CU of either the color component Cb or Cr, the image encoding apparatus 100 expands the size of either the color component Cb or Cr to the same size as that of the luminance component Y.

Figure 8:
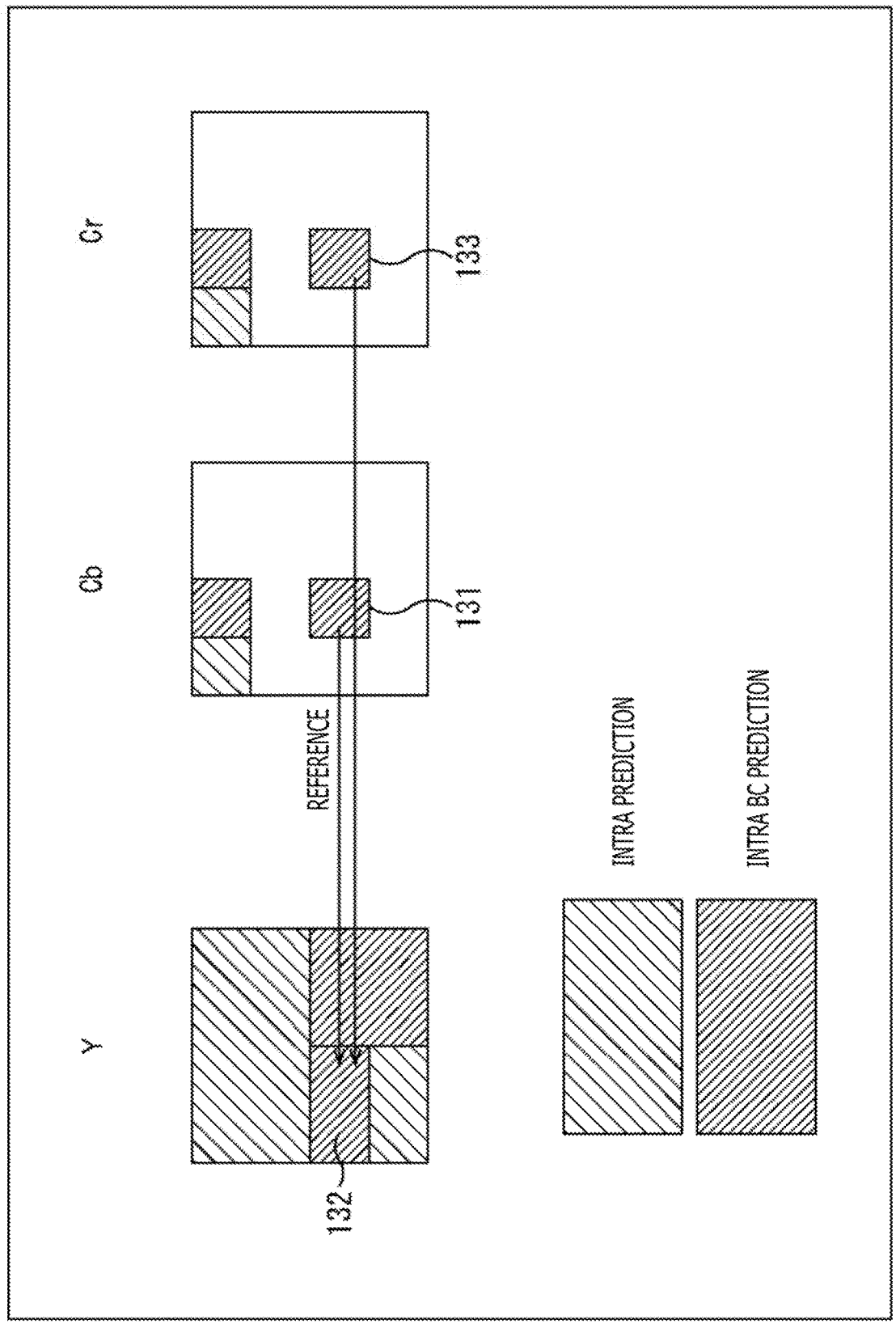
FIG. 8 is a view depicting a Cu of a luminance component to which reference is to be made.

Then, as depicted in FIG. 8, the image encoding apparatus 100 refers to a CU 132 of the luminance component Y including the same position as in the predetermined position (for example, the upper left position) of a CU 131 of the color component Cb after the expansion in the form of the CU of the luminance component Y corresponding to the CU before the expansion of the CU 131. Likewise, the image encoding apparatus 100 refers to a CU 132 of the luminance component Y including the same position as the predetermined position of a CU 133 of the color component Cb after the expansion in the form of the CU of the luminance component Y corresponding to the CU before the expansion of the CU 133.

Although, since in the YCbCr 420 and the YCbCr 422, the number of pixels of each of the color components Cb and Cr of the luminance component Y is smaller than the number of pixels of the luminance component Y, the amount of data can be reduced as compared with YCbCr 444 in which the luminance component Y is identical in the number of pixels to each of the color components Cb and Cr, the image quality of the color components Cb and Cr deteriorates. However, since the sensitivity of the sense of sight for the luminance of the human being is inferior to the sensitivity of the sense of sight for the colors, the deterioration of the image quality of the color components Cb and Cr is hardly recognized. Therefore, in the YCbCr 420 and the YCbCr 422, the amount of data can be reduced without causing the human being to recognize the deterioration of the image quality.

(Explanation of Encoding of Syntax Value of Prediction Mode Information of Color Components Cb and Cr)

Figure 9:
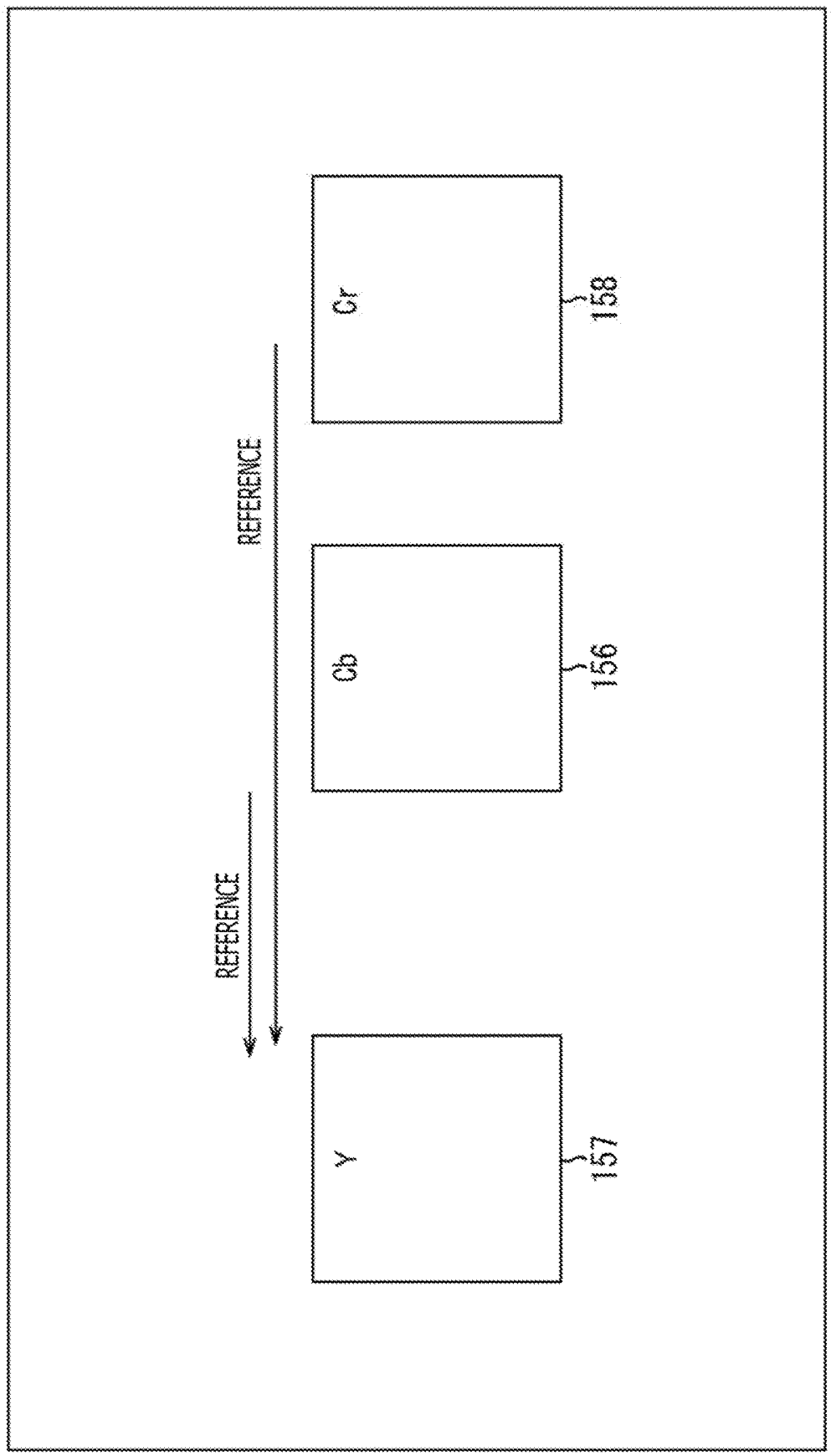
FIG. 9 is a view explaining encoding of a syntax value of prediction mode information of a color component.

FIG. 9 is a diagram explaining the encoding of the syntax value of the prediction mode information of the color components Cb and Cr.

As depicted in FIG. 9, in the case where the encoding section 114 encodes the syntax value of the prediction mode information of the PU 156 of the color component Cb, the encoding section 114 refers to the prediction mode of the PU 157 of the luminance component Y corresponding to the PU 156 of the color component Cb. Then, in the case where the prediction mode of the PU 157 of the luminance component Y is the intra BC prediction mode, the encoding section 114 encodes the syntax value of the prediction mode information of the PU 156 of the color component Cb by using, as the context, that the prediction mode of the PU of the luminance component Y is the intra BC prediction mode.

Specifically, in the case where the prediction mode of the PU of the luminance component Y is the intra BC prediction mode, the probability that the prediction mode of the PU of the color components Cb and Cr corresponding to the PU of interest is the intra BC prediction mode is high. Therefore, in the case where it is used as the context that the prediction mode of the PU of the luminance component Y is the intra BC prediction mode, the encoding section 114 sets a probability model of the CABAC for the prediction mode information of the color component Cb in such a way that the probability of the prediction mode information indicating the intra BC prediction mode becomes high, thereby performing the encoding.

As a result, as compared with the case where it is not used as the context that the prediction mode of the PU of the luminance component Y is the intra BC prediction mode, the compression rate of the syntax value of the prediction mode information of the color component Cb is enhanced, thereby enabling the encoding efficiency to be increased.

That is, in the case where the prediction mode of the PU 156 of the color component Cb is the intra BC prediction mode identical to the prediction mode of the PU 157 of the luminance component Y, the encoding is performed by using, as the context, that the prediction mode of the PU of the luminance component Y is the intra BC prediction mode. As a result, the syntax value of the prediction mode information of the PU 156 is compressed at the high compression rate. On the other hand, in the case where the prediction mode of the PU 156 of the color component Cb is different from the prediction mode of the PU 157 of the luminance component Y, the encoding is performed by using, as the context, that the prediction mode of the PU of the luminance component Y is the intra BC prediction mode, so that the amount of data of the syntax values of the prediction mode information of the PU 156 increases.

However, the probability that the prediction mode of the color component Cb is different from the prediction mode of the luminance component Y is small. Therefore, the compression rate of the whole of the syntax values of the prediction mode information of the color component Cb becomes high as compared with the case where encoding is performed without using, as the context, that the prediction mode of the PU of the luminance component Y is the intra BC prediction mode. As a result, the encoding efficiency is enhanced.

Since the encoding of the syntax value of the prediction mode information of the PU 158 of the color component Cr corresponding to the PU 157 of the luminance component Y is similar to the encoding of the syntax value of the prediction mode information of the PU 156 of the color component Cb, a description thereof is omitted here.

(Explanation of Generation of Motion Vector Information of Color Components Cb and Cr)

Figure 10:
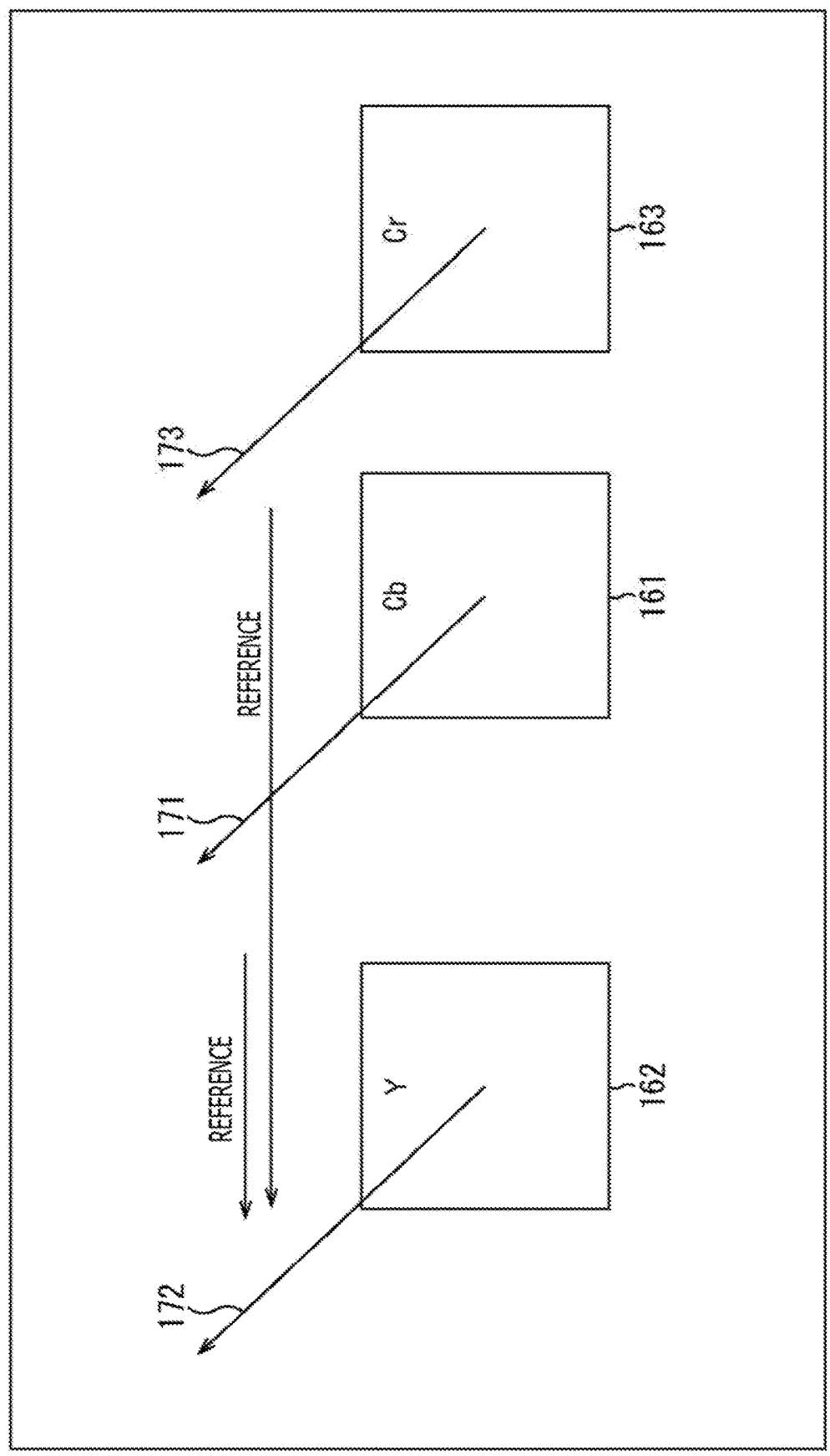
FIG. 10 is a view explaining generation of motion vector information.
Figure 11:
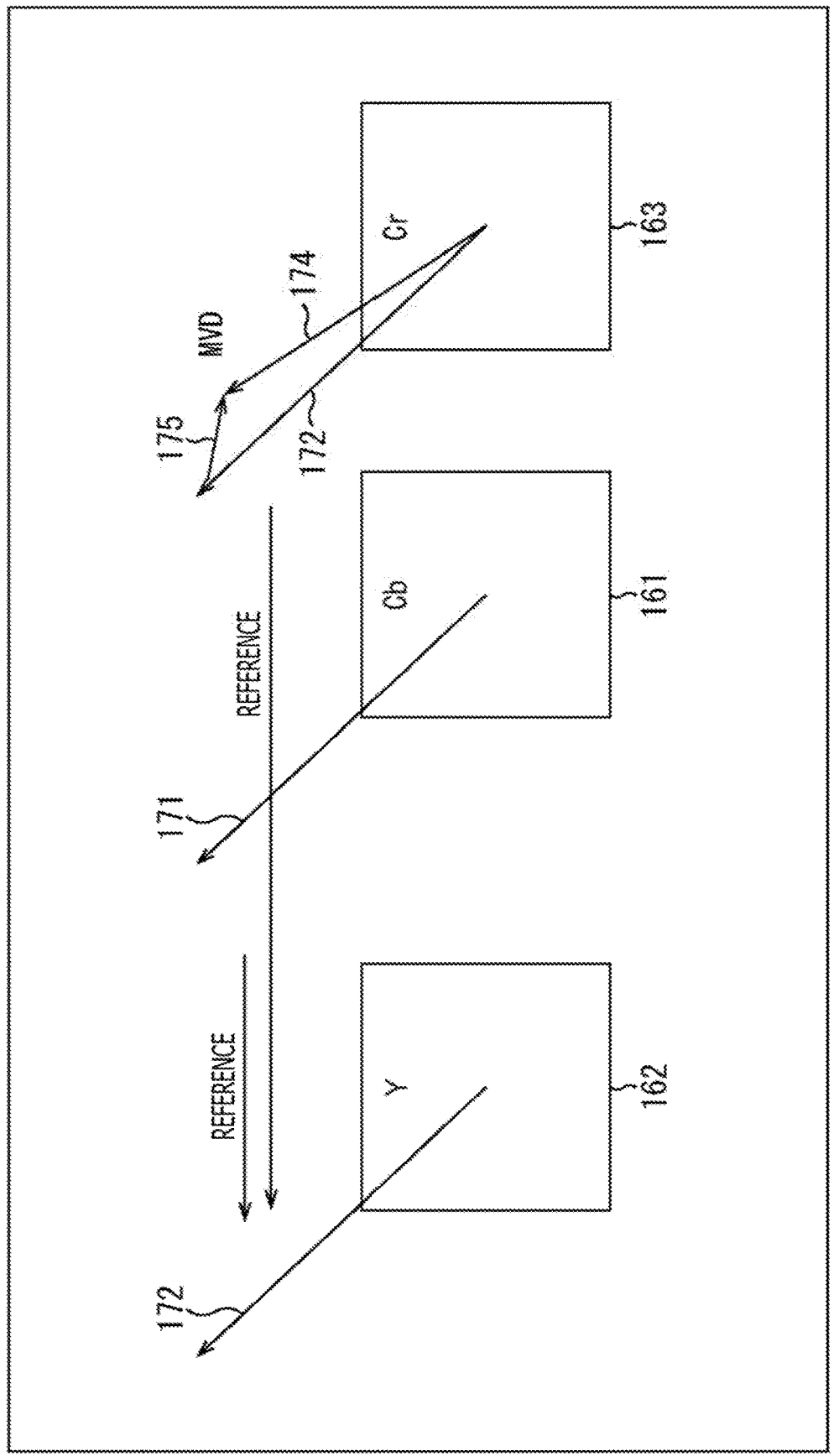
FIG. 11 is another view explaining generation of the motion vector information.
Figure 12:
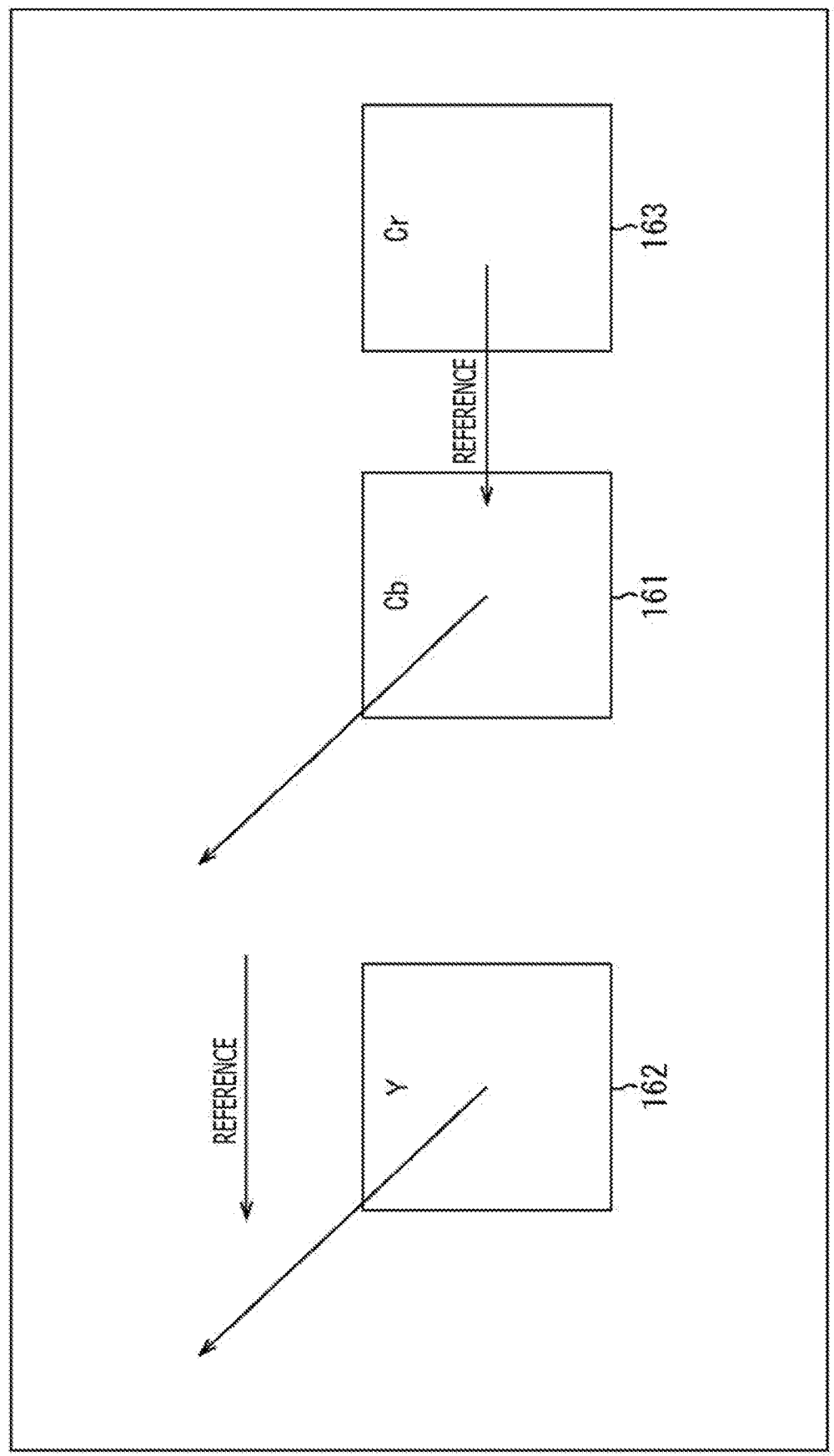
FIG. 12 is still another view explaining generation of the motion vector information.

FIGS. 10 to 12 are respectively views explaining the generation of the motion vector information used in the intra BC prediction processing for the color components Cb and Cr.

In the case where the prediction mode of the PU 161 of the color component Cb, and the PU 162 of the luminance component Y corresponding to the PU 161 is the intro BC prediction mode, as depicted in FIGS. 10 to 12, the control section 101 (generation section) generates the motion vector information used in the intra BC prediction processing of the PU 161 by referring to a motion vector 172 used in the intra BC prediction processing of the PU 162.

Specifically, as depicted in FIGS. 10 to 12, in the case where the motion vector used in the intra BC prediction processing of the PU 161 is a motion vector 171 identical to the motion vector 172, the control section 101 generates MVCbSameAsLumaflag indicating that the motion vector used in the intra BC prediction processing for the color component Cb is the same as the motion vector used in the intra BC prediction processing for the luminance component Y in the form of the motion vector information.

In addition, in the case where the prediction mode of the PU 163 of the color component Cr is also the intra BC prediction mode, as depicted in FIGS. 10 and 11, the control section 101 generates the motion vector information used in the intra BC prediction processing for the PU 163 by referring to the motion vector 172.

Specifically, in the case where as depicted in FIG. 10, the motion vector used in the intra BC prediction processing for the PU 163 is the same motion vector 173 as the motion vector 172, the control section 101 generates MVCrSameAsLumaflag indicating that the motion vector used in the intra BC prediction processing for the color component Cr is the same as the motion vector used in the intra BC prediction processing for the luminance component Y in the form of the motion vector information.

On the other hand, in the case where as depicted in FIG. 11, the motion vector used in the intra BC prediction processing for the PU 163 is a motion vector 174 different from the motion vector 172, the control section 101 may also generate MVCrSameAsLumaflag indicating that the motion vector used in the intra BC prediction processing for the color component Cr is not the same as the motion vector used in the intra BC prediction processing for the luminance component Y, and a difference 175 between the motion vector 172 and the motion vector 174 in the form of the motion vector information. Incidentally, the control section 101 may generate the motion vector 174 itself as the motion vector information.

In the manner as described above, the control section 101 generates the motion vector information of the PU 161 (163) by using the motion vector 172. Therefore, the amount of data of the motion vector information of the PU 161 (163) can be reduced, thereby enhancing the encoding efficiency.

That is, since a subject in the PU 161 (163) of the color component Cb (Cr) is the same as a subject in the PU 162 of the luminance component Y corresponding to the PU 161 (163), a correlation between the motion vectors used in the intra BC prediction processing for the PU 161 (163) and the PU 162 is high. Therefore, the control section 101 generates the difference between the PU 162 and the PU 161 (163), and MVCrSameAsLumaflag as the motion vector information, whereby the amount of data of the motion vector information can be reduced as compared with the case where the motion vector itself of the PU 161 (163) is generated as the motion vector information. As a result, the encoding efficiency can be enhanced.

In addition, in the case where the motion vector used in the intra BC prediction processing for the color component Cb (Cr) is different from the motion vector 172, the control section 101 generates the difference between these motion vectors in the form of the motion vector information. Therefore, the image decoding apparatus which will be described later uses an addition value of the motion vector 172 and the difference as the motion vector of the color component Cb (Cr), whereby the prediction accuracy can be enhanced as compared with the case where the motion vector 172 is used as the motion vector of the color component Cb (Cr) as it is.

On the other hand, in the case where the prediction mode of the PU 163 of the color component Cr is the CrossColor prediction mode, as depicted in FIG. 12, the motion vector information of the PU 163 is not generated. In this case, in the CrossColor prediction processing for the PU 163, reference is made to the pixel value of the PU 161 of the color component Cb.

Incidentally, in the case where the prediction mode of the PU of the color components Cb and Cr, and the PU of the luminance component Y corresponding to the PU is the intra BC prediction mode, the setting of the motion vector of the PU of the color components Cb and Cr is performed based on the motion vector of the PU of the luminance component Y corresponding to the PU.

Specifically, the control section 101 sets the motion vectors within a predetermined range with the motion vector of the PU of the luminance component Y corresponding to the PU of the color components Cb and Cr as a center in the form of candidates, and sets the motion vector used in the intra BC prediction processing for the color components Cb and Cr based on RDO.

That is, since a subject in the PU of the color components Cb and Cr is the same as a subject in the PU of the luminance component Y corresponding to the PU, a correlation between the motion vectors of the PU of the color components Cb and Cr, and the PU of the luminance component Y corresponding to the PU is high. Therefore, the control section 101 limits the candidates of the motion vector of the PU of the color components Cb and Cr to the predetermined range with the motion vector of the PU of the luminance component Y corresponding to the PU as the center. As a result, as compared with the case where all the motion vectors are set as the candidates, the amount of processing in processing for setting the motion vectors of the PU of the color components Cb and Cr can be reduced.

(Explanation of Processing in Image Encoding Apparatus)

Figure 13:
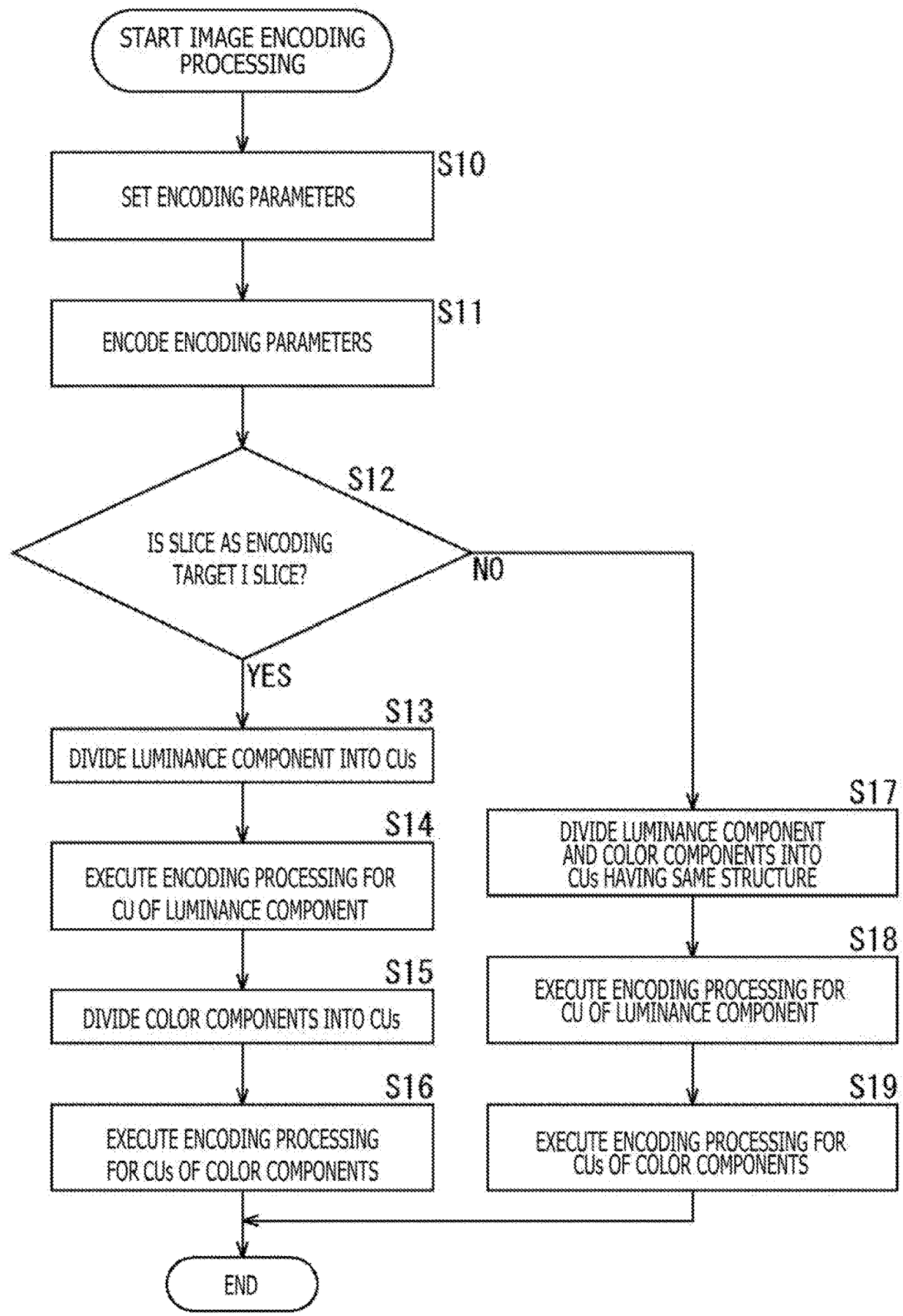
FIG. 13 is a flow chart explaining image encoding processing.

FIG. 13 is a flow chart explaining the image encoding processing of the image encoding apparatus 100. The image encoding processing, for example, is executed for the picture which is input to the image encoding apparatus 100.

In Step S10 of FIG. 13, the control section 101 sets the encoding parameters (the header information Hinfo, the prediction information Pinfo, the transformation information Tinfo, and the like) based on the input from the outside, the RDO, and the like. The control section p 101 supplies the encoding parameters thus set to each of the blocks.

In Step S11, the encoding section 114 encodes the encoding parameters supplied thereto from the control section 101. Processing from Steps S12 to S19 which will be described later executed for each slice.

In Step S12, the control section 101 decides whether or not the slice as an encoding target is an I slice based on the encoding parameters set in Step S10. In the case where it is decided in Step S12 that the slice as the encoding target is the I slice, the processing proceeds to Step S13.

In Step S13, the control section 101 divides, on the basis of the encoding parameters set in Step S10, the luminance component Y of the slice as the encoding target within the picture input to the image encoding apparatus 100 into the CUs, and sets each of the CUs of the luminance component Y thus divided to the CU as the encoding target. The control section 101 supplies an image I of the CU as the encoding target to the calculation section 111.

In Step S14, the image encoding apparatus 100 executes the encoding processing for the image I of the CU of the luminance component Y which is supplied as the image I of the CU as the encoding target from the control section 101.

In Step S15, the control section 101 divides, on the basis of the encoding parameters set in Step S10, the color components Cb and Cr of the slice as the encoding target within the picture input to the image encoding apparatus 100 into the CUs, and sets each of the CUs of the color components Cb and Cr thus obtained through the division to the CU as the encoding target. The control section 101 supplies the image I of the CU as the encoding target to the calculation section 111.

In Step S16, the image encoding apparatus 100 executes the encoding processing for the image I of the CU of the color components Cb and Cr which is supplied as the image I of the CU as the encoding target from the control section 101, and the processing is ended.

On the other hand, in the case where it is decided in Step S12 that the slice as the encoding target is not the I slice, the processing proceeds to Step S17.

In Step S17, the control section 101 divides, on the basis of the encoding parameters set in Step S10, the luminance component Y, and the color components Cb and Cr of the slice as the encoding target within the picture input to the image encoding apparatus 100 into the CUs having the same structure. The control section 101 sets each of the CUs of the luminance component Y obtained through the division to the CU as the encoding target, and supplies the image I of the CU as the encoding target to the calculation section 111.

In Step S18, the image encoding apparatus 100 executes the encoding processing for the image I of the CU of the luminance component Y supplied as the image I of the CU as the encoding target from the control section 101. Then, the control section 101 sets each of the CUs of the color components Cb and Cr of the slice as the encoding target to the CU as the encoding target, and supplies the image I of the CU as the encoding target to the calculation section 111.

In Step S19, the image encoding apparatus 100 executes the encoding processing for the image I of the CU of the color components Cb and Cr supplied the image I of the CU as the encoding target from the control section 101, and the processing is ended.

Figure 14:
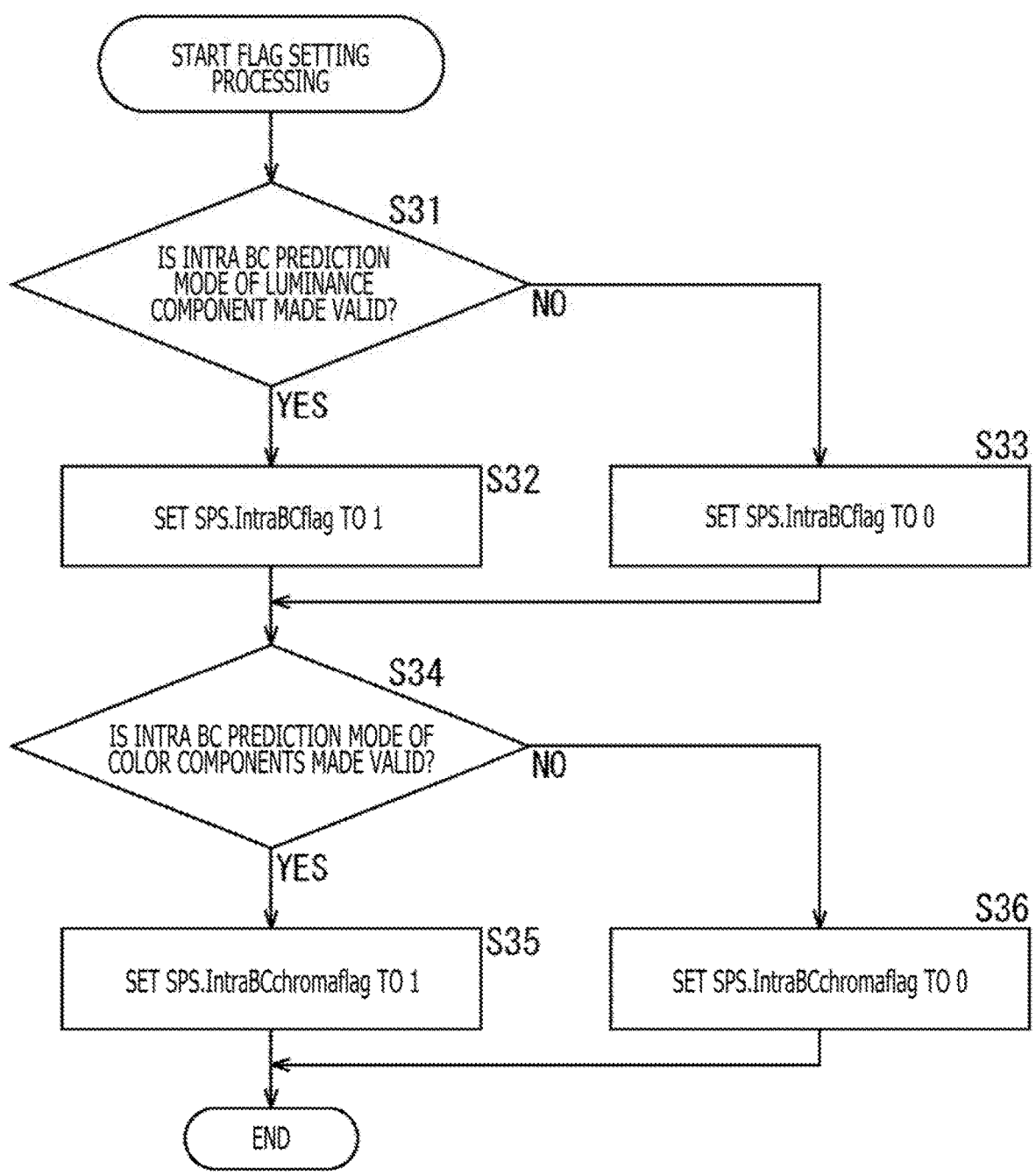
FIG. 14 is a flow chart explaining a first example of flag setting processing.

FIG. 14 is a flow chart explaining flag setting processing for setting SPS.IntraBCflag and SPS.IntraBCchromaflag of Step S10 of FIG. 13.

In Step S31 of FIG. 14, the control section 101 decides whether or not the intra BC prediction mode of the luminance component is made valid based on the input or the like from the outside. In the case where it is decided in Step S31 that the intra BC prediction mode of the luminance component is made valid, the processing proceeds to Step S32.

In Step S32, the control section 101 sets SPS.IntraBCflag to 1 indicating that the intra BC prediction mode of the luminance component is made valid, and the processing proceeds to Step S34.

On the other hand, in the case where it is decided in Step S31 that the intra BC prediction mode of the luminance component is not made valid, the processing proceeds to Step S33. In Step S33, the control section 101 sets SPS.IntraBCflag to 0 indicating that the intra BC prediction mode of the luminance component is not made valid, and the processing proceeds to Step S34.

In Step S34, the control section 101 decides whether or not the intra BC prediction mode of the color components is made valid based on the input or the like from the outside. In the case it is decided in Step S34 that the intra BC prediction mode of the color components is made valid, the processing proceeds to Step S35.

In Step S35, the control section 101 sets SPS.IntraBCchromaflag to 1 indicating that the intra BC prediction mode of the color components is made valid, and the processing is ended.

On the other hand, in the case it is decided in Step S34 that the intra BC prediction mode of the color components is not made valid, the processing proceeds to Step S36. In Step S36, the control section 101 sets SPS.IntraBCchromaflag to 0 indicating that the intra BC prediction mode of the color components is not made valid, and the processing is ended.

Incidentally, only in the case where SPS.IntraBCflag is set to 1, that is, only in the case where the intra BC prediction processing of the luminance component is valid, SPS.IntraBCchromaflag may be made settable. The flag setting processing in this case is as depicted in FIG. 15.

Figure 15:
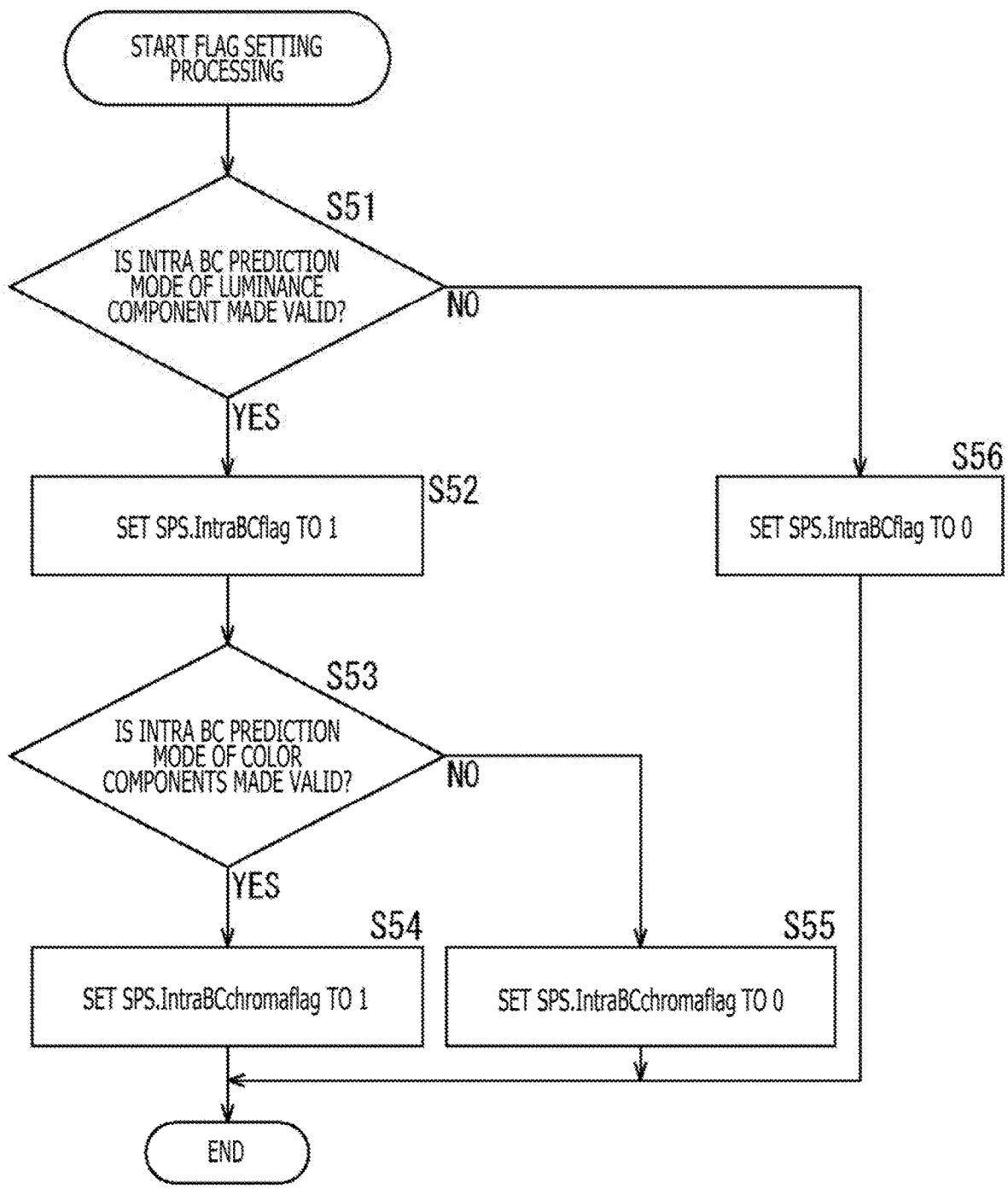
FIG. 15 is a flow chart explaining a second example of the flag setting processing.

Flag setting processing of FIG. 15 is different from the flag setting processing of FIG. 14 in that after the processing in Step S33 of FIG. 14, the processing is ended. That is, although the pieces of processing from Steps S51 to S56 of FIG. 15 are similar to the pieces of processing from Steps S31 to S36 of FIG. 14, after the processing in Step S56, the processing is ended.

In the case where the flag setting processing of FIG. 15 is executed, when SPS.IntraBCflag is 0, the intra BC prediction processing for not only the luminance component, but also the color components is made invalid. That is, the image encoding apparatus 100 enhances the encoding efficiency by using the method of, in the case where the prediction mode of the color component Cb (Cr) is the intra BC prediction mode, encoding the prediction mode information of the color component Cb (Cr) by using, as the context, that the prediction mode of the luminance component Y is the intra BC prediction mode, and the method of generating the motion vector information of the color component Cb (Cr) by using the motion vector of the luminance component Y. However, for using these methods, the prediction mode of the luminance component Y needs to be the intra BC prediction mode. Therefore, in the flag setting processing of FIG. 15, in the case where the prediction mode of the luminance component Y is not the intra BC prediction mode, and thus it may be impossible to use these methods, the prediction mode of the color component Cb (Cr) is prevented from being set in the intra BC prediction mode.

Figure 16:
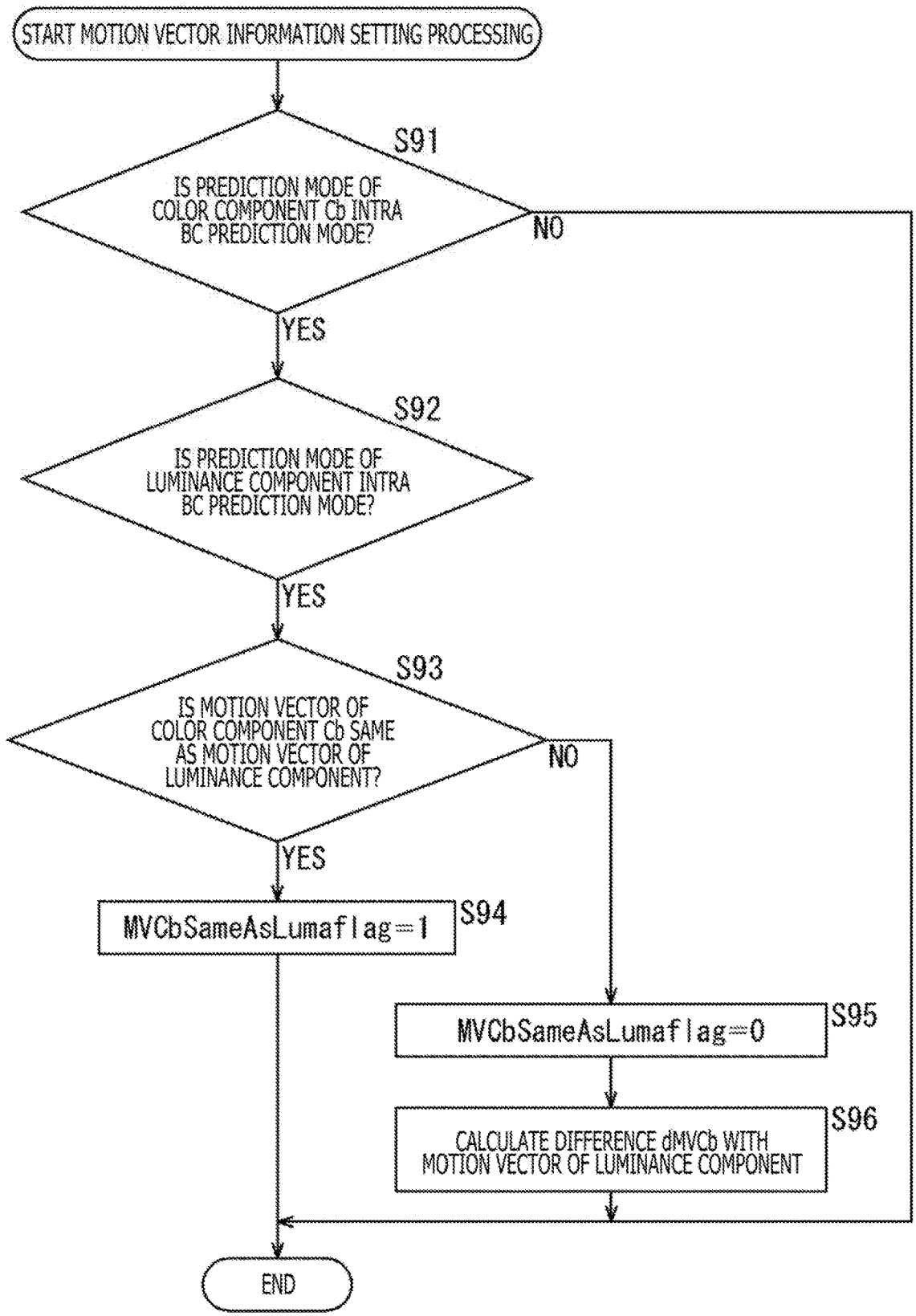
FIG. 16 is a flow chart explaining motion vector information setting processing.

FIG. 16 is a flow chart explaining motion vector information setting processing for, in the case where, of Step S11 of FIG. 13, the prediction mode of the color component Cb is the intra BC prediction mode, setting the motion vector information used in the intra BC prediction processing for the color component Cb. The motion vector information setting processing is executed each PU of the color component Cb.

In Step S91 of FIG. 16, the control section 101 decides whether or not the prediction mode of the PU of the color component Cb as the processing target is the intra BC prediction mode based on the set encoding parameters. In the case where pred_mode_flag of the PU of the color component Cb as the processing target indicates that the prediction mode is the intra prediction mode system, and PU.IntraBCflag indicates that the prediction mode is the intra BC prediction mode, the control section 101 decides in Step S91 that the prediction mode of the PU of the color component Cb as the processing target is the intra BC prediction mode. Then, the processing proceeds to Step S92.

In Step S92, the control section 101 decides whether or not the prediction mode of the PU of the luminance component Y corresponding to the PU of the color component Cb as the processing target is the intra BC prediction mode based on the set encoding parameters. In the case where pred_mode_flag of the luminance component Y corresponding to the PU of the color component Cb as the processing target indicates that the prediction mode is the intra prediction mode system, and PU.IntraBCflag indicates that the prediction mode is the intra BC prediction mode, the control section 101 decides in Step S92 that the prediction mode is the intra BC prediction mode. Then, the processing proceeds to Step S93.

In Step S93, the control section 101 decides whether or not the motion vector of the PU of the color component Cb as the processing target is the same as the motion vector of the PU of the luminance component Y corresponding to the PU.

In the case where Step S93, it is decided that the motion vector of the PU of the color component Cb as the processing target is the same as the motion vector of the PU of the luminance component Y corresponding to the PU, the processing proceeds to Step S94. In Step S94, the control section 101 sets MVCbSameAsLumaflag to 1 indicating that the motion vector used in the intra BC prediction processing of the color component Cb is the same as the motion vector used in the intra BC prediction processing of the luminance component Y. The control section 101 sets MVCbSameAsLumaflag, to which 1 is set, as the motion vector information of the PU of the color component Cb as the processing target, and the processing is ended.

On the other hand, in the case where it is decided in Step S93 that the motion vector of the PU of the color component Cb as the processing target is not the same as the motion vector of the PU of the luminance component Y corresponding to the PU, the processing proceeds to Step S95.

In Step S95, the control section 101 sets MVCbSameAsLumaflag to 0 indicating that the motion vector used in the intra BC prediction processing of the color component Cb is not the same as the motion vector used in the intra BC prediction processing of the luminance component Y.

In Step S96, the control section 101 calculates a difference dMVCb between the motion vector of the PU of the color component Cb as the processing target and the motion vector of the PU of the luminance component Y corresponding to the PU. The control section 101 sets the difference dMVCb with MVCbSameasLumaflag, to which 0 is set, as the motion vector information of the PU of the color component Cb as the processing target, and the processing is ended.

On the other hand, in the case where pred_mode_flag of the PU of the color component Cb as the processing target indicates the inter prediction mode, or pred_mode_flag indicates that the prediction mode is the intra prediction mode system, and PU.intraBCflag indicates that the prediction mode is not the intra BC prediction mode, the control section 101 decides in Step S91 that the prediction mode is not the intra BC prediction mode. Then, the processing is ended.

In addition, in the case where pred_mode_flag of the PU of the luminance component Y corresponding to the PU of the color component Cb as the processing target indicates that the prediction mode is the inter prediction mode, or pred_mode_flag indicates that the prediction mode is the intra prediction mode system, and PU.IntraBCflag indicates that the prediction mode is not the intra BC prediction mode, the control section 101 decides in Step S92 that the prediction mode is not the intra BC prediction mode. Then, the processing is ended.

Incidentally, the motion vector information setting processing for setting the motion vector information used in the intra BC prediction processing for the color component Cr in the case where the prediction mode of the color component Cr is the intra BC prediction mode is similar to the motion vector information setting processing of FIG. 16 except that MVCbSameAsLumaflag is replaced with MVCrSameAsLumaflag, and that the difference dMVCb is replaced with the difference dMVCr.

MVCrSameASLumaflag is the information indicating whether or not the motion vector of the PU of the color component Cr as the processing target is identical to the motion vector of the PU of the luminance component Y corresponding to the PU. The difference dMVCb is the difference between the motion vector of the PU of the color component Cr as the processing target, and the motion vector of the PU of the luminance component Y corresponding to the PU.

Figure 17:
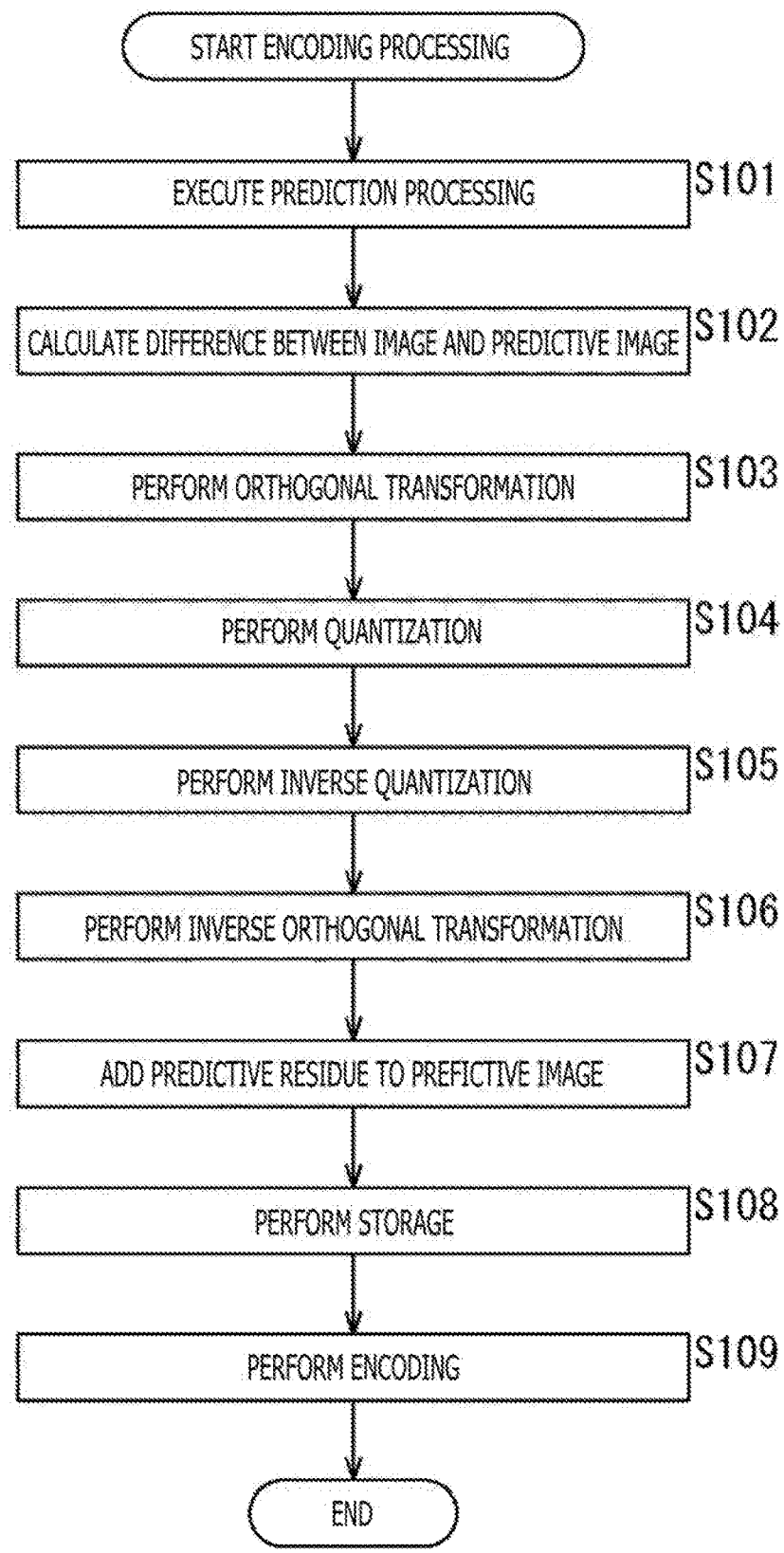
FIG. 17 is a flow chart explaining encoding processing.

FIG. 17 is a flow chart explaining the encoding processing which is executed in Steps S14, S16, S18, and S19 of FIG. 13. The encoding processing is executed for each CU as the encoding target.

In Step S101 of FIG. 17, the prediction section 119 acquires the decoded image which is stored in the frame memory 118 as the reference image based on the prediction information Pinfo supplied thereto from the control section 101, and executes the prediction processing for the CU (PU) as the encoding target by using the reference image. The prediction section 119 supplies the prediction image P generated as a result of the prediction processing to each of the calculation section 111 and the calculation section 117.

In Step S102, the calculation section 111 calculates a difference between the image I and the prediction image P in the form of a prediction residue D, and supplies the resulting prediction residue D to the transformation section 112. The prediction residue D obtained in such a manner is reduced in amount of data as compared with the original image I. Therefore, the amount of data can be compressed as compared with the case where the original image I is encoded as it is.

In Step S103, the transformation section 112 performs the orthogonal transformation or the like for the prediction residue D supplied thereto from the calculation section 111 based on the transformation information. Tinfo supplied thereto from the control section 101 to derive the transformation coefficient Coeff. The transformation section 112 supplies the transformation coefficient Coeff to the quantization section 113.

In Step S104, the quantization section 113 scales (quantizes) the transformation coefficient Coeff supplied thereto from the transformation section 112 based on the transformation information Tinfo supplied thereto from the control section 101 to derive the quantization transformation coefficient level level. The quantization section 113 supplies the quantization transformation coefficient level level to each of the encoding section 114 and the inverse quantization section 115.

In Step S105, the inverse quantization section 115 inverse-quantizes the quantization transformation coefficient level level supplied thereto from the quantization section 113 with the characteristics corresponding to the characteristics of the quantization in Step S104 based on the transformation information Tinfo supplied thereto from the control section 101. The inverse quantization section 115 supplies the resulting transformation coefficient Coeff_IQ to the inverse transformation section 116.

In Step S106, the inverse transformation section 116 performs the inverse orthogonal transformation or the like for the transformation coefficient Coeff_IQ supplied thereto from the inverse quantization section 115 by using a method corresponding to the orthogonal transformation or the like in Step S103 based on the transformation information Tinfo supplied thereto from the control section 101 to derive the prediction residue D'.

In Step S107, the calculation section 117 adds the prediction residue D' derived by the processing in Step S106 to the prediction image P supplied thereto from the prediction section 119, thereby generating a local decoded image Rec.

In Step S108, the frame memory 118 rebuilds the decoded image of the picture unit by using the local decoded image Rec which is obtained through the processing in Step S107, and the decoded image is stored in the buffer within the frame memory 118.

In Step S109, the encoding section 114 encodes the quantization transformation coefficient level level obtained through the processing in Step S104 by using the arithmetic encoding or the like. The encoding section 114 collectively outputs the encoded data of the resulting quantization transformation coefficient level level and the encoded data of the encoding parameters obtained through the processing in Step S11 of FIG. 13 in the form of an encoded stream to the outside of the image encoding apparatus 100. The encoded stream, for example, is transmitted to the decoding side through a transmission path or a recording medium.

When the processing in Step S109 is ended, the image encoding processing is ended accordingly.

Figure 18:
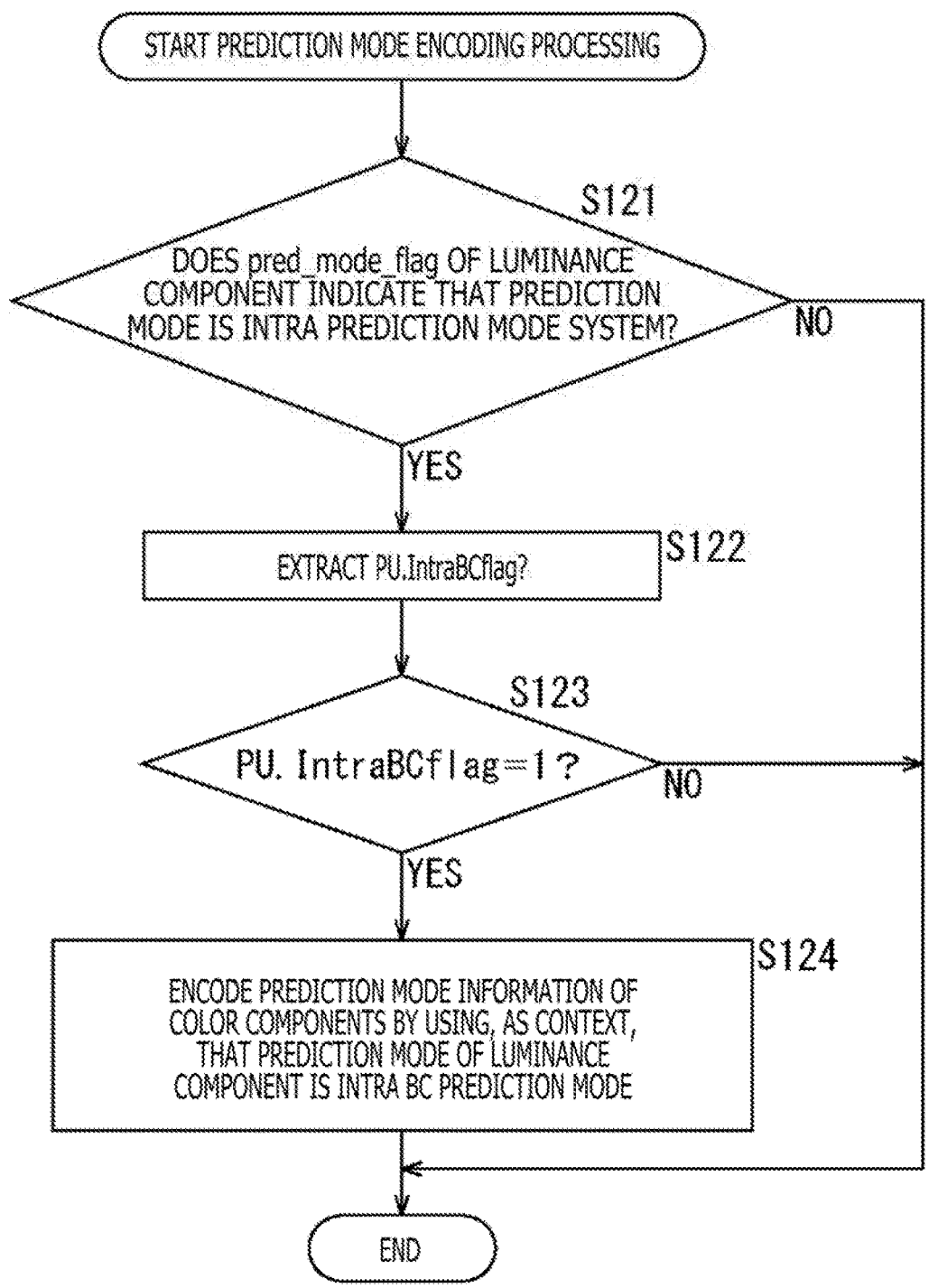
FIG. 18 is a flow chart explaining prediction mode encoding processing.

FIG. 18 is a flow chart explaining prediction mode encoding processing for, in the case where, of Step S109 of FIG. 17, the prediction mode of the PU of the luminance component Y is the intra BC prediction mode, encoding the prediction mode information of the PU of the color component Cb (or Cr) corresponding to the PU. The prediction mode encoding processing, for example, is executed in a PU unit of the color component Cb (or Cr).

In Step S121 of FIG. 18, the encoding section 114 decides whether or not pred_mode_flag of the PU of the luminance component corresponding to the PU of the color component Cb (or Cr) as the processing target of the encoding parameters indicates that the prediction mode is the intra prediction mode system.

In the case where it is decided in Step S121 that pred_mode_flag of the PU of the luminance component corresponding to the PU of the color component Cb (or Cr) as the processing target, indicates that the prediction mode is the intra prediction mode system, the processing proceeds to Step S122.

In Step S122, the encoding section 114 extracts PU.IntraBCflag of the luminance component corresponding to the PU of the color component Cb (or Cr) as the processing target from the encoding parameters.

In Step S123, the encoding section 114 decides whether or not PU.IntraBCflag extracted in Step S122 is 1 indicating that the prediction mode is the intra BC prediction mode. In the case where it is decided in Step S123 that PU.IntraBCflag is 1, the processing proceeds to Step S124.

In Step S124, the encoding section 114 encodes the prediction mode information of the PU of the color component Cb (or Cr) as the processing target by using, as the context, that the prediction mode of the PU of the luminance component Y corresponding to the PU of the color component Cb (or Cr) as the processing target is the intra BC prediction mode. Then, the processing is ended.

In the case where it is decided in Step S121 that pred_mode_flag of the PU of the luminance component corresponding to the PU of the color component Cb (or Cr) as the processing target does not indicate that the prediction mode is the intra prediction mode system, that is, in the case where the prediction mode of the PU of interest is the inter prediction mode, the processing is ended.

In addition, in the case where it is decided in Step S123 that. PU.IntraBCflag is not 1, and in the case where the prediction mode of the PU of the luminance component corresponding to the PU of the color component Cb (or Cr) as the processing target is the intra prediction mode, the processing is ended.

(Configuration Example of Image Decoding Apparatus)

Figure 19:
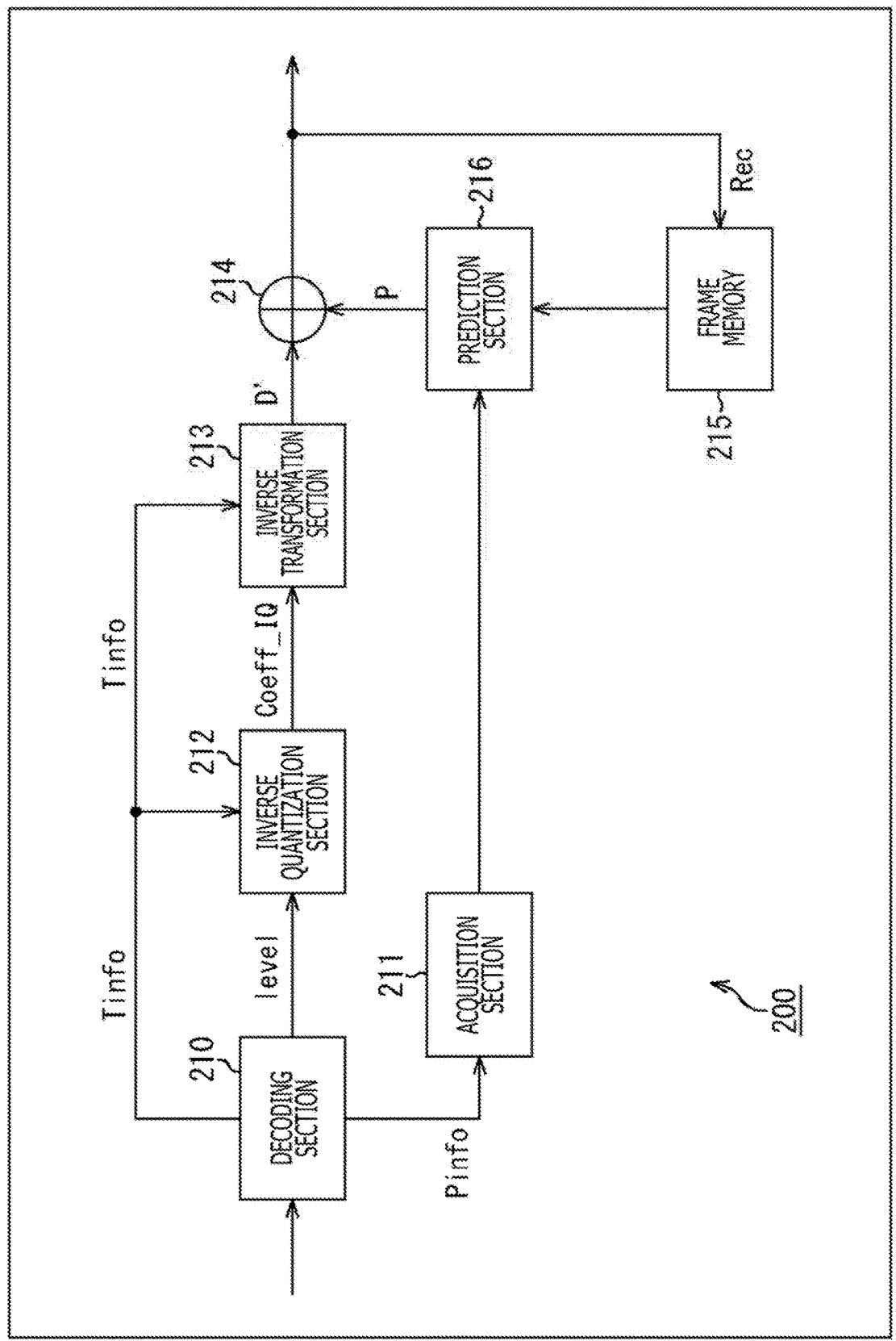
FIG. 19 is a block diagram depicting a configuration example of an embodiment of an image decoding apparatus.

FIG. 19 is a block diagram depicting a configuration example of an embodiment of an image decoding apparatus, as the image processing apparatus to which the present technology is applied, for decoding the encoded stream generated by the image encoding apparatus 100 of FIG. 2. The image decoding apparatus 200 of FIG. 19 decodes the encoded stream generated by the image encoding apparatus 100 by using a decoding method corresponding to the encoding method in the image encoding apparatus 100. For example, the image decoding apparatus 200 is implemented with the technology proposed in HEVC, or the technology proposed in JVET.

It should be noted that FIG. 19 depicts the main constituent elements such as the processing sections or the flows of the data, and the constituent elements depicted in FIG. 19 are not necessarily all the constituent elements. In a word, in the image decoding apparatus 200, the processing section which is not depicted as a block in FIG. 19 may be present, or a processing or a flow of data of which is not depicted with an arrow or the like in FIG. 19 may be present.

The image decoding apparatus 200 of FIG. 19 has a decoding section 210, an acquisition section 211, an inverse quantization section 212, an inverse transformation section 213, a calculation section 214, a frame memory 215, and a prediction section 216. The image decoding apparatus 200 performs the decoding for the encoded stream generated by the image encoding apparatus 100 for each CU.

Specifically, the decoding section 210 of the image decoding apparatus 200 decodes the encoded stream generated by the image encoding apparatus 100 by using a predetermined decoding method corresponding to the encoding method in the encoding section 114. Specifically, the decoding section 210 decodes the encoding parameters (the header information Hinfo, the prediction information Pinfo, the transformation information Tinfo, and the like), and the encoded data of a syntax value of the quantization transformation coefficient level level from the bit stream of the encoded stream by using a predetermined decoding method corresponding to the encoding method in the encoding section 114.

For example, in the case where the prediction mode of the CU of the luminance component Y corresponding to the CU of the color components Cb and Cr as the decoding target is the intra BC prediction mode, the encoding section 114 decodes the encoded data of the syntax value of the prediction mode information of the CU of the color components Cb and Cr as the decoding target by using, as the context, that the prediction mode of the CU (PU) of the luminance component Y is the intra BC prediction mode.

The decoding section 210 decodes the encoding parameters and the quantization transformation coefficient level level from the syntax value of the encoding parameters and the quantization transformation coefficient level level which are obtained as a result of the decoding along the definition of the syntax table. The decoding section 210 sets the CUs (PU, TU) as the decoding target based on a split flag included in the encoding parameters.

The decoding section 210 supplies the encoding parameters to associated blocks. For example, the decoding section 210 supplies the prediction information Pinfo to the acquisition section 211, supplies the transformation information Tinfo to each of the inverse quantization section 212 and the inverse transformation section 213, and supplies the header information Hinfo to the associated blocks. In addition, the decoding section 210 supplies the quantization transformation coefficient level level to the inverse quantization section 212.

The acquisition section 211 acquires the prediction information Pinfo from the decoding section 210. The acquisition section 211 determines the motion vector of the CU (PU) as the decoding target based on the motion vector information of the prediction information Pinfo.

Specifically, for example, in the case where the PU as the decoding target is the PU of the color component Cb in which the prediction mode is the intra BC prediction mode, and the prediction mode of the PU of the luminance component Y corresponding to the PU is the intra BC prediction mode, the acquisition section 211 extracts the motion vector information used in the intra BC prediction processing for the PU of the luminance component Y of interest from the prediction information Pinfo. Then, in the case where the motion vector information of the PU of the color component Cb as the decoding target is MVCbSameAsLumaflag, to which 1 is set, the acquisition section 211 determines the motion vector indicated by the extracted motion vector information as the motion vector of the PU of the color component Cb as the decoding target.

On the other hand, in the case where the motion vector information of the PU of the color component Cb as the decoding target is MVCbSameAsLumaflag, to which 0 is set, and the difference dMVCb, the acquisition section 211 determines the addition value of the motion vector indicated by the extracted motion vector information, and the difference dMVCb as the motion vector of the PU of the color component Cb as the decoding target. In the case as well where the PU as the decoding target is the PU of the color component Cr in which the prediction mode is the intra BC prediction mode, a procedure is similar to that of the above case except that MVCbSameAsLumaflag is replaced with MVCrSameAsLumaflag, and the difference dMVCb is replaced with the difference dMVCr.

The acquisition section 211 supplies the prediction information Pinfo including the motion vector instead of including the motion vector information to the prediction section 216.

The inverse quantization section 212 scales (inverse-quantizes) the value of the quantization transformation coefficient level level supplied thereto from the decoding section 210 based on the transformation information Tinfo supplied thereto from the decoding section 210 to derive the transformation coefficient Coeff_IQ. This inverse quantization is inverse processing of the quantization which is performed by the quantization section 113 (FIG. 2) of the image encoding apparatus 100. It should be noted that the inverse quantization section 115 (FIG. 2) performs the inverse quantization similar to that in the inverse quantization section 212. The inverse quantization section 212 supplies the resulting transformation coefficients Coeff_IQ to the inverse transformation section 213.

The inverse transformation section 213 performs the inverse orthogonal transformation or the like for the transformation coefficient Coeff_IQ supplied thereto from the inverse quantization section 212 based on the transformation information Tinfo supplied thereto from the decoding section 210 to derive the prediction residue D'. The inverse orthogonal transformation or the like is the inverse processing of the orthogonal transformation or the like which is performed by the transformation section 112 (FIG. 2) of the image encoding apparatus 100. It should be noted that the inverse transformation section 116 performs the inverse orthogonal transformation or the like similar to that in the inverse transformation section 213. The inverse transformation section 213 supplies the resulting prediction residue D' to the calculation section 214.

The calculation section 214 adds the prediction residue D' supplied thereto from the inverse transformation section 213 and the prediction image P corresponding to the prediction residue D' to each other to derive the local decoded image Rec. The calculation section 214 rebuilds the decoded image for each picture unit by using the resulting local decoded image Rec and outputs the resulting decoded image to the outside of the image decoding apparatus 200. In addition, the calculation section 214 supplies the resulting local decoded image Rec to the frame memory 215 as well.

The frame memory 215 rebuilds the decoded image for each picture unit by using the local decoded image Rec supplied thereto from the calculation section 214, and stores the decoded image in the buffer within the frame memory 215. The frame memory 215 reads out the decoded image specified by the prediction section 216 as the reference image, and supplies the decoded image to the prediction section 216. In addition, the frame memory 215 may store the header information Hinfo, the prediction information Pinfo, the transformation information Tinfo, and the like pertaining to the generation of the decoded image in the buffer within the frame memory 215.

The prediction section 216 acquires the decoded image which is stored in the frame memory 215 as the reference image based on the prediction information Pinfo or the like supplied thereto from the acquisition section 211, and executes the intra BC prediction processing, the intra prediction processing of the predetermined prediction mode, or the inter prediction processing by using the reference image. The prediction section 216 supplies the prediction image P generated as a result of the execution to the calculation section 214.

(Explanation of Processing in Image Decoding Apparatus)

Figure 20:
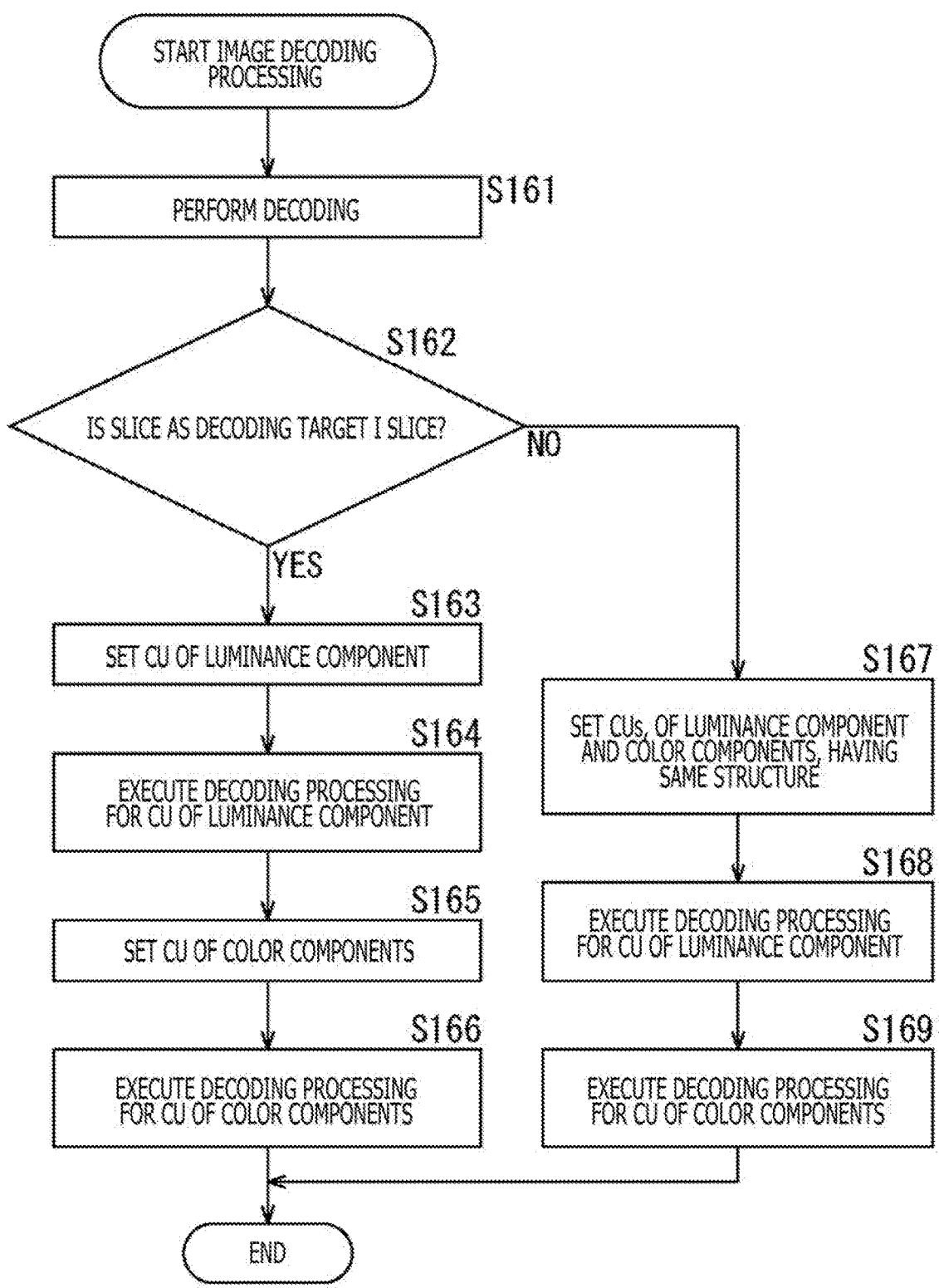
FIG. 20 is a flow chart explaining image decoding processing.

FIG. 20 is a flow chart explaining the image decoding processing in the image decoding apparatus 200 of FIG. 19. The image decoding processing, for example, is executed when the encoded stream is input to the image decoding apparatus 200.

In Step S161 of FIG. 20, the decoding section 210 decodes the encoded stream input thereto, and obtains the encoding parameters and the quantization transformation coefficient level level. The decoding section 210 supplies the encoding parameters to the associated blocks. In addition, the decoding section 210 supplies the quantization transformation coefficient level level to the inverse quantization section 212. Pieces of processing from Steps S162 to S169 which will be described later are executed in a slice unit.

In Step S162, the decoding section 210 decides whether or not the slice as the decoding target is the I slice based on the encoding parameters. In the case where it is decided in Step S162 that the slice as the decoding target is the I slice, the processing proceeds to Step S163.

In Step S163, the decoding section 210 sets the CU corresponding to the quantization transformation coefficient levels level of the luminance component Y as the CU as the decoding target based on the encoding parameters.

In Step S164, the image decoding apparatus 200 executes the decoding processing for the quantization transformation coefficient level level of the CU of the luminance component Y as the CU as the decoding target.

In Step S165, the decoding section 210 sets the CU corresponding to the quantization transformation coefficient levels level of the color components Cb and Cr as the CU as the decoding target based on the encoding parameters.

In Step S167, the image decoding apparatus 200 executes the decoding processing for the quantization transformation coefficient level level of the CU of the color components Cb and Cr as the decoding target, and the processing is encoded.

In the case where it is decided in Step S162 that the slice as the decoding target is not the I slice, the processing proceeds to Step S167.

In Step S167, the decoding section 210 sets the CUs having the same structure and corresponding to the quantization transformation coefficient levels level of the luminance component Y and the color components Cb and Cr as the CU as the decoding target based on the encoding parameters.

In Step S168, the image decoding apparatus 200 executes the decoding processing for the quantization transformation coefficient level level of the luminance component Y of the CU as the decoding target.

In Step S167, the image decoding apparatus 200 executes the decoding processing for the quantization transformation coefficient level level of the color component of the CU as the decoding target, and the processing is ended.

Figure 21:
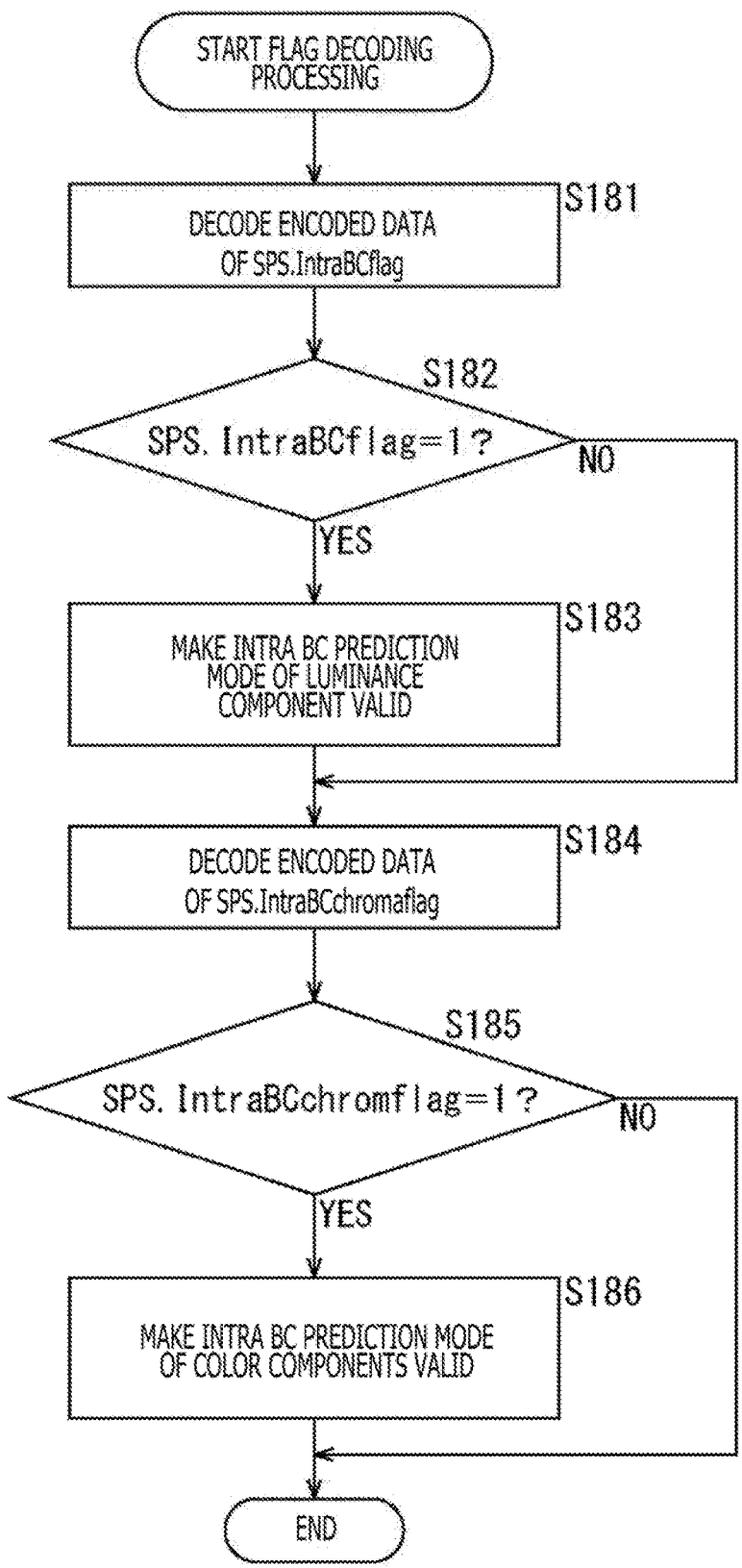
FIG. 21 is a flow chart explaining a first example of flag decoding processing.

FIG. 21 is, of Step S161 of FIG. 20, a flow chart explaining the flag decoding processing for decoding the encoded data of SPS.IntraBCflag or SPS.IntraBCchromaflag which is set by the flag setting processing of FIG. 14.

In Step S181 of FIG. 21, the decoding section 210 decodes the encoded data of SPS.IntraBCflag of the encoding parameters. In Step S182, the decoding section decides whether or not SPS.IntraBCflag obtained as a result of the decoding is 1 indicating that the intra BC prediction mode of the luminance component is made valid.

In the case where it is decided in Step S182 that SPS.IntraBCflag is 1, in Step S183, the decoding section 210 makes the intra BC prediction mode of the luminance component valid. In this case, for example, the prediction section 216 extracts PU.IntraBCflag from the prediction information Pinfo supplied thereto from the acquisition section 211. After execution of the processing in Step S183, the processing proceeds to Step S184.

In the case where it is decided in Step S182 that SPS.IntraBCflag is not 1, that is, in the case where SPS.IntraBCflag is 0 indicating that SPS.IntraBCflag does not make the intra BC prediction mode of the luminance components valid, the processing proceeds to Step S184.

In Step S184, the decoding section 210 decodes the encoded data of SPS.IntraBCchromaflag of the encoding parameters.

In Step S185, the decoding section 210 decides whether or not SPS.IntraBCchromaflag obtained as a result of the decoding is 1 indicating that the intra BC prediction mode of the color component is made valid.

In the case where it is decided in Step S185 that SPS.IntraBCchromaflag is 1, in Step S186, the decoding section 210 makes the intra BC prediction mode of the color component valid. In this case, for example, the prediction section 216 extracts PU.IntraBCchromaflag from the prediction information Pinfo supplied thereto from the acquisition section 211. After execution of the processing of Step S186, the processing is ended.

On the other hand, in the case where it is decided in Step S185 that SPS.IntraBCchromaflag is not 1, that is, in the case where SPS.IntraBCchromaflag is 0 indicating that the intra BC prediction mode of the color component is not made valid, the processing is ended.

Figure 22:
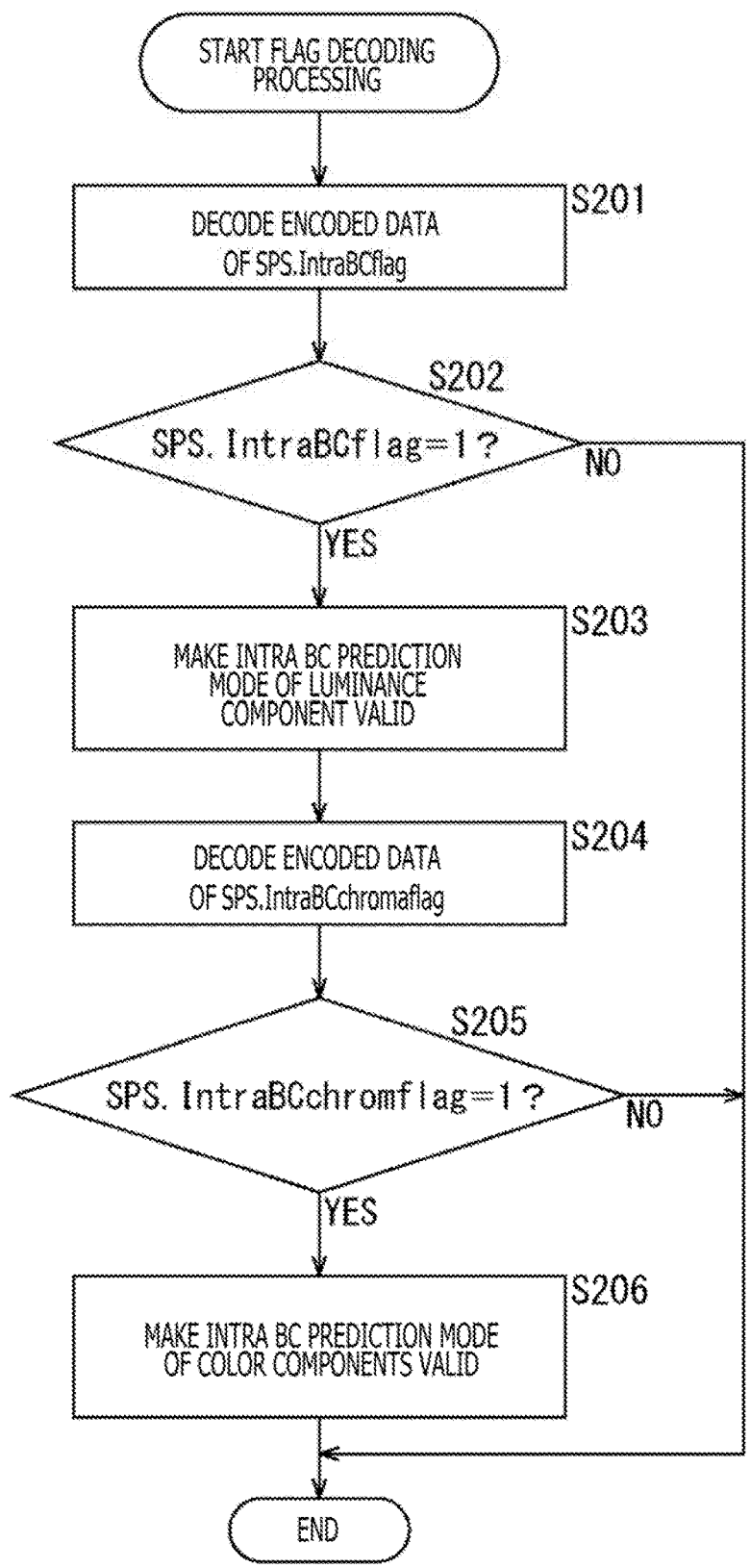
FIG. 22 is a flow chart explaining a second example of the flag decoding processing.

FIG. 22 is, of Step S161 of FIG. 20, a flow chart explaining flag decoding processing for decoding the encoded data of SPS.IntraBCflag or SPS.IntraBCchromaflag which is set by the flag setting processing of FIG. 15.

The flag decoding processing of FIG. 22 is different from the flag decoding processing of FIG. 21 in that the processing is ended in the case where it is decided in Step S182 of FIG. 21 that SPS.IntraBCflag is not 1. That is, although the pieces of processing of Steps S201 to S206 of FIG. 22 are similar to the pieces of processing of Steps S181 to S186 of FIG. 21, the processing is ended after completion of the processing of Step S202. In a word, only in the case where the intra BC prediction processing for the luminance component is valid, the decoding section 210 decodes the encoded data of SPS.IntraBCchromaflag.

Figure 23:
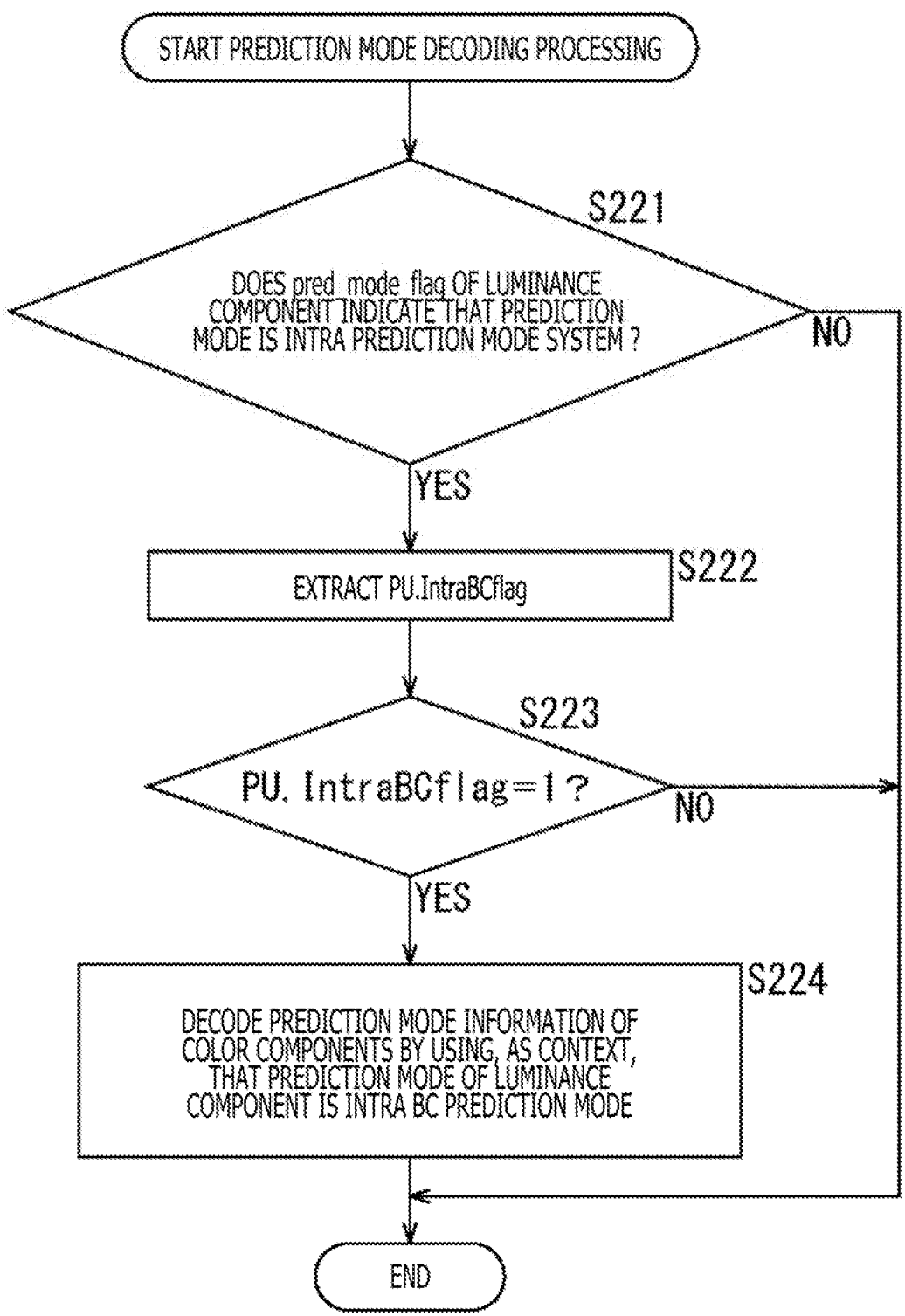
FIG. 23 is a flow chart explaining prediction mode decoding processing.

FIG. 23 is, of Step S161 of FIG. 20, a flow chart explaining prediction mode decoding processing for, in the case where the prediction mode of the PU of the luminance component Y is the intra BC prediction mode, decoding the prediction mode information of the PU of the color component Cb (or Cr) corresponding to the PU. The prediction mode decoding processing, for example, is executed in the PU unit of the color component Cb (or Cr).

In Step S221 of FIG. 23, the decoding section 210 decides whether or not decoded pred_mode_flag of the PU of the luminance component Y corresponding to the PU of the color component Cb (or Cr) as the processing target indicates that the prediction mode is the intra prediction mode system.

In the case where it is decided in Step S221 that decoded pred_mode_flag of the PU of the luminance component Y corresponding to the PU of the color component Cb (or Cr) as the processing target indicates that the prediction mode is the intra prediction mode system, the processing proceeds to Step S222.

In Step S222, the decoding section 210 extracts PU.IntraBCflag from the decoded prediction information Pinto of the PU of the luminance component Y corresponding to the color component Cb (or Cr) as the processing target.

In Step S223, the decoding section 210 decides whether or not PU.IntraBCflag extracted in Step S222 is 1. In the case where it is decided in Step S223 that PU.IntraBCflag extracted in Step S222 is 1, the processing proceeds to Step S224.

In Step S224, the decoding section 210 decodes the prediction mode information of the PU of the color component Cb (or Cr) as the processing target by using, as the context, that the prediction mode of the PU of the luminance component Y corresponding to the PU of the color component Cb (or Cr) as the processing target is the intra BC prediction mode. Then, the processing is ended.

On the other hand, in the case where it is decided in Step S221 that decoded pred_mode_flag of the PU of the luminance component Y corresponding to the PU of the color component Cb (or Cr) as the processing target does not indicate that the prediction mode is the intra prediction mode system, the processing is ended.

In addition, in the case where it is decided in Step S223 that PU.IntraBCflag extracted in Step S222 is not 1, the processing is ended.

Figure 24:
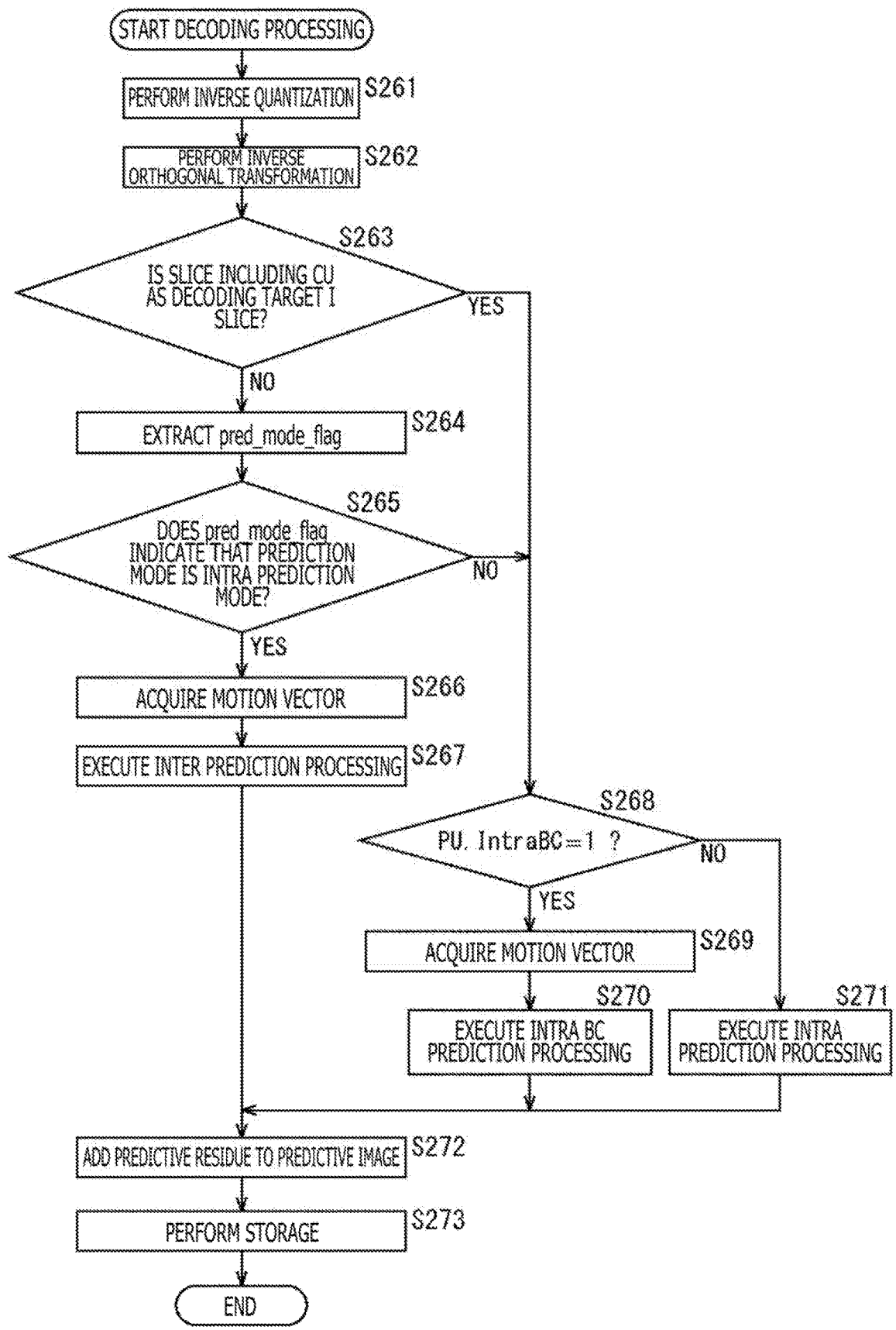
FIG. 24 is a flow chart explaining decoding processing.

FIG. 24 is a flow chart explaining the decoding processing which is executed in Steps S164, S166, S168, and S169 of FIG. 20. The decoding processing is executed for each CU as the decoding target.

In Step S261 of FIG. 24, the inverse quantization section 212 inverse-quantizes the quantization transformation coefficient level level of the CU as the decoding target which is supplied thereto from the decoding section 210 to derive the transformation coefficient Coeff_IQ. The inverse quantization is the inverse processing of the quantization which is performed in Step S104 (FIG. 17) of the image encoding processing, and is the processing similar to the inverse quantization which is performed in Step S105 (FIG. 17) of the image encoding processing.

In Step S262, the inverse transformation section 213 performs the inverse orthogonal transformation or the like for the transformation coefficient Coeff_IQ which is obtained in the processing of Step S261 to derive the prediction residue D'. The inverse orthogonal transformation or the like is the inverse processing of the orthogonal transformation or the like which is performed in Step S103 (FIG. 17) of the image encoding processing, and is the processing similar to the inverse orthogonal transformation or the like which is performed in Step S106 (FIG. 17) of the image encoding processing.

In Step S263, the acquisition section 211 decides whether or not the slice including the CU as the decoding target is an I slice based on the encoding parameters supplied thereto from the decoding section 210. In the case where it is decided in Step S263 that the slice including the CU as the decoding target is not the I slice, that is, in the case where the slice including the CU as the decoding target is either a P slice or a B slice, the processing proceeds to Step S264.

In Step S264, the acquisition section 211 extracts pred_mode_flag from the prediction information Pinfo of the CU (PU) as the decoding target which is supplied thereto from the decoding section 210. In Step S265, the prediction section 216 decides whether or not pred_mode_flag extracted in Step S264 indicates that the prediction mode is the inter prediction mode.

In the case where it is decided in Step S265 that pred_mode_flag extracted indicates that the prediction mode is the inter prediction mode, the processing proceeds to Step S266. In Step S266, the acquisition section 211 acquires the motion vector of the CU (PU) as the decoding target from the motion vector information of the prediction information Pinfo of the CU (PU) as the decoding target. The acquisition section 211 supplies the prediction information Pinfo including the motion vector instead of the motion vector information of the CU (PU) as the decoding target to the prediction section 216.

In Step S267, the prediction section 216 reads out the reference image from the frame memory 215 based on the prediction information Pinfo of the CU (PU) as the decoding target, and executes the inter prediction processing by using the reference image and the motion vector of the prediction information Pinfo. Then, the prediction section 216 supplies the prediction image P generated as a result of the processing to the calculation section 214, and the processing proceeds to Step S272.

On the other hand, in the case where it is decided in Step S263 that the slice including the CU as the decoding target is the I slice, or in the case where it is decided in Step S265 that pred_mode_flag does not indicate that the prediction mode is the inter prediction mode, the processing proceeds to Step S268.

In Step S268, the acquisition section 211 decides whether or not PU.IntraBCflag of the prediction information Pinfo of the CU (PU) as the decoding target which is supplied from the decoding section 210 is 1 indicating that the prediction processing is the intra BC prediction processing. In the case where it is decided in Step S268 that PU.IntraBCflag is 1, the processing proceeds to Step S269.

In Step S269, the acquisition section 211 acquires the motion vector of the CU (PU) as the decoding target from the motion vector information of the prediction information Pinfo of the CU (PU) as the decoding target. The acquisition section 211 supplies to the prediction information Pinfo including the motion vector instead of the motion vector information of the CU CPU) as the decoding target to the prediction section 216.

In Step S270, the prediction section 216 reads out, from the frame memory 215, the decoded image, including the PU as the decoding target, which is obtained through the local decoding as the reference image, based on the prediction information Pinfo of the CU (PU) as the decoding target, and executes the intra BC prediction processing by using the reference image and the motion vector of the prediction information Pinfo. Then, the prediction section 216 supplies the prediction image P generated as a result of the processing to the calculation section 214, and the processing proceeds to Step S272.

In the case where it is decided in Step S268 that PU.IntraBCflag is not 1, the acquisition section 211 supplies the prediction information Pinfo of the CU (PU) as the decoding target which is supplied from the decoding section 210 to the prediction section 216 as it is.

Then, in Step S271, the prediction section 216 reads out, from the frame memory 215, the decoded image, including the PU as the decoding target, which is obtained through the local decoding as the reference image, and executes the intra prediction processing of the prediction mode included in the prediction information Pinfo by using the reference image. Then, the prediction section 216 supplies the prediction image P generated as a result of the processing to the calculation section 214, and the processing proceeds to Step S272.

In Step S272, the calculation section 214 adds the prediction residue D' supplied thereto from the inverse transformation section 213 to the prediction image P supplied thereto from the prediction section 216 to derive the local decoded image Rec. The calculation section 214 rebuilds the decoded image for each picture unit by using the resulting local decoded image Rec, and outputs the resulting decoded image to the outside of the image decoding apparatus 200. In addition, the calculation section 214 supplies the resulting local decoded image Rec to the frame memory 215 as well.

In Step S273, the frame memory 215 rebuilds the decoded image for each picture unit by using the local decoded image Rec which is supplied thereto from the calculation section 214, and the resulting decoded image is stored in the buffer within the frame memory 215. Then, the processing is ended.

Figure 25:
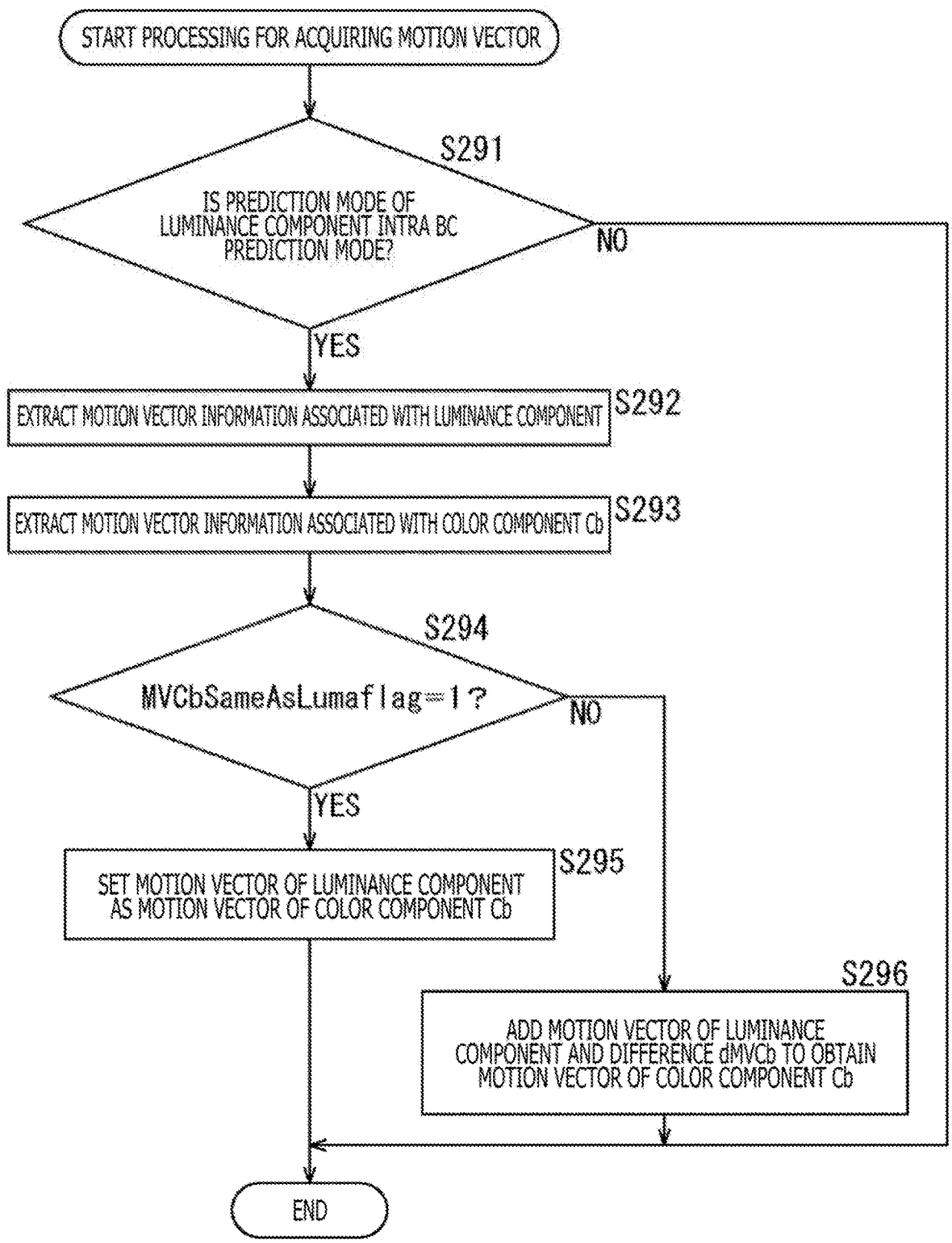
FIG. 25 is a flow chart explaining motion vector acquiring processing.

FIG. 25 is a flow chart explaining the motion vector acquiring processing, for acquiring the motion vector from the motion vector information, which is executed in the case where in Step S269 of FIG. 24, the PU as the decoding target is the PU of the color component Cb.

In Step S291 of FIG. 25, the acquisition section 211 decides whether or not the prediction mode of the PU of the luminance component Y corresponding to the PU of the color component Cb as the decoding target is the intra BC prediction mode. In the case where pred_mode_flag of the PU of the luminance component Y corresponding to the PU of the color component Cb as the decoding target indicates that the prediction mode is the intra prediction mode system, and PU.IntraBCflag is 1 indicating that the prediction mode of the PU is the intra BC prediction mode, the acquisition section 211 decides that the prediction mode of the PU is the intra BC prediction mode.

Then, in Step S292, the acquisition section 211 extracts the motion vector information of the PU of the luminance component Y corresponding to the PU of the color component Cb as the decoding target from the prediction information Pinfo which is supplied thereto from the decoding section 210.

In Step S293, the acquisition section 211 extracts the motion vector information from the prediction information Pinfo of the PU of the color component Cb as the decoding target.

In Step S294, the acquisition section 211 decides whether or not MVCbSameAsLumaflag of the motion vector information extracted in Step S293 is 1. In the case it is decided in Step S294 that MVCbSameAsLumaflag is 1, the processing proceeds to Step S295.

In Step S295, the acquisition section 211 sets the motion vector indicated by the motion vector information of the PU of the luminance component Y corresponding to the PU of the color component Cb as the decoding target which is extracted in Step S292 as the motion vector of the PU of the color component Cb as the decoding target. Then, the processing is encoded.

On the other hand, in the case it is decided in Step S294 that MVCbSameAsLumaflag is not 1, the processing proceeds to Step S296.

In Step S296, the acquisition section 211 adds the motion vector indicated by the motion vector information of the PU of the luminance component Y extracted in Step S292, and the difference dMVCb of the motion vector information extracted in Step S295 to each other to obtain the motion vector of the PU of the color component Cb as the decoding target. Then, the processing is ended.

Incidentally, in Step S269 of FIG. 24, the motion vector acquiring processing which is executed in the case where the PU as the decoding target is the PU of the color component Cr is similar to the case of the motion vector acquiring processing of FIG. 25 except that MVCbSameAsLumaflag is replaced with MVCrSameAsLumaflag, and that the difference dMVCb is replaced with the difference dMVCr.

(Another Configuration Example of Prediction Information Pinto)

In the above description, the intro BC prediction mode is set as the intra prediction mode system, that is, the mode belonging to the same group as that of the intra prediction mode. However, the intra BC prediction mode may be set as the mode belonging to a group different from that of the intra prediction mode.

Figure 26:
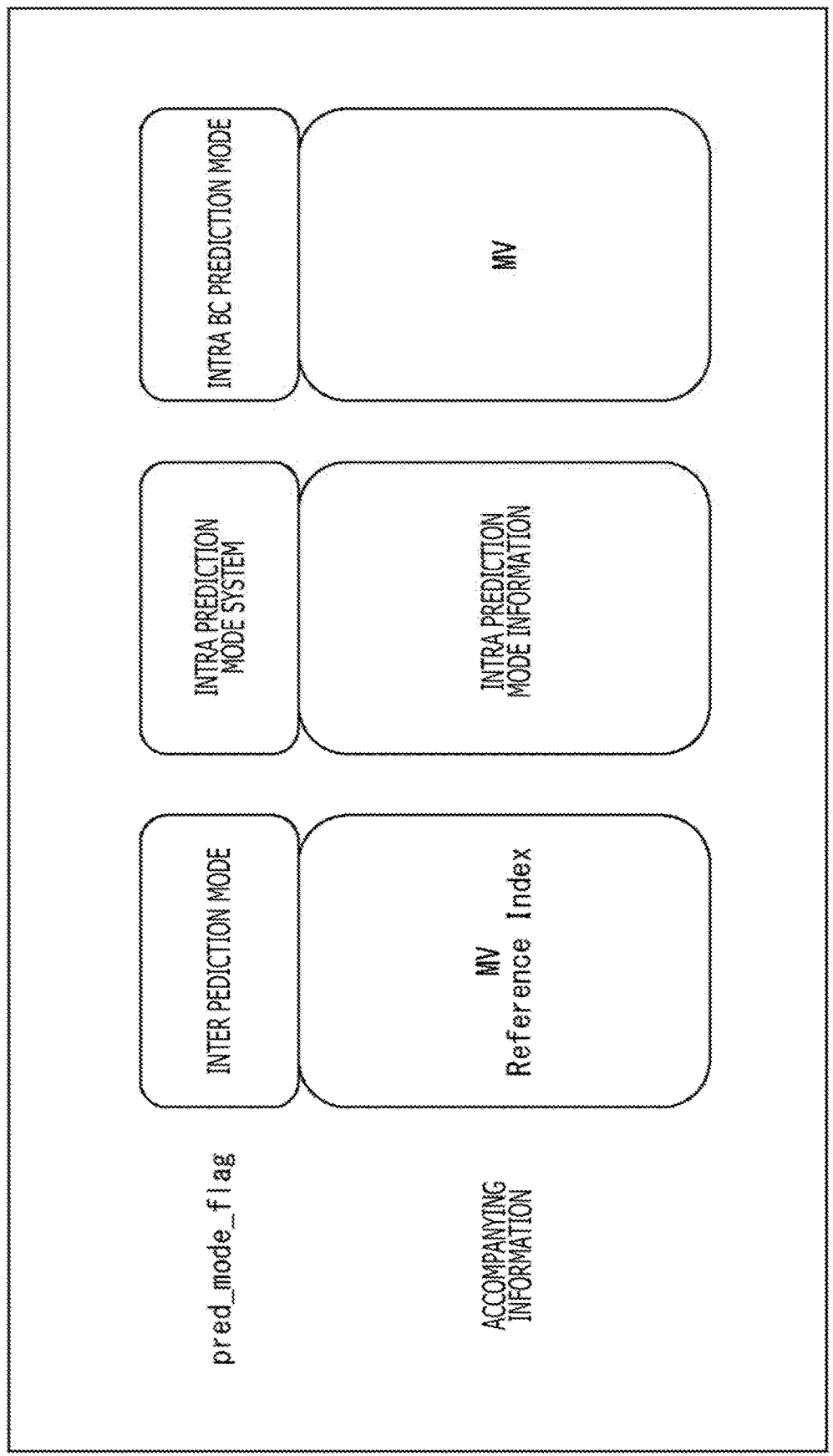
FIG. 26 is a view depicting a second example of the part of the configuration of the prediction information.

FIG. 26 is a view depicting an example of a part of a configuration of the prediction information Pinfo in this case.

In FIG. 26, pred_mode_flag of the prediction information Pinfo is the prediction mode information indicating that the prediction mode of the PU (CU) as the encoding target is the inter prediction mode, the intra prediction mode system (the intra prediction mode, the LMchroma prediction mode, the CrossColor prediction mode), or the intra BC prediction mode.

In the case where pred_mode_flag indicates that the prediction mode is the inter prediction mode, similarly to the case of FIG. 3, the prediction information Pinfo includes the motion vector (MV) used in the inter prediction processing, Referenceindex, and the like.

On the other hand, in the case where pred_mode_flag indicates that the prediction mode is the intra prediction mode system, the prediction information Pinfo includes the intra prediction mode information and the like. In addition, in the case where prod_mode_flag indicates that the prediction mode is the intra BC prediction mode, the prediction information Pinfo includes the motion vector (MV) and the like used in the intra BC prediction.

As described above, in the case of FIG. 26, since pred_mode_flag can indicate that the prediction mode is the intra BC prediction mode, no PU.IntraBCflag is set.

It should be noted that the prediction mode information indicating the LMchroma mode, and the prediction mode information indicating the CrossColor prediction mode are similar to these in the case of FIG. 3.

In addition, the intra BC prediction mode may be set as one of the prediction modes in the intra prediction mode. In this case, for example, when the prediction mode referred to as DC intra prediction, Planar intra prediction, and Angular intra prediction in the intra prediction mode, similarly to the case of HEVC, 35 prediction modes, 36th predict-on mode is set as the intra BC prediction mode.

Figure 27:
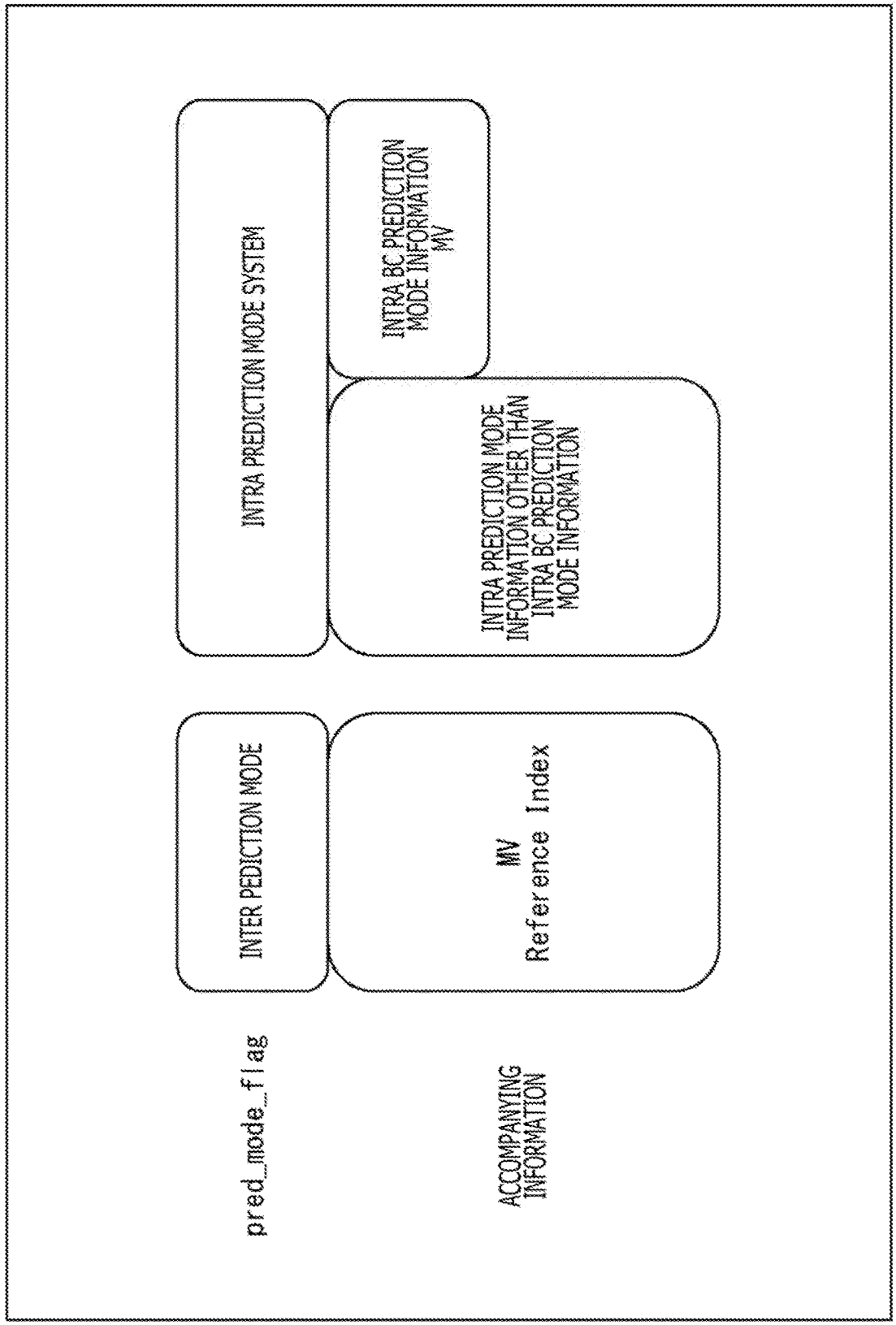
FIG. 27 is a view depicting a third example of the part of the configuration of the prediction information.

FIG. 27 is a view depicting an example of a part of a configuration of the prediction information Pinfo in this case.

In FIG. 27, pred_mode_flag of the prediction information Pinfo is the information indicating that the prediction mode of the PU (CU) as the encoding target is the inter prediction mode, or the intra prediction mode system (the intra prediction mode, the LMchroma prediction mode, CrossColor prediction mode).

In the case where pred_mode_flag indicates that the prediction mode is the inter prediction mode, pred_mode_flag is the prediction mode information. In this case, the prediction information Pinfo, similarly to the case of FIG. 3, includes the motion vector (MV) used in the inter prediction processing, Referenceindex, and the like.

On the other hand, in the case where pred_mode_flag indicates that the prediction mode is the intra prediction mode system, pred_mode_flag and the intra prediction mode information are the prediction mode information. In this case, when the intra prediction mode information is the intra prediction mode information other than the intra BC prediction mode information indicating that the prediction mode is the intra BC prediction mode, the prediction mode information indicates that the prediction mode is the intra prediction mode. Then, the prediction information Pinfo includes the intra prediction mode information and the like other than the intra BC prediction mode information.

On the other hand, when the intra prediction mode information is the intra BC prediction mode information, the prediction mode information indicates that the prediction mode is the intra BC prediction mode. Then, the prediction information Pinfo includes the intra BC prediction mode information, the motion vector (MV) used in the intra BC prediction, and the like.

As described above, since in the case of FIG. 27, the intra BC prediction mode can be indicated by the intra prediction mode information, no PU.IntraBCflag is set.

It should be noted that the prediction mode information indicating the LMchroma prediction mode, and the prediction mode information indicating the CrossColor prediction mode are similar to those in the case of FIG. 3.

In addition, in the case where the PU of the color component Cb (or Cr) is identical to the prediction mode of the PU of the luminance component Y corresponding to the PU, DM_LUMA (derived from luma intra mode) mode indicating that the prediction mode of the PU is the same as the prediction mode of the PU of the luminance component corresponding to the PU may be generated as the prediction mode information of the PU of the color component Cb (Cr). The DM_LUMA mode is the information indicating whether or not the prediction mode of the PU of the color component Cb (or Cr) is the same as the prediction mode of the PU of the luminance component Y corresponding to the PU.

Second Embodiment (Explanation of Computer to which the Present Disclosure is Applied)

The series of processing described above can be executed by hardware, or can be executed by software. In the case where the series of processing are executed by the software, a program composing the software is installed in a computer. Here, the computer includes a computer incorporated in a dedicated hardware, for example, a general-purpose personal computer which can perform various kinds of functions by installing various kinds of programs, and the like.

Figure 28:
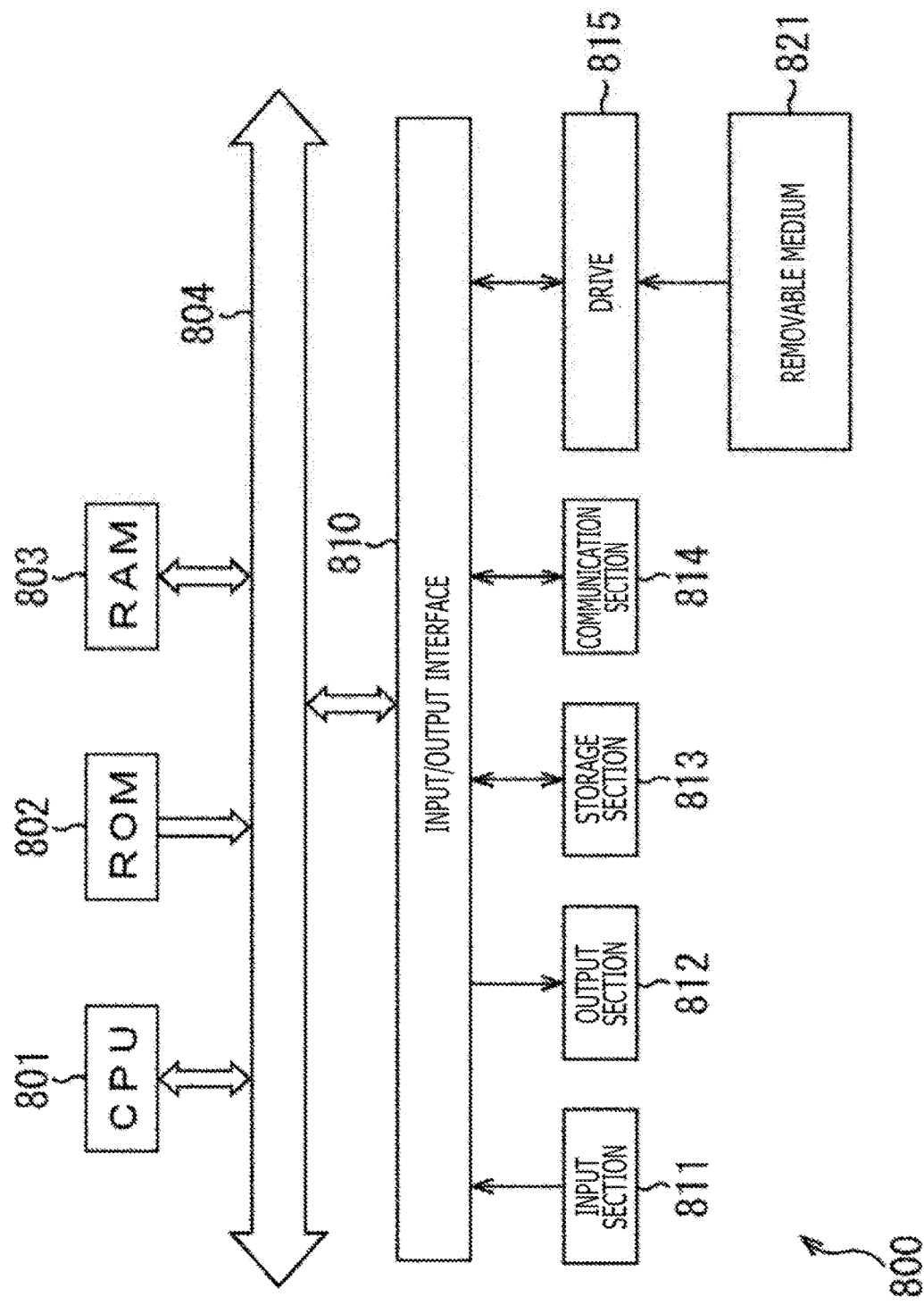
FIG. 28 is a block diagram depicting a configuration example of hardware of a computer.

FIG. 28 is a block diagram depicting an example of a configuration of hardware of a computer which executes the series of processing in accordance with a program.

In a computer 800, a CPU (Central Processing Unit) 801, a ROM (Read Only Memory) 802, a RAM (Random Access Memory) 803 are connected to one another through a bus 804.

An input/output interface 810 is further connected to the bus 804. An input section 811, an output section 812, a storage section 813, a communication section 814, and a drive 815 are connected to the input/output interface 810.

The input section 811 includes a keyboard, a mouse, a microphone, or the like. The output section 812 includes a display, a speaker, an output terminal, or the like. The storage section 813 includes a hard disk, a non-volatile memory, or the like. The communication section 814 includes a network interface or the like. The drive 815 drives a removable medium 821 such as a magnetic disk, an optical disk, a magneto-optical disk or a semiconductor memory.

In the computer 800 configured in the manner as described above, the CPU 801, for example, loads a program stored in the storage section 813 into the RAM 803 through the input/output interface 810 and the bus 804, and executes the program, thereby executing the series of processing described above.

The program which is to be executed by the computer 800 (CPU 801), for example, can be recorded in the removable medium 821 as a package medium or the like to be provided. In addition, the program can be provided through a wired or wireless transmission medium such as a local area network, the Internet, or digital satellite broadcasting.

In the computer 800, the drive 815 is equipped with the removable medium 821, thereby enabling the program to be installed in the storage section 813 through the input/output interface 810. In addition, the program can be received at the communication section 814 through the wired or wireless transmission medium and can be installed in the storage section 813. In addition thereto, the program can also be previously installed in the RCM 802 or the storage section 813.

Incidentally, the program which the computer 800 executes may be a program in accordance with which the pieces of processing are executed in time series along the order described in the present description, or may be a program in accordance with which the pieces of processing are executed at a necessary timing such as the time when a call is made.

Third Embodiment

Figure 29:
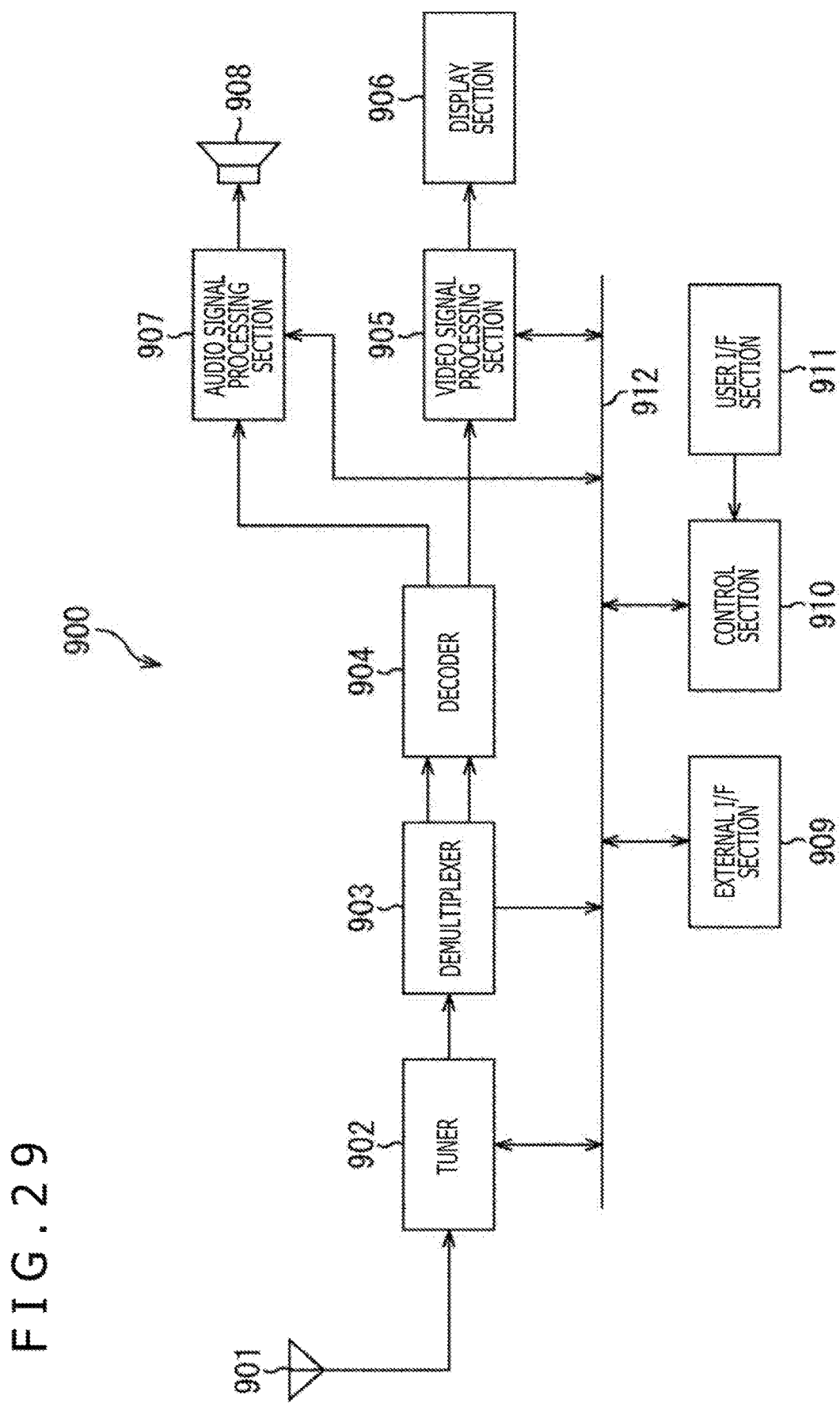
FIG. 29 is a block diagram depicting an example of a schematic configuration of a television apparatus.

FIG. 29 depicts an example of a schematic configuration of a television apparatus to which suitable one of the embodiments described above is applied. The television apparatus 900 is provided with an antenna 901, a tuner 902, a demultiplexer 903, a decoder 904, a video signal processing section 905, a display section 906, an audio signal processing section 907, a speaker 908, an external interface (I/F) section 909, a control section 910, a user interface (I/F) section 911, and a bus 912.

The tuner 902 extracts a signal of a desired channel from the broadcasting signal received through the antenna 901, and demodulates the extracted signal. Then, the tuner 902 outputs an encoded bit stream obtained through the demodulation to the demultiplexer 903. That is, the tuner 902 has a role as a transmission section in the television apparatus 900 for receiving the encoded stream in which the image is encoded.

The demultiplexer 903 separates a video stream and an audio stream of a program of a viewing target from the encoded bit stream, and outputs the video stream and the audio stream which are obtained through the separation to the decoder 904. In addition, the demultiplexer 903 extracts auxiliary data such as EPG (Electronic Program Guide) from the encoded bit stream, and supplies the data thus extracted to the control section 910. It should be noted that in the case where the encoded bit stream is scrambled, the demultiplexer 903 may perform the descrambling.

The decoder 904 decodes the video stream and the audio stream which are input thereto from the demultiplexer 903. Then, the decoder 904 outputs the video data generated through the decoding processing to the video signal processing section 905. In addition, the decoder 904 outputs the audio data generated through the decoding processing to the audio signal processing section 907.

The video signal processing section 905 reproduces the video data input thereto from the decoder 904, and causes the display section 906 to display thereon a video. In addition, the video signal processing section 905 may cause the display section 906 to display thereon an application screen image which is supplied through a network. In addition, the video signal processing section 905 may execute additional processing such as noise removal for the video data in response to the setting. Moreover, the video signal processing section 905, for example, may generate an image of a GUI (Graphical User Interface) such as a menu, a button, or a cursor, and may superimpose the image thus generated on the output image.

The display section 906 is driven in accordance with a drive signal supplied thereto from the video signal processing section 905 to display thereon a video or an image on a video surface of a display device (for example, a liquid crystal display, a plasma display, an OELD (Organic Electroluminescence Display), or the like).

The audio signal processing section 907 executes reproducing processing such as D/A conversion and amplification for the audio data input thereto from the decoder 904, and causes the speaker 908 to output the sound. In addition, the audio signal processing section 907 may execute additional processing such as the noise removal for the audio data.

The external interface section 909 is an interface through which the television apparatus 900 and an external apparatus or a network are connected to each other. For example, the video stream or the audio stream which is received through the external interface section 909 may be decoded tier decoder 904. That is, the external interface section 909 has also the role as the transmission section in the television apparatus 900 which receives the encoded stream in which the image is encoded.

The control section 910 has a processor such as a CPU, and memories such as a RAM and a ROM. The memory stores therein the program which is to be executed by the CPU, program data, EPG data, data acquired through the network, and the like. The program stored in the memory, for example, is read out by the CPU at the time of activation of the television apparatus 900 to be executed. By executing the program, the CPU controls an operation of the television apparatus 900 is accordance with a manipulation signal, for example, input thereto from the user interface section 911.

The user interface section 911 is connected to the control section 910. The user interface section 911, for example, has a button and a switch with which a user manipulates the television apparatus 900, a reception section receiving a remote control signal, and the like. The user interface section 911 detects a manipulation by the user through these constituent elements to generate a manipulation signal, and outputs the manipulation signal thus generated to the control section 910.

The tuner 902, the demultiplexer 903, the decoder 904, the video signal processing section 905, the audio signal processing section 907, the external interface section 909, and the control section 910 are connected to one another through the bus 912.

In the television apparatus 900 configured in such a manner, the decoder 904 may have a function of the image decoding apparatus 200 described above. In a word, the decoder 904 may decode the encoded data in accordance with suitable one of the methods described in the embodiments described above. By adopting such a procedure, the television apparatus 900 can achieve the effects similar to those of the embodiments described above by referring to FIGS. 1 to 27.

In addition, in the television apparatus 900 configured in such a manner, the video signal processing section 905, for example, may encode the image data supplied thereto from the decoder 904, and may be able to output the resulting encoded data to the outside of the television apparatus 900 through the external interface section 909. Then, the video signal processing section 905 may have a function of the image encoding apparatus 100 described above. In a word, the video signal processing section 905 may encode the image data supplied thereto from the decoder 904 in accordance with suitable one of the methods described in the embodiments described above. By adopting such a procedure, the television apparatus 900 can achieve the effects similar to those of the embodiments described above by referring to FIGS. 1 to 27.

Fourth Embodiment

Figure 30:
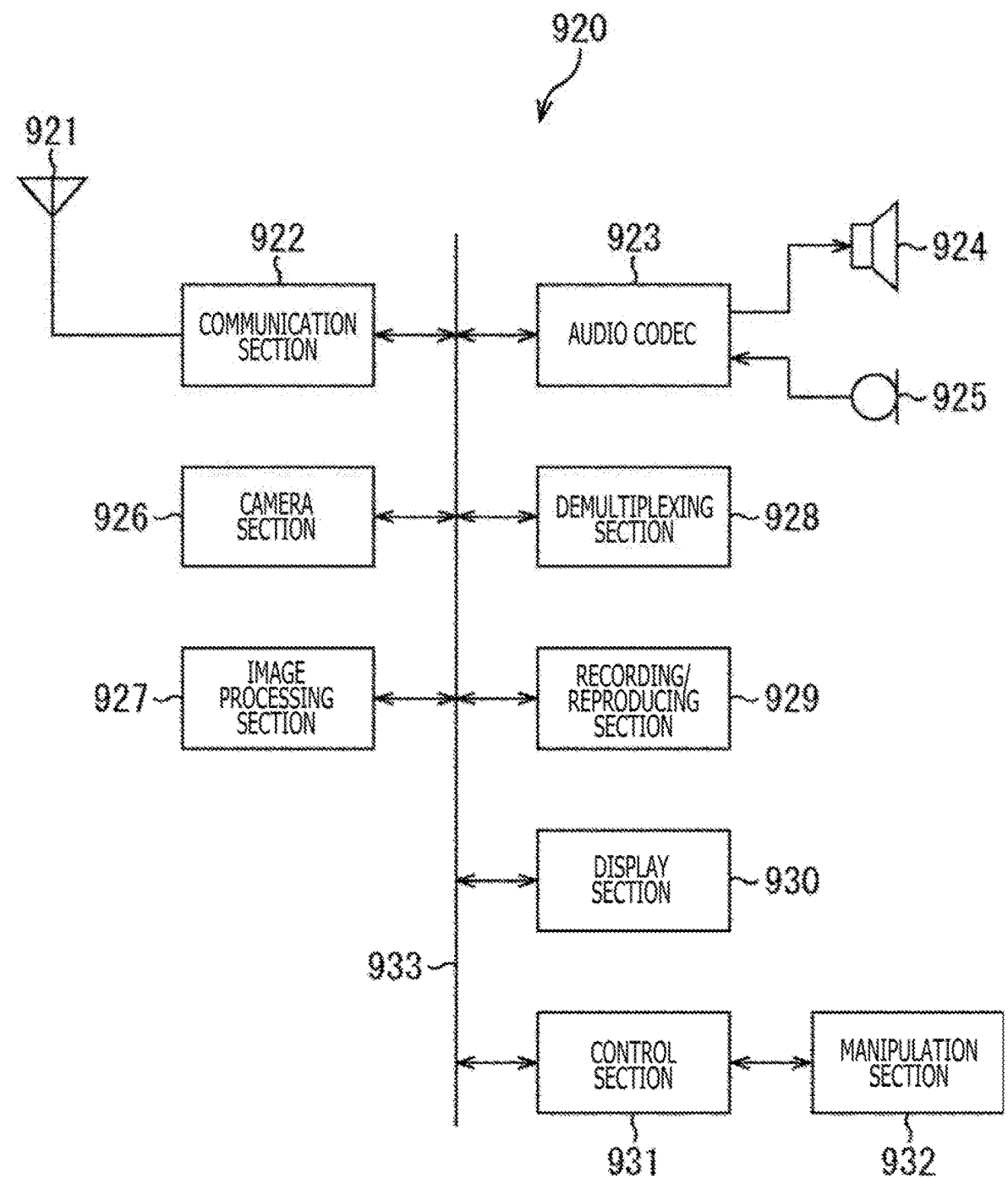
FIG. 30 is a block diagram depicting an example of a schematic configuration of a portable telephone.

FIG. 30 depicts an example of a schematic configuration of a portable telephone to which suitable one of the embodiments described above is applied. The portable telephone 920 is provided with an antenna 921, a communication section 922, an audio codec 923, a speaker 924, a microphone 925, a camera section 926, an image processing section 927, a demultiplexing section 928, a recording/reproducing section 929, a display section 930, a control section 931, a manipulation section 932, and a bus 933.

The antenna 921 is connected to the communication section 922. Each of the speaker 924 and the microphone 925 is connected to the audio codec 923. The manipulation section 932 is connected to the control section 931. The communication section 922, the audio codec 923, the camera section 926, the image processing section 927, the demultiplexing section 928, the recording/reproducing section 929, the display section 930, and the control section 931 are connected to one another through the bus 933.

The portable telephone 920 performs the operations such as the transmission/reception of the audio signal, the transmission/reception of an electronic mail or image data, the imaging of an image, and the recording of data in various operation modes including an audio telephone call mode, a data communication mode, an imaging mode, and a TV phone mode.

In the audio telephone call mode, an analog audio signal generated by the microphone 925 is supplied to the audio codec 923. The audio codec 923 converts the analog audio signal into the audio data, and A/D-converts and compresses the converted audio data. Then, the audio codec 923 outputs the audio data after the compression to the communication section 922. The communication section 922 encodes and modulates the audio data to generate a transmission signal. Then, the communication section 922 transmits the generated transmission signal to a base station (not depicted) through the antenna 921. In addition, the communication section 922 amplifies and frequency-converts the wireless signal received through the antenna 921 to acquire a reception signal. Then, the communication section 922 demodulates and decodes the reception signal to generate the audio data, and outputs the generated audio data to the audio codec 923. The audio codec 923 expands and D/A-converts the audio data to generate an analog audio signal. Then, the audio codec 923 supplies the generated audio signal to the speaker 924 which is in turn caused to output the sound.

In addition, in the data communication mode, for example, the control section 931 generates character data composing the electronic mail in response to a manipulation made by the user through the manipulation section 932. In addition, the control section 931 causes the display section 930 to display thereon characters. In addition, the control section 931 generates electronic mail data in response to a transmission instruction issued from the user through the manipulation section 932, and outputs the generated electronic mail data to the communication section 922. The communication section 922 encodes and modulates the electronic mail data to generate a transmission signal. Then, the communication section 922 transmits the generated transmission signal to the base station (not depicted) through the antenna 921. In addition, the communication section 922 amplifies and frequency-converts the wireless signal received through the antenna 921 to acquire the received signal. Then, the communication section 922 demodulates and decodes the received signal to restore the electronic mail data, and outputs the restored electronic mail data to the control section 931. The control section 931 causes the display section 930 to display thereon the contents of the electronic mail, and supplies the electronic mail data to the recording/reproducing section 929 to cause the recording/reproducing section 929 to write the electronic mail data to the storage medium.

The recording/reproducing section 929 has a readable and writable arbitrary storage medium. For example, the storage medium may be a built-in storage medium such as a RAM or a flash memory, or may be an external-mounted storage medium such as a hard disk, a magnetic disk, a magneto-optical disk, an optical disk, a USB (Universal Serial Bus) memory, or a memory card.

In addition, in the imaging mode, for example, the camera section 926 images a subject to generate image data, and outputs the resulting image data to the image processing section 927. The image processing section 927 encodes an image data input thereto from the camera section 926, and supplies the encoded stream to the recording/reproducing section 929 to cause the recording/reproducing section 929 to write the encoded stream to the storage medium thereof.

Moreover, in the image display mode, the recording/reproducing section 929 reads out the encoded stream recorded in the storage medium, and outputs the encoded stream thus read out to the image processing section 927. The image processing section 927 decodes the encoded stream input thereto from the recording/reproducing section 929, supplies the image data to the display section 930 to cause the display section 930 to display thereon the image.

In addition, in the TV phone mode, for example, the demultiplexing section 928 multiplexes the video stream encoded by the image processing section 927, and the audio stream input thereto from the audio codec 923, and outputs the stream obtained through the multiplexing to the communication section 922. The communication section 922 encodes and modulates the stream to generate a transmission signal. Then, the communication section 922 transmits the generated transmission signal to the base station (not depicted) through the antenna 921. In addition, the communication section 922 amplitudes and frequency-converts the wireless signal received through the antenna 921 to acquire the reception signal. The encoded bit stream may be included in each of the transmission signal and the reception signal. Then, the communication section 922 demodulates and decodes the reception signal to restore the stream, and outputs the restored stream to the demultiplexing section 928. The demultiplexing section 928 separates the video stream and the audio stream from the input stream, and outputs the video stream and the audio stream to the image processing section 927 and the audio codec 923, respectively. The image processing section 927 decodes the video stream to generate a video data. The video data is supplied to the display section 930, and the display section 930 displays thereon a series of images. The audio codec 923 expands and D/A-converts the audio stream to generate an analog audio signal. Then, the audio codec 923 supplies the generated analog audio signal to the speaker 924 to cause the speaker 924 to output the sound.

In the portable telephone 920 configured in such a manner, for example, the image processing section 927 may have the function of the image encoding apparatus 100 described above. In a word, the image processing section 927 may encode the image data in accordance with suitable one of the methods described in the embodiments described above. By adopting such a procedure, the portable telephone 920 can offers the effects similar to those of the embodiments described with reference to FIGS. 1 to 27.

In addition, in the portable telephone 920 configured in such a manner, for example, the image processing section 927 may have the function of the image decoding apparatus 200 described above. In a word, the image processing section 927 may decode the encoded data in accordance with suitable one of the methods described in the above embodiments. By adopting such a procedure, the portable telephone 920 can achieve the effects similar to those of the embodiments described with reference to FIGS. 1 to 27.

Fifth Embodiment

Figure 31:
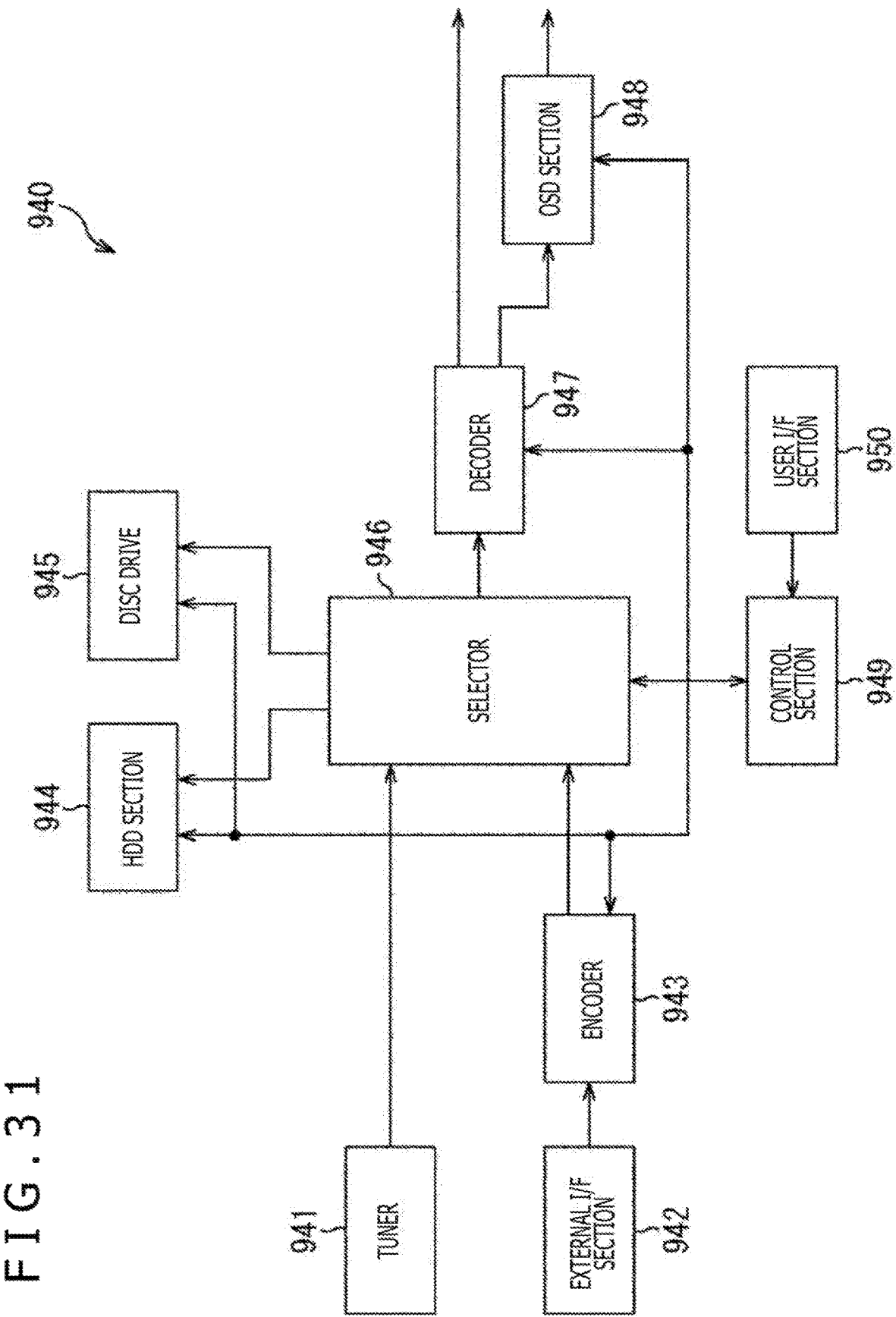
FIG. 31 is a block diagram depicting an example of a schematic configuration of a recording/reproducing apparatus.

FIG. 31 depicts an example of a schematic configuration of a recording/reproducing apparatus to which suitable one of the embodiments described above is applied. The recording/reproducing apparatus 940, for example, encodes the audio data and video data of a received broadcasting program, and records the encoded data in a recording medium. In addition, the recording/reproducing apparatus 940, for example, may encode the audio data and the video data which are acquired from other apparatus, and may recode the encoded data in the recording medium. In addition, the recording/reproducing apparatus 940, for example, reproduces the data recorded in the recording medium on a monitor and a speaker in accordance with an instruction of the user. At this time, the recording/reproducing apparatus 940 decodes the audio data and the video data.

The recording/reproducing apparatus 940 is provided with a tuner 941, an external interface (I/F) section 942, an encoder 943, an HDD (Hard Disk Drive) section 944, a disk drive 945, a selector 946, a decoder 947, an OSD (On-Screen Display) section 948, a control section 949, and a user interface (I/F) section 950.

The tuner 941 extracts a signal of a desired channel from a broadcasting signal received through an antenna (not depicted), and demodulates the extracted signal. Then, the tuner 941 outputs an encoded bit stream obtained through the demodulation to the selector 946. That is, the tuner 941 has a role as a transmission section in the recording/reproducing apparatus 940.

The external interface section 942 is an interface through which the recording/reproducing apparatus 940 and an external apparatus or a network are connected to each other. The external interface section 942, for example, may be an IEEE (Institute of Electrical and Electronic Engineers) 1394 interface, a network interface, a USB interface, or a flash memory interface, or the like. For example, the video data and the audio data which are received through the external interface section 942 are input to the encoder 943. That is, the external interface section 942 has the role as the transmission section in the recording/reproducing apparatus 940.

In the case where the video data and the audio data which are input from the external interface section 942 are not encoded, the encoder 943 encodes the video data and the audio data. Then, the encoder 943 outputs the encoded bit stream to the selector 946.

The HDD section 944 records encoded bit stream obtained by compressing content data such as videos and audios, various kinds of programs, and other data in an internal hard disk. In addition, the HDD section 944, at the time of reproduction of the video and the audio, reads out these pieces of data from the hard disk.

The disk drive 945 performs the recording and reading out of the data in and from the mounted recording medium. The recording medium with which the disk drive 945 is equipped, for example, may be a DVD (Digital Versatile Disc) disc (DVD-Video, or DVD-RAM (DVD-Random. Access Memory), a DVD-R (DVD-Recordable), a DVD-RW (DVD-Rewritable), a DVD+R (DVD+Recordable), a DVD+RW (DVD+Rewritable), or the like), a Blu-ray (registered trademark) disc, or the like.

The selector 946, at the time of recording of the video and the audio, selects the encoded bit stream input thereto from either the tuner 941 or the encoder 943, and outputs the encoded bit stream thus selected to either the HDD 944 or the disk drive 945. In addition, the selector 946, at the time of reproduction of the video and the audio, outputs the encoded bit stream input thereto from either the HDD 944 or the disk drive 945 to the decoder 947.

The decoder 947 decodes the encoded bit stream to generate the video data and the audio data. Then, the decoder 947 outputs the resulting video data to the OSD section 948. In addition, the decoder 947 outputs the resulting audio data to an external speaker.

The OSD section 948 reproduces the video data input thereto from the decoder 947 to display the resulting image. In addition, the OSD section 948, for example, may superimpose as image of GUI such as a menu, a button or a cursor on the displayed image.

The control section 949 has a processor such as a CPU, and memories such as a RAM and a ROM. The memory stores therein a program which is to be executed by the CPU, program data and the like. The program stored in the memory, for example, is read out by the CPU at the time of activation of the recording/reproducing apparatus 940 to be executed. By executing the program, the CPU, for example, controls an operation of the recording/reproducing apparatus 940 in response to a manipulation signal input thereto from the user interface section 950.

The user interface section 950 is connected to the control section 949. The user interface section 950, for example, has a button and a switch for manipulating the recording/reproducing apparatus 940 by the user, a reception section of a remote control signal, and the like. The user interface section 950 detects the manipulation by the user through these constituent elements to generate a manipulation signal, and outputs the resulting manipulation signal to the control section 949.

In the recording/reproducing apparatus 940 configured in such a manner, for example, the encoder 943 may have the function of the image encoding apparatus 100 described above. In a word, the encoder 943 may encode the image data in accordance with the suitable one of the methods in the embodiment described above. By adopting such a procedure, the recording/reproducing apparatus 940 can achieve the effects similar to those of the embodiments described with reference to FIGS. 1 to 27.

In addition, in the recording/reproducing apparatus 940 configured in such a manner, for example, the decoder 947 may have the function of the image decoding apparatus 200 described above. In a word, the decoder 947 may decode the encoded data in accordance with suitable one of the methods described in the above embodiments. By adopting such a procedure, the recording/reproducing apparatus 940 can achieve the effects similar to those of the embodiments described with reference to FIGS. 1 to 27.

Sixth Embodiment

Figure 32:
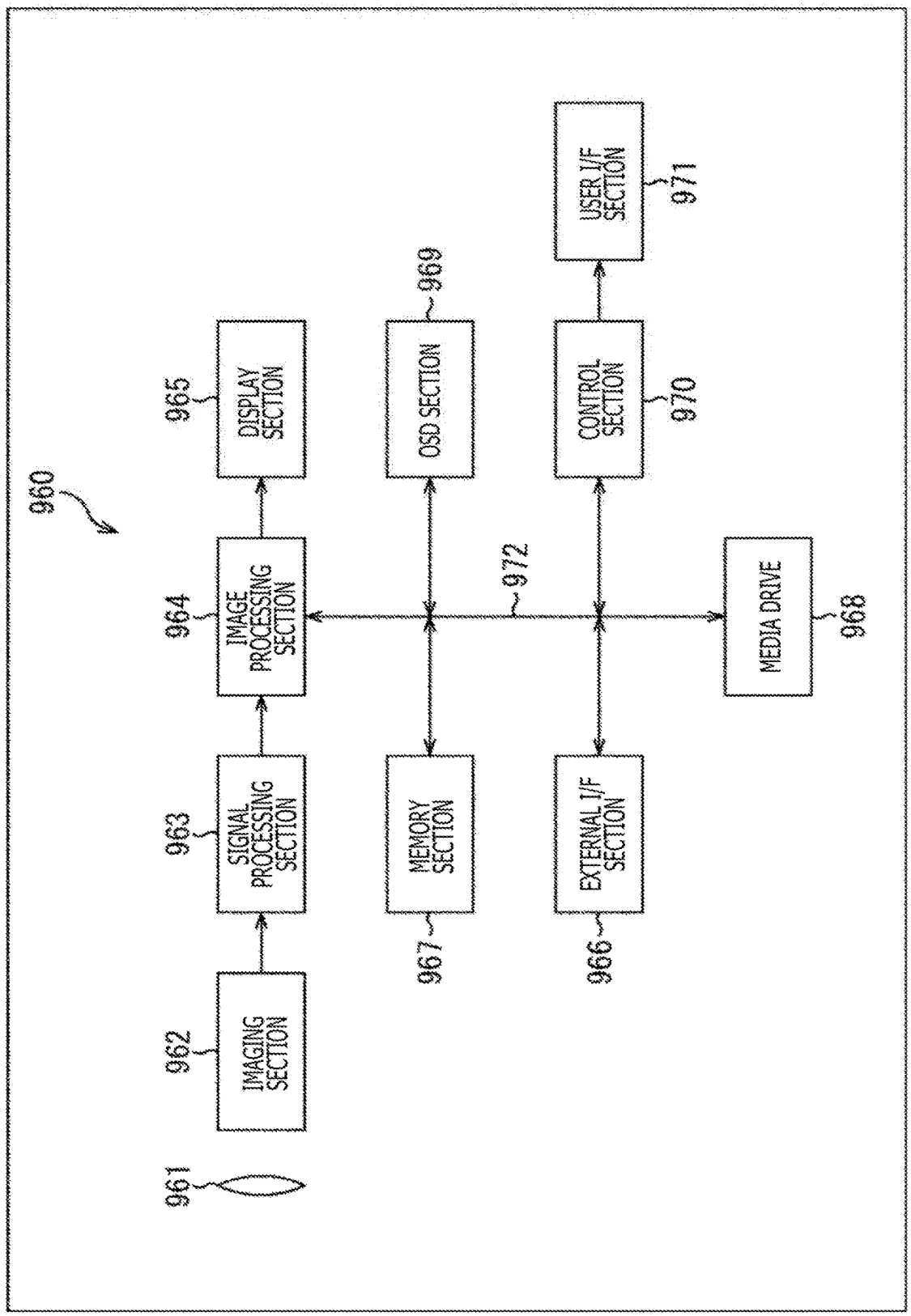
FIG. 32 is a block diagram depicting an example of a schematic configuration of an imaging apparatus.

FIG. 32 depicts an example of a schematic configuration of an imaging apparatus to which suitable one of the embodiments described above is applied. The imaging apparatus 960 images a subject to generate an image, and encodes the image data which is in turn recorded in a recording medium.

The imaging apparatus 960 is provided with an optical block 961, an imaging section 962, a signal processing section 963, an image processing section 964, a display section 965, an external interface (I/F) section 966, a memory section 967, a media drive 968, an OSD section 969, a control section 970, a user interface (I/F) section 971, and a bus 972.

The optical block 961 is connected to the imaging section 962. The imaging section 962 is connected to the signal processing section 963. The display section 965 is connected to the image processing section 964. The user interface section 971 is connected to the control section 970. The image processing section 964, the external interface section 966, the memory section 967, the media drive 968, the OSD section 969, and the control section 970 are connected to one another through the user interface section 971.

The optical block 961 has a focus lens, a stop mechanism, and the like. The optical block 961 images an optical image of a subject on an imaging surface of the imaging section 962. The imaging section 962 has as image sensor such as a CCD (Charge Coupled Derive) or a CMOS (Complementary Metal Oxide Semiconductor), and transforms the optical image imaged on the imaging surface into an image signal as an electric signal through photoelectric transformation. Then, the imaging section 962 outputs the image signal to the signal processing section 963.

The signal processing section 963 executes various pieces of camera signal processing such as knee correction, gamma correction, and color correction for the image signal input thereto from the imaging section 962. The signal processing section 963 outputs the image data after the camera signal processing to the image processing section 964.

The image processing section 964 encodes the image data input thereto from the signal processing section 963 to generate the encoded data. Then, the image processing section 964 outputs the generated encoded data to either the external interface section 966 or the media drive 968. In addition, the image processing section 964 decodes the encoded data input thereto either from the external interface section 966 or from the media drive 968 to generate the image data. Then, the image processing section 964 outputs the generated image data to the display section 965. In addition, the image processing section 964 may output the image data input thereto from the signal processing section 963 to the display section 965, and may cause the display section 965 to display thereon the image. In addition, the image processing section 964 may superimpose data for display acquired from the OSD section 969 on the image which is to be output to the display section 965.

The OSD section 969, for example, generates an image of GUI such as a menu, a button or a cursor, and outputs the generated image to the image processing section 964.

The external interface section 966, for example, is configured in the form of a USB input/output terminal. For example, at the time of printing of an image, the imaging apparatus 960 and a printer are connected to each other through the external interface section 966. In addition, a drive is connected to the external interface section 966 as may be necessary. For example, a removable medium such as a magnetic disk or an optical disk can be mounted to the drive, and a program read out from the removable medium can be installed in the imaging apparatus 960. Moreover, the external interface section 966 may be configured in the form of a network interface which is connected to a network such as a LAN or the Internet. That is, the external interface section 966 has a role as a transmission section in the imaging apparatus 960.

A recording medium mounted to the media drive 968, for example, may be a readable and writable removable medium such as a magnetic disk, a magneto-optical disk, an optical disk, or a semiconductor memory. In addition, the recording medium may be fixedly mounted to the media drive 968 and, for example, a non-transportable storage section such as a built-in hard disk drive or an SSD (Solid State Drive) may be configured.

The control section 970 has a processor such as a CPU, and memories such as a RAM and a ROM. The memory stores therein a program which is to be executed by the CPU, program data, and the like. The program stored in the memory, for example, is read out at the time of activation of the imaging apparatus 960 by the CPU, and is executed. The CPU executes the program, thereby, for example, controlling the operation of the imaging apparatus 960 in accordance with a manipulation signal input thereto from the user interface section 971.

The user interface section 971 is connected to the control section 970. The user interface section 971, for example, has a button, a switch, and the like for manipulating the imaging apparatus 960. The user interface section 971 detects the manipulation by the user through these constituent elements to generate a manipulation signal, and outputs the resulting manipulation signal to the control section 970.

In the imaging apparatus 960 configured in such a manner, for example, the image processing section 964 may have the function of the image encoding apparatus 100 described above. In a word, the image processing section 964 may encode the image data in accordance with suitable one of the methods described in the above embodiments. By adopting such a procedure, the imaging apparatus 960 can achieve the effects similar to those of the embodiments described above with reference to FIGS. 1 to 27.

In addition, in the imaging apparatus 960 configured in such a manner, for example, the image processing section 964 may have the function of the image decoding apparatus 200 described above. In a word, the image processing section 964 may decode the encoded data in accordance with suitable one of the methods described in the above embodiments. By adopting such a procedure, the imaging apparatus 960 can achieve the effects similar to those of the embodiments described above with reference to FIGS. 1 to 27.

Seventh Embodiment

Figure 33:
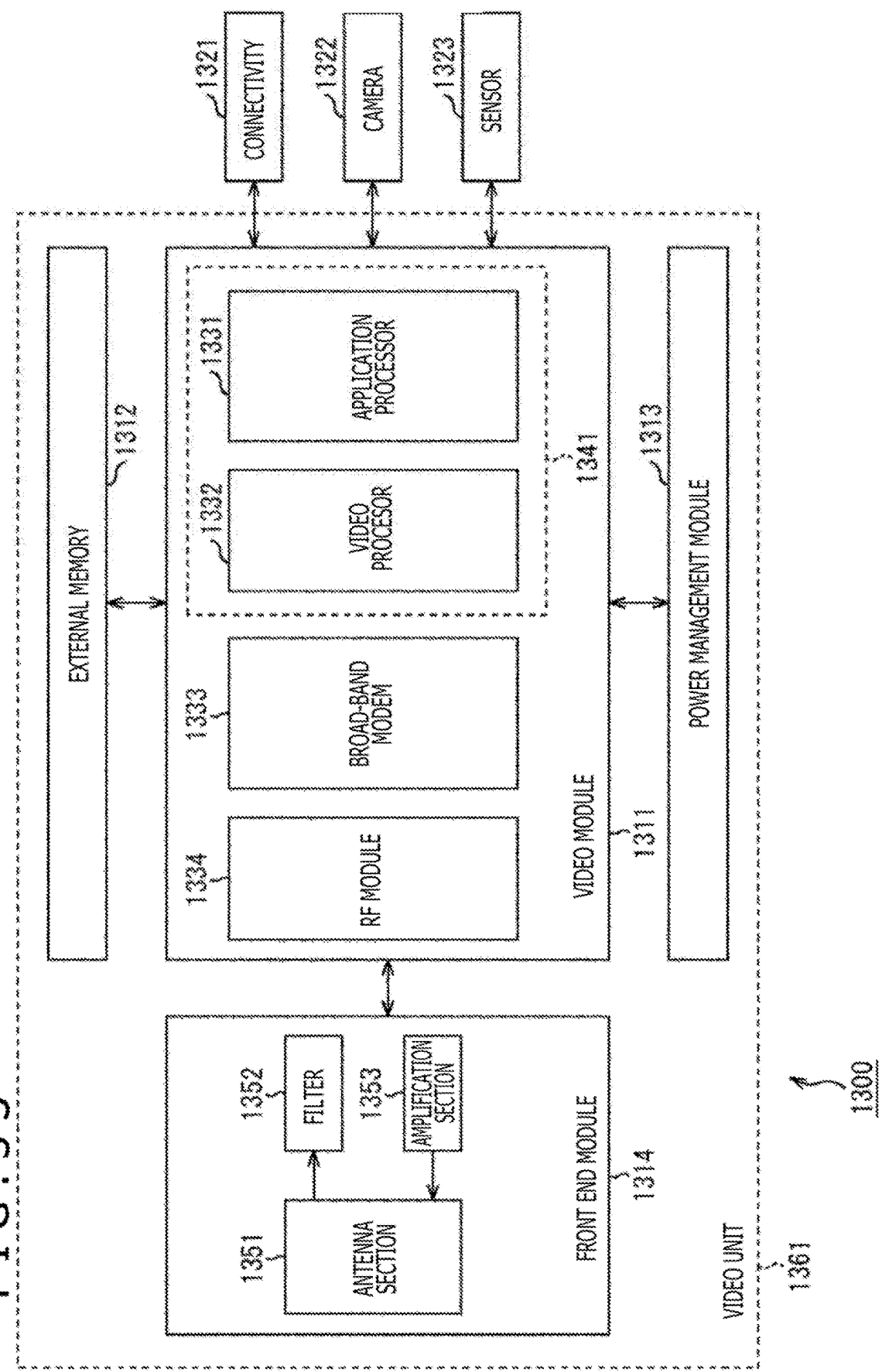
FIG. 33 is a block diagram depicting an example of a schematic configuration of a video set.

In addition, the present technology can also be implemented as all the constituent elements mounted to an arbitrary apparatus or an apparatus composing a system, for example, a processor as a system LSI (Large Scale Integration) or the like, a module using a plurality of processors or the like, a unit using a plurality of modules or the like, a set in which other functions are further added to a unit, and the like (that is, a configuration of a part of an apparatus). FIG. 33 depicts an example of a schematic configuration of a video set to which the present technology is applied.

In recent years, the multi-functionalization of the electronic apparatuses has been progressed. In the development and manufacture of the electronic apparatuses, in the case where a part of the configuration is implemented as sale, offer or the like, not only the case where the implementation is performed as the configuration having one function, but also the case where a plurality of configurations having the associated functions is combined, so that the implementation is performed as one set having a plurality of functions based on the combination have often been seen.

The video set 1300 depicted in FIG. 33 has a such a multi-functionalized configuration, and is obtained by combining a device having a function relating to the encoding or the decoding of the image (one of them is available or both of them may also be available) with a device having other functions relating to the function.

As depicted in FIG. 33, the video set 1300 has a module group including a video module 1311, an external memory 1312, a power management module 1313, a front end module 1314, and the like, and a device having associated functions including a connectivity 1321, a camera 1322, a sensor 1323, and the like.

In the module, some component functions relating to one another are collected into a component having a cohesive function. Although a concrete physical configuration is arbitrary, for example, it is considered as the module that a plurality of processors having respective functions, electronic circuit elements such as a resistor and a capacitor, other devices, and the like are arranged on a circuit board to be integrated with one another. In addition, with respect to the module, it is also considered that a module is combined with other modules, a processor, and the like to obtain a new module.

In the case of an example of FIG. 33, the video module 1311 is obtained by combining constituent elements having functions relating to the image processing with one another. The video module 1311 has an application processor, a video processor, a broad-band modem 1333, and an RF module 1334.

The processor is obtained by integrating constituent elements having predetermined functions on a semiconductor chip with one another based on SoC (System on Chip), and for example, is referred to as a system LSI (Large Scale Integration) or the like. The constituent element having the predetermined function may be a logic circuit (hardware configuration), may be a CPU, a ROM, a RAM, and the like, and a program executed by using those (software configuration), or may be obtained by combining both of them with each other. For example, the processor may have a logic circuit, a CPU, a ROM, a RAM, and the like, may be realized by a logic circuit (hardware configuration) in a part thereof, and may be realized by a program (software configuration) executed by a CPU in other functions thereof.

The application processor 1331 of FIG. 33 is a processor for executing an application relating to the image processing. For the purpose of realizing the predetermined function, the application executed in the application processor 1331 not only executes arithmetic operation processing, but also, for example, control a configuration of inside or outside of the video module 1311 such as the video processor 1332 as may be necessary.

The video processor 1332 is a processor having a function relating to the encoding/decoding of the image (one of them or both of them).

In the broad-band modem 1333, data (digital signal) which is transmitted through wired or wireless (or both of them) broad-band communication which is made through a broad-band line such as the Internet or a public telephone network, for example, is digital-modulated to be converted into an analog signal, and the analog signal which is received through the broad-band communication is demodulated to be converted into data (digital signal).

The broad-band modem 1333, for example, processes arbitrary information such as the image data which is processed by the video processor 1332, the stream into which the image data is encoded, the application program, and the set data.

The RF module 1334 is a module for performing the frequency transformation, the modulation/demodulation, the amplification, the filter processing, and the like for an RE (Radio Frequency) signal which is transmitted/received through the antenna. For example, the RF module 1334 performs the frequency conversion or the like for a baseband signal provided by the broad-band modem 1333 to generate the RF signal. In addition, for example, the RF module 1334 performs the frequency conversion or the like for the RF signal which is received through the front end module 1314 to generate a base-band signal.

It should be noted that as depicted by a dotted line 1341 in FIG. 33, the application processor 1331 and the video processor 1332 may be Integrated with each other to be configured as one processor.

The external memory 1312 is a module which is provided outside the video module 1311 and which has a storage device utilized by the video module 1311. The storage device of the external memory 1312 may be realized by any physical configuration. However, since, in general, the external memory 1312 is often utilized for storage of large capacity data such as image data of a frame unit, the external memory 1312 is desirably realized by a relatively inexpensive and large capacity semiconductor memory such as a DRAM (Dynamic Random Access Memory).

The power management module 1313 manages and controls the supply of the electric power to the video module 1311 (the constituent elements within the video module 1311).

The front end module 1314 is a module which provides a front end function (circuits at transmission/reception ends on the antenna side) for the RF module 1334. As depicted in FIG. 33, the front end module 1314, for example, has an antenna section 1351, a filter 1352, and an amplification section 1353.

The antenna section 1351 has an antenna for transmitting/receiving a wireless signal, and a peripheral configuration thereof. The antenna section 1351 transmits a signal supplied thereto from the amplification section 1353 as a wireless signal, and supplies a received wireless signal as an electric signal (RF signal) to the filter 1352. The filter 1352 executes filter processing or the like for the RF signal which is received through the antenna section 1351, and supplies the RF signal after execution of the processing to the RF module 1334. The amplification section 1353 amplifies the RF signal supplied thereto from the RF module 1334 and supplies the SF signal thus amplified to the antenna section 1351.

The connectivity 1321 is a module having a function relating to connection to the outside. A physical configuration of the connectivity 1321 is arbitrary. For example, the connectivity 1321 has a configuration having a communication function other than that complying with a communication standard to which the broad-band modem 1333 corresponds, an external input/output terminal, and the like.

For example, the connectivity 1321 may have a module having a communication function complying with a wireless communication standard such as Bluetooth (registered trademark), IEEE 802.11 (for example, Wireless Fidelity (Wi-Fi) (registered trademark)), NFC (Near Field Communication), or IrDA. (IntraRed Data Association), an antenna through which a signal complying with that standard is transmitted/received, and the like. In addition, for example, the connectivity 1321 may have a module having a communication function complying with a wired communication standard such as a USB (Universal Serial Bus), or HDMI (registered trademark) (High-Definition Multimedia Interface), and a terminal complying with that standard. Moreover, for example, the connectivity 1321 may have other data (signal) transmission function or the like such as that of an analog input/output terminal.

It should be noted that the connectivity 1321 may include a device of transmission destination of the data (signal). For example, the connectivity 1321 may have a drive (including not only a drive of a removable medium, but also a hard disk, an SSD (Solid State Drive), an NAS (Network Attached Storage), or the like) for reading out or writing the data from or to a recording medium such as a magnetic disk, an optical disk, a magneto-optical disk, a semiconductor memory or the like. In addition, the connectivity 1321 may have an output device (a monitor, a speaker or the like) for an image or audio.

The camera 1322 a module having a function of imaging a subject, and obtaining image data of the subject. The image data obtained through the imaging with the camera 1322, for example, is supplied to the video processor 1332 to be encoded.

The sensor 1323 is a module having the arbitrary sensor function such as an audio sensor, an ultra-sonic wave sensor, an optical sensor, an illuminance sensor, an infrared ray sensor, an image sensor, a rotation sensor, an angle sensor, an angular velocity sensor, a speed sensor, an acceleration sensor, a tilt sensor, a magnetic identification sensor, a shock sensor, or a temperature sensor. The data detected with the sensor 1323, for example, is supplied to the application processor 1331, and is then utilized by an application or the like.

The configuration described as the module in the above may be realized as a processor, or conversely the configuration described as the processor in the above may be realized as a module.

In the video set 1300 having the configuration as described above, as will be described later, the present technology can be applied to the video processor 1332. Therefore, the video set 1300 can be implemented as a set to which the present technology is applied.

(Configuration Example of Video Processor)

Figure 34:
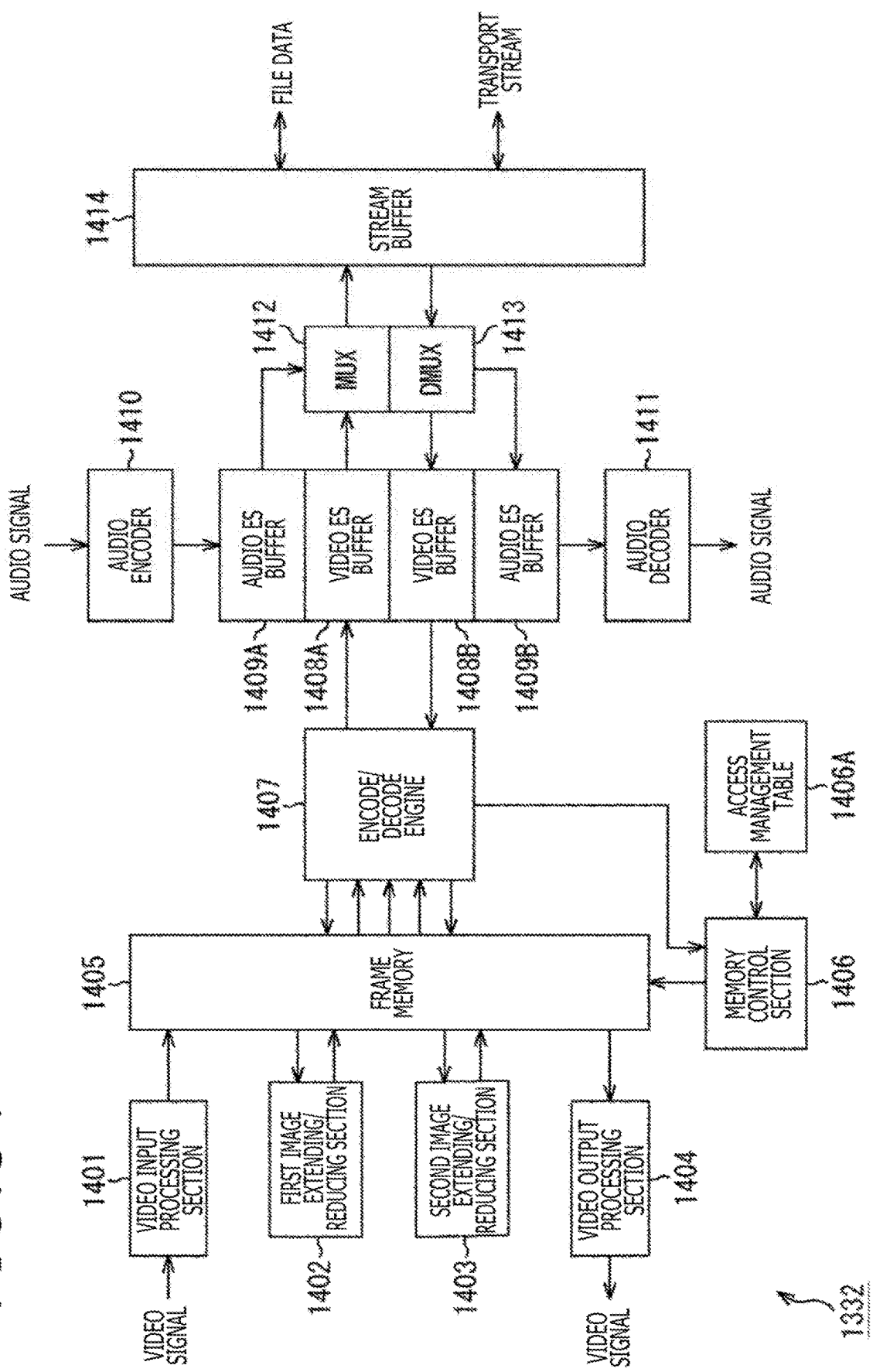
FIG. 34 is a block diagram depicting an example of a schematic configuration of a video processor.

FIG. 34 depicts an example of a schematic configuration of the video processor 1332 (FIG. 33) to which the present technology is applied.

In the case of an example of FIG. 34, the video processor 1332 has a function of receiving as inputs thereof a video signal and an audio signal, and encoding the video signal and the audio signal in accordance with a predetermined system and a function of decoding the encoded video data and audio data, and reproducing and outputting the video signal and the audio signal.

As depicted in FIG. 34, the video processor 1332 has a video input processing section 1401, a first image extending/reducing section 1402, a second image extending/reducing section 1403, a video output processing section 1404, a frame memory 1405, and a memory control section 1406. In addition, the video processor 1332 has an encode/decode engine 1407, video ES (Elementary Stream) buffers 1408A and 1408B, and audio ES buffers 1409A and 14098. Moreover, the video processor 1332 has an audio encoder 1410, an audio decoder 1411, a multiplexing section (MUX (Multiplexer) 1412, a demultiplexing section (DMUX (Demultiplexer)) 1413, and a stream buffer 1414.

The video input processing section 1401, for example, acquires a video signal input thereto from the connectivity 1321 (FIG. 33) or the like, and transforms the video signal into digital image data. The first image extending/reducing section 1402 performs format conversion, extending/reducing processing for an image, and the like for the image data. The second image extending/reducing section 1403 performs the extending/reducing processing, in accordance with the format in a destination of output through the video output processing section 1404, for the image data, and the format conversion, the extending/reducing processing for the image, and the like similar to those in the first image extending/reducing section 1402. The video output processing section 1404 performs the format conversion, the conversion into the analog signal, or the like for the image data, and outputs the resulting image data as a reproduced video signal to the connectivity 1321 or the like.

The frame memory 1405 is a memory for image data which is shared among the video input processing section 1401, the first image extending/reducing section 1402, the second image extending/reducing section 1403, the video output processing section 1404, and the encode/decode engine 1407. The frame memory 1405, for example, is realized in the form of a semiconductor memory such as a DRAM.

The memory control section 1406, in response to a synchronous signal sent from the encode/decode engine 1407, controls an access of writing/recording to/from the frame memory 1405 in accordance with access schedule to the frame memory 1405 which is written to the access management table 1406A. The access management table 1406A is updated in contents by the memory control section 1406 in response to the pieces of processing executed by the encode/decode engine 1407, the first image extending/reducing section 1402, the second image c extending/reducing section 1403, and the like.

The encode/decode engine 1407 executes the encode processing of the image data, and the decode processing of the video stream as the data obtained by encoding the image data. For example, the encode/decode engine 1407 encodes the image data read out from the frame memory 1405, and successively writes the encoded image data as the video stream to the video ES buffer 1408A. In addition, for example, the encode/decode engine 1407 successively reads out the video streams sent from the video ES buffer 1408B to decode the video streams thus read out, and successively writes the decoded video streams as the image data to the frame memory 1405. In the encoding processing or the decoding processing, the encode/decode engine 1407 uses the frame memory 1405 as a work area. In addition, for example, at a timing of start of the processing for each macro block, the encode/decode engine 1407 outputs the synchronous signal to the memory control section 1406.

The video ES buffer 1408A buffers the video stream generated by the encode/decode engine 1407, and supplies the resulting video stream to the multiplexing section (MUX) 1412. The video ES buffer 1408B buffers the video stream supplied thereto from the demultiplexing section (DMUX) 1413, and supplies the resulting video stream to the encode/decode engine 1407.

The audio ES buffer 1409A buffers the audio stream generated by the audio encoder 1410, and supplies the resulting audio stream to the multiplexing section (MUX) 1412. The audio ES buffer 1409B buffers the audio stream supplied thereto from the demultiplexing section 1413 (DMUX), and supplies the resulting the audio stream to the audio decoder 1411.

The audio encoder 1410, for example, subjects the audio signal input thereto from the connectivity 1321 or the like, for example, to the digital conversion and, for example, encodes the resulting audio signal in accordance with a predetermined system such as an MPEG audio system or an AC3 (AudioCode number 3) system. The audio encoder 1410 successively writes audio streams as data obtained by encoding the audio signal to the audio ES buffer 1409A. The audio decoder 1411 decodes the audio stream supplied thereto from the audio ES buffer 1409B, for example, into the analog signal, converts the resulting audio stream into the analog signal, and supplies the resulting analog signal as the reproduced audio signal to, for example, the connectivity 1321 or the like.

The multiplexing section (MUX) 1412 multiplexes or video stream and the audio stream. A method for the multiplexing (that is, the format of a bit stream generated by the multiplexing) is arbitrary. In addition, during the multiplexing, the multiplexing section (MUX) 1412 can also add predetermined header information or the like to the bit stream. In a word, the multiplexing section (MUX) 1412 can convert the format of the stream by the multiplexing. For example, the multiplexing section (MUX) 1412 multiplexes the video stream and the audio stream to convert the resulting stream into a transport stream as a bit stream of a format for transfer. In addition, for example, the multiplexing section (MUX) 1412 multiplexes the video stream and the audio stream to convert the resulting stream into data (file data) of a file format for recording.

The demultiplexing section (DMUX) 1413 demultiplexes the bit stream, in which the video stream and the audio stream are multiplexed, in accordance with a method corresponding to the multiplexing by the multiplexing section (MUX) 1412. In a word, the demultiplexing section (DMUX) 1413 extracts the video stream and the audio stream from the bit stream read out from the stream buffer 1414 (the video stream and the audio stream are separated from each other). In a word, the demultiplexing section (DMUX) 1413 can converts the format of the stream by the demultiplexing (the demultiplexing of the multiplexing by the demultiplexing section (MUX) 1412). For example, the demultiplexing section (DMUX) 1413, for example, acquires the transport stream supplied thereto from the connectivity 1321, the broad-band modem 1333 or the like through the stream buffer 1914, and demultiplexes the transport stream thus acquired, thereby enabling the resulting stream to be converted into the video stream and the audio stream. In addition, the demultiplexing section (DMUX) 1413, for example, acquires the file data read out from the various kinds of recording media by, for example, the connectivity 1321 through the stream buffer 1414, and demultiplexes the file data thus acquired, thereby enabling the resulting stream to be converted into the video stream and the audio stream.

The stream buffer 1414 buffers the bit stream. For example, the stream buffer 1414 buffers the transport stream supplied thereto from the multiplexing section (MUX) 1412, and supplies the transport stream, for example, to the connectivity 1321, the broad-band modem 1333, or the like at a predetermined timing or in response to a request issued from the outside or the like.

In addition, for example, the stream buffer 1414 buffers the file data supplied thereto from the multiplexing section (MUX) 1412, and supplies the file data, for example, to the connectivity 1321 or the like at a predetermined timing or in response to a request issued from the outside, and causes the connectivity 1321 or the like to record the file data in various kinds of recording media.

Moreover, the stream buffer 1414, for example, buffers the transport stream acquired through the connectivity 1321, the broad-band modem 1333 or the like, and supplies the transport stream thus acquired to the demultiplexing section (DMUX) 1413 at a predetermined timing or in response to a request issued from the outside or the like.

In addition, the stream buffer 1414, for example, buffers the file data read out from various kinds of recording media in the connectivity 1321 or the like, and supplies the file data thus read out to the demultiplexing section (DMUX) 1413 at a predetermined timing or in response to a request issued from the outside or the like.

Next, a description will be given with respect to an example of an operation of the video processor 1332 having such a configuration. For example, the video signal input from the connectivity 1321 or the like to the video processor 1332 is converted into the digital image data in accordance with a predetermined system such as 4:2:2Y/Cb/Cr system or the like in the video input processing section 1401, and the resulting digital image data is successively written to the frame memory 1405. The digital image data is read out to either the first image extending/reducing section 1402 or the second image extending/reducing section 1403 is subjected to the format conversion into the predetermined system such as the 4:2:0Y/Cb/Cr system, and the extending/reducing processing, and is written to the frame memory 1405 again. The image data is encoded by the encode/decode engine 1407, and is then written as the video stream to the video PS buffer 1408A.

In addition, the audio signal input from the connectivity 1321 or the like to the video processor 1332 is encoded by the audio encoder 1410, and is written as the audio stream to the audio ES buffer 1409A.

The video stream in the video ES buffer 1408A, and the audio stream in the audio ES buffer 1409A are read out to the multiplexing section (MUX) 1412 to be multiplexed and converted into the transport stream, the file data or the like. After the transport stream generated by the multiplexing section (MUX) 1412 is buffered in the stream buffer 1414, the transport stream thus buffered is output to the external network, for example, through the connectivity 1321, the broad-band modem 1333 or the like. In addition, after the file data generated by the multiplexing section (MUX) 1412 is buffered in the stream buffer 1414, the file data thus buffered, for example, is output to the connectivity 1321 or the like to be recorded in various kinds of recording media.

In addition, after the transport stream input from the external network to the video processor 1332 through, for example, the connectivity 1321, the broad-band modem 1333 or the like is buffered in the stream buffer 1414, the transport stream thus buffered is demultiplexed by the demultiplexing section (DMUX) 1413. In addition, after the file data which is read out from various kinds of recording media, for example, in the connectivity 1321 or the like and is input to the video processor 1332 is buffered in the stream buffer 1414, the file data thus buffered is demultiplexed by the demultiplexing section (DMUX) 1413. In a word, either the transport stream or the file data input to the video processor 1332 is separated into the video stream and the audio stream by the demultiplexing section (DMUX) 1413.

The audio stream is supplied to the audio decoder 1411 through the audio ES buffer 1409B and is decoded to reproduce the audio signal. In addition, after the video stream is written to the video ES buffer 1408B, the video stream is successively read out by the encode/decode engine 1407 to be decoded to be written to the frame memory 1405. The decoded image data is subjected to the extending/reducing processing by the second image extending/reducing section 1403 to be written to the frame memory 1405. Then, the decoded image data is read out to the video output processing section 1404 and is format-converted so as to follow a predetermined system such as the 4:2:2Y/Cb/Cr system, and is moreover converted into an analog signal, so that the video signal is reproduced and output.

In the case where the present technology is applied to the video processor 1332 configured in such a manner, it is only necessary that the present technology pertaining to the embodiments described above is applied to the encode/decode engine 1407. In a word, for example, the encode/decode engine 1407 may have the function of the image encoding apparatus 100 described above or the function of the image decoding apparatus 200 or both the functions. By adopting such a procedure, the video processor 1332 can achieve the effects similar to those of the embodiments described by referring to FIGS. 1 to 27.

It should be noted that in the encode/decode engine 1407, the present technology (that is, the function of the image encoding apparatus 100 described above or the function of the image decoding apparatus 200 or both the functions) may be realized by the hardware such as the logic circuits, may be realized by the software such as the incorporated program, or may be realized by both of them.

(Another Configuration Example of Video Processor)

Figure 35:
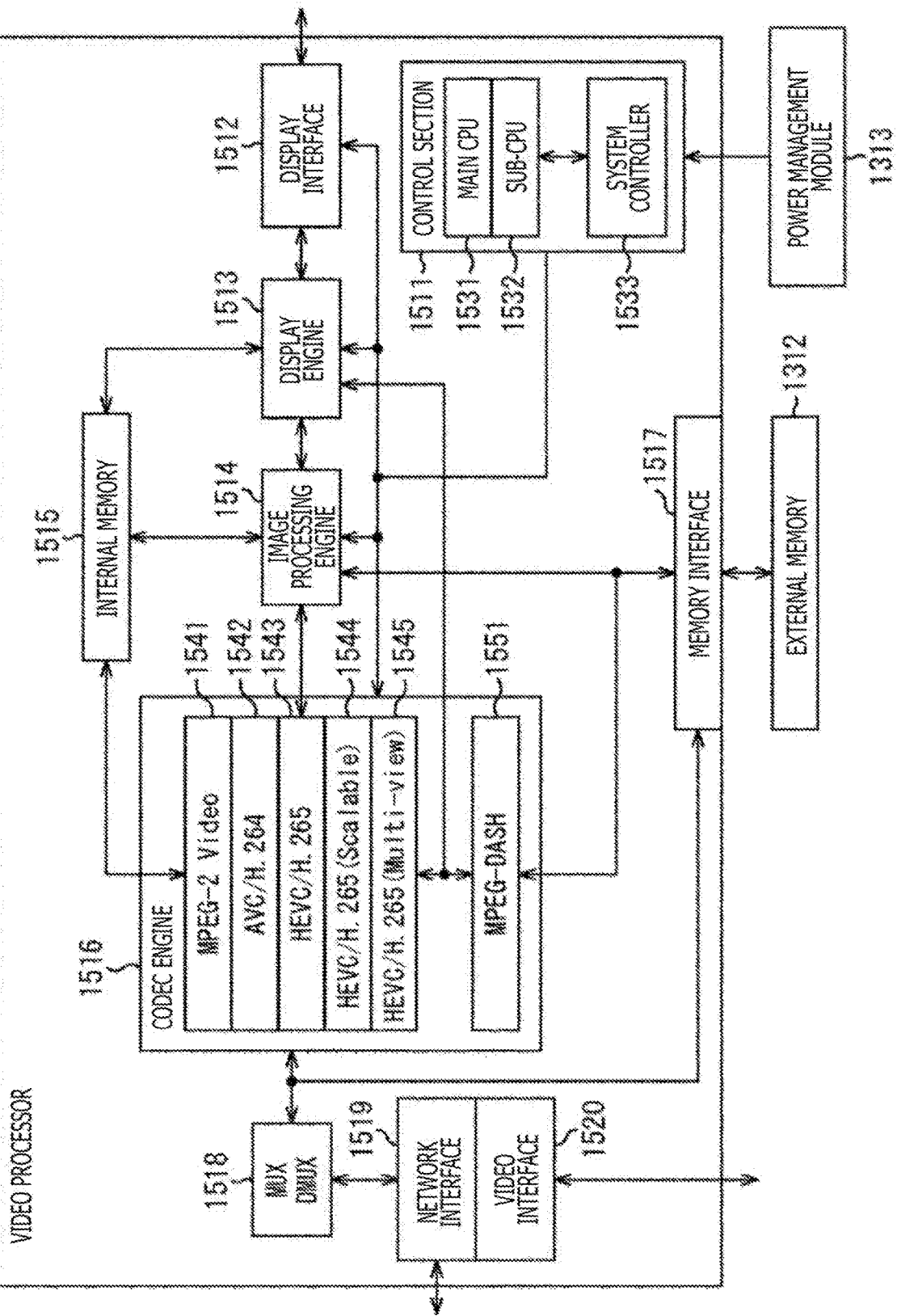
FIG. 35 is a block diagram depicting another example of the schematic configuration of the video processor.
Figure 36:
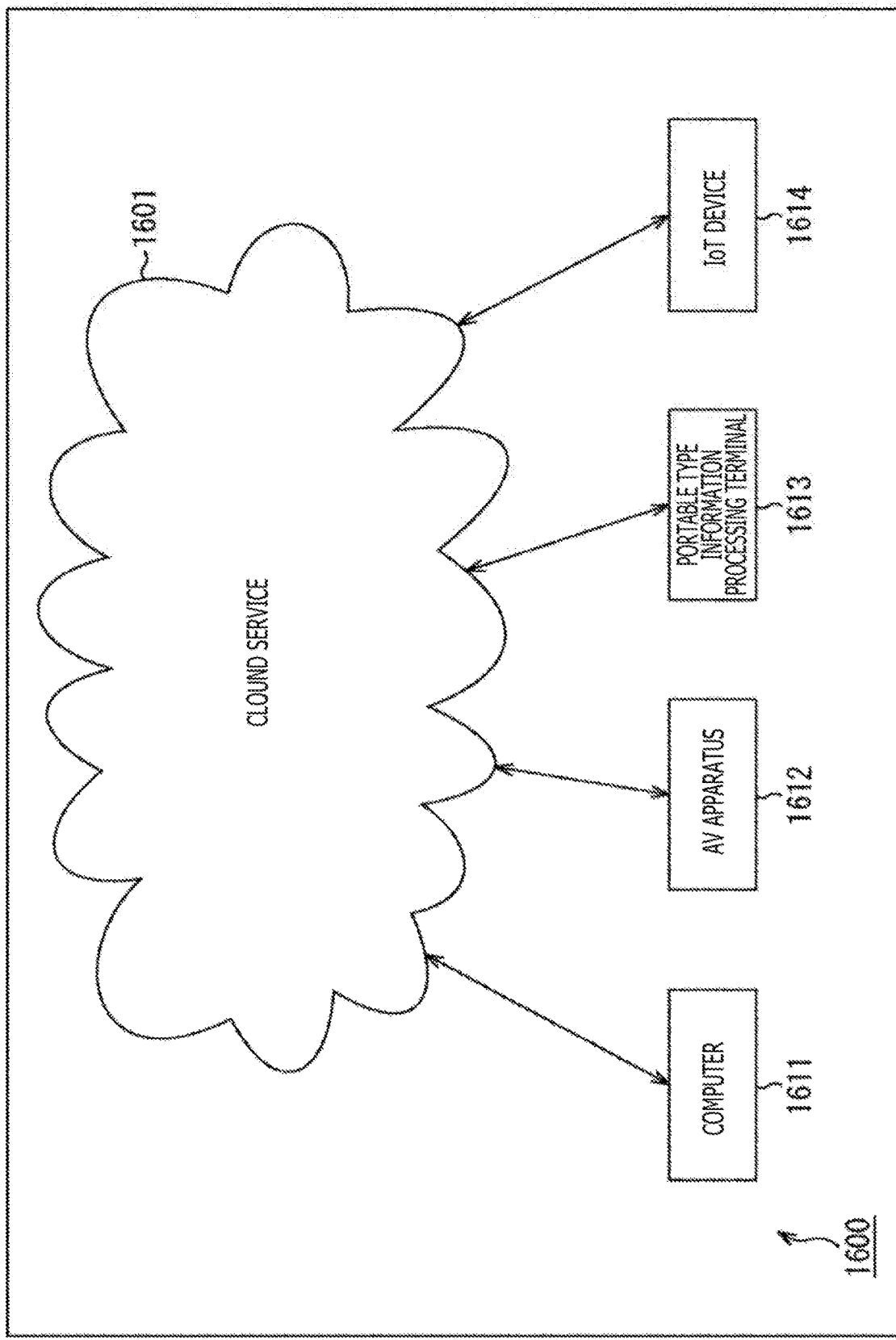
FIG. 36 is a block diagram depicting an example of a schematic configuration of a network system.

FIG. 35 depicts another example of a schematic configuration of the video processor 1332 to which the present technology is applied. In the case of the example of FIG. 35, the video processor 1332 has a function of encoding/decoding the video data in accordance with a predetermined system.

More specifically, as depicted in FIG. 35, the video processor 1332 has a control section 1511, a display interface 1512, a display engine 1513, an image processing engine 1514, and an internal memory 1515. In addition, the video processor 1332 has a codec engine 1516, a memory interface 1517, a multiplexing/demultiplexing section (MUX DMUX) 1518, a network interface 1519, and a video interface 1520.

The control section 1511 controls operations of the processing sections, within the video processor 1332, such as the display interface 1512, the display engine 1513, the image processing engine 1514, and the codec engine 1516.

As depicted in FIG. 35, the control section 1511 has a main CPU 1581, a sub-CPU 1582, and a system controller 1533. The main CPU 1581 executes a program or the like for controlling the operations of the processing sections within the video processor 1332. The main CPU 1581 generates control signals in accordance with the program or the like, and supplies the control signals to the respective processing sections (in a word, controls the operations of the processing sections). The sub-CPU 1582 plays an auxiliary role of the main CPU 1581. For example, the sub-CPU 1582 performs a child process, a sub-routine or the like of a program or the like which the main CPU 1581 executes. The system controller 1533 controls the operations of the main CPU 1581 and the sub-CPU 1582 such as the specification of the program which the main CPU 1581 and the sub-CPU 1582 execute, or the like.

The display interface 1512 outputs the image data to, for example, the connectivity 1321 or the like under the control by the control section 1511. For example, the display interface 1512 converts the image data of the digital data into the analog signal, and outputs the analog signal as the reproduced video signal or the image data of the digital data as at is to a monitor apparatus or the like of the connectivity 1321.

The display engine 1513 executes various kinds of pieces of conversion processing such as the format conversion, the size conversion, and the color gamut conversion for the image data so as for the image data to follow the hardware specification of the monitor apparatus or the like for displaying thereon that image under the control of the control section 1511.

The image processing engine 1514 executes the predetermined image processing such as the filter processing for the improvement in the image quality for the image data under the control of the control section 1511.

The internal memory 1515 is a memory, provided inside the video processor 1332, which is shared by the display engine 1513, the image processing engine 1514, and the codec engine 1516. The internal memory 1515, for example, is utilized for the exchange of the data which is performed among the display engine 1513, the image processing engine 1514, and the codec engine 1516. For example, the internal memory 1515 stores therein the data which is supplied thereto from the display engine 1513, the image processing engine 1514, or the codec engine 1516, and supplies that data to the display engine 1513, the image processing engine 1514, or the codec engine 1516 as may be necessary (for example, in response to the request). The internal memory 1515 may be realized by any storage device. In general, however, the internal memory 1515 is utilized for the storage of the small-capacity data such as the image data or parameters of the block unit in many cases. Therefore, for example, the internal memory 1515 is desirably realized by the semiconductor memory which, although having the relatively small capacity (for example, as compared with the external memory 1312), is high in response speed, for example, like an SRAM (Static Random Access Memory).

The codec engine 1516 executes the processing of the encoding or decoding of the image data. The encoding/decoding system to which the codec engine 1516 corresponds is arbitrary, the number of encoding/decoding system may be one or two or more. For example, the codec engine 1516 may be provided with a codec function of a plurality of encoding/decoding systems, and the encoding of the image data or the decoding of the encoded data may be carried out in accordance with selected one of the plurality of encoding/decoding systems.

In the examples depicted in FIG. 35, the codec engine 1516, as the functional blocks of the processing about the codec, for example, has MPEG-2 Video 1541, AVC/H.264 1542, HEVC/H. 265 1543, HEVC/H. 265 (Scalable) 1544, HEVC/H. 265 (Multi-view) 1545, and MPEG-DASH 1551.

MPEG-2 Video 1541 is a functional block for encoding or decoding the image data in accordance with the MPEG-2 system. AVC/H. 264 1542 is a functional block for encoding or decoding the image data in accordance with the AVC system. HEVC/H. 265 1543 is a functional block for encoding or decoding the image data in accordance with the HEVC system. HEVC/H. 265 (Scalable) 1544 is a functional block for scalable encoding or scalable decoding the image data in accordance with HEVC system. HEVC/H. 265 (Multi-view) 1545 a functional block for multi-view-decoding or multi-view decoding the image data in accordance with HEVC system.

MPEG-DASH 1551 is a functional block for transmitting/receiving the image data in accordance with MPEG-DASH (MPEG-Dynamic Adaptive Streaming over HTTP) system. MPEG-DASH is the technology for performing the streaming of the video by using HTTP (HyperText Transfer Protocol). It is one of the features of the MPEG-DASH that suitable one of a plurality of pieces of previously prepared encoded data in which the resolutions or the like are different from one another is selected in the segment unit and is transmitted. The MPEG-DASH 1551 performs the generation of the stream complying with the standard, the transmission control of the stream, and the like, and with respect to the encoding/decoding of the image data, utilizes MPEG-2 Video 1541 to HEVC/H.265 (Multi-view) 1545.

The memory interface 1517 is an interface for the external memory 1312. The data supplied from the image processing engine 1514 or the codec engine 1516 is supplied to the external memory 1312 through the memory interface 1517. In addition, the data read out from the external memory 1312 is supplied to the video processor 1332 (either the image processing engine 1514 or the codec engine 1516) through the memory interface 1517.

The multiplexing/demultiplexing section (MUX DMUX) 1518 carries out the multiplexing or demultiplexing of the various kinds of data relating to the image, such as the bit stream of the encoded data, the image data, and the video signal. The multiplexing/demultiplexing method is arbitrary. For example, during the multiplexing, the multiplexing/demultiplexing section (MUX DMUX) 1518 can not only collect a plurality of pieces of data into one piece of data, but also add the predetermined header information or the like to the one piece of data. In addition, during the demultiplexing, the multiplexing/demultiplexing section (MUX DMUX) 1518 can partition not only the one piece of data into a plurality of pieces of data, but also add the predetermined header information or the like to each of the pieces of data obtained through the partition. In a word, the multiplexing/demultiplexing section (MUX DMUX) 1518 can convert the format of the data by the multiplexing/demultiplexing. For example, the multiplexing/demultiplexing section (MUX DMUX) 1518 can multiplex the bit streams to convert the resulting bit stream into the transport stream as the bit stream of the format for transfer, or the data (file data) of the file format for recording. Needless to say, the inverse conversion thereof can also be performed by the demultiplexing.

The network interface 1519, for example, is an interface for the broad-band modem 1333, the connectivity 1321 or the like. The video interface 1520, for example, is an interface for the connectivity 1321, the camera 1322, or the like.

Next, a description will be given with respect to an example of an operation of such a video processor 1332. For example, when the transport stream is received from the external network through the connectivity 1321, the broad-band modem 1333 or the like, the transport stream is supplied to the multiplexing/demultiplexing section (MUX DMUX) 1518 through the network interface 1519 to be demultiplexed, and is decoded by the codec engine 1516. The image data obtained through the decoding by the codec engine 1516, for example, is subjected to the predetermined image processing by the image processing engine 1514, is subjected to the predetermined conversion by the display engine 1513, for example, is supplied to the connectivity 1321 or the like through the display interface 1512, and the resulting image is displayed on the monitor. In addition, for example, the image data obtained through the decoding by the codec engine 1516 is re-encoded by the codec engine 1516, and is multiplexed by the multiplexing/demultiplexing section (MUX DMUX) 1518 to be converted into the file data. The resulting file data, for example, is output to the connectivity 1321 or the like through the video interface 1520 to be recorded in various kinds of recording media.

Moreover, for example, the file data of the encoded data, obtained through the encoding of the image data, which is read out from a recording medium (not depicted) by the connectivity 1321 or the like is supplied to the multiplexing/demultiplexing section (MUX DMUX) 1518 through the video interface 1520 to be demultiplexed, and is decoded by the codec engine 1516. The image data obtained through the decoding by the codec engine 1516 is subjected to the predetermined image processing by the image processing engine 1514, is subjected to the predetermined conversion by the display engine 1513 and, for example, is supplied to the connectivity 1321 or the like through the display interface 1512. Then, the resulting image is displayed on the monitor. In addition, for example, the image data obtained through the decoding by the codec engine 1516 is re-encoded by the codec engine 1516, and is multiplexed by the multiplexing/demultiplexing section (MUX DMUX) 1518 to be converted into the transport stream. Then, the resulting transport stream, for example, is supplied to the connectivity 1321, the broad-band modem 1333 or the like through the network interface 1519, and is transmitted to another apparatus (not depicted).

It should be noted that the exchange of the image data and other data between the processing sections within the video processor 1332, for example, is carried out by utilizing the internal memory 1515 or the external memory 1312. In addition, the power management module 1313, for example, controls the supply of the electric power to the control section 1511.

In the case where the present technology is applied to the video processor 1332 configured in such a manner, it is only necessary that the present technology pertaining to the embodiments described above is applied to the codec engine 1516. In a word, for example, it is only necessary that the codec engine 1516 has the function of the image encoding apparatus 100 described above or the function of the image decoding apparatus 200 or both of them. By adopting such a procedure, the video processor 1332 can achieve the effects similar to those of the embodiments described above by referring to FIGS. 1 to 27.

It should be noted that in the codec engine 1516, the present technology (that is, the function of the image encoding apparatus 100) may be realized by the hardware such as the logic circuit, may be realized by the software such as the incorporated program, or may be realized by both of them.

Although two examples of the configuration of the video processor 1332 have been exemplified so far, the configuration of the video processor 1332 is arbitrary, and thus arbitrary configurations other than the two examples described above may be available. In addition, although the video processor 1332 may be configured in the form of the semiconductor chip, the video processor 1332 may also be configured in the form of a plurality of semiconductor chips. For example, the video processor 1332 may be configured in the form of a three-dimensional lamination LSI in which a plurality of semiconductors is laminated on one another. In addition, the video processor 1332 may be realized as a plurality of LSIs.

(Examples of Application to Apparatus)

The video set 1300 can be incorporated in various kinds of apparatuses for processing the image data. For example, the video set 1300 can be incorporated in the television apparatus 900 (FIG. 29), the portable telephone 920 (FIG. 30), the recording/reproducing apparatus 940 (FIG. 31), the imaging apparatus 960 (FIG. 32), and the like. By incorporating the video set 1300 in the apparatus, that apparatus can achieve the effects similar to those of the embodiments described above by referring to FIGS. 1 to 27.

It should be noted that even in a case of a part of the constituent elements of the video set 1300 described above, the part can be implemented as the constituent element to which the present technology is applied as long as the part includes the video processor 1332. For example, only the video processor 1332 can be implemented as the video processor to which the present technology is applied. In addition, for example, the processor, the video module 1311 or the like indicated by a dotted line 1341 as described above can be implemented as the processor module or the like to which the present technology is applied. Moreover, for example, the video module 1311, the external memory 1312, the power management module 1313, and the front end module 1314 can be combined with one another to also be implemented as the video unit 1361 to which the present technology is applied. Any of the configurations can achieve the effects similar to those of the embodiments described above by referring to FIGS. 1 to 27.

In a word, any configuration can be incorporated in the various kinds of apparatuses for processing the image data similarly to the case of the video set 1300 as long as the configuration includes the video processor 1332. For example, the video processor 1332, the processor indicated by the dotted line 1341, the video module 1311, or the video unit 1361 can be incorporated in the television apparatus 900 (FIG. 29), the portable telephone 920 (FIG. 30), the recording/reproducing apparatus 940 (FIG. 31), the imaging apparatus 960 (FIG. 32), and the like. Then, by incorporating the video set 1300 in any of the apparatuses, the apparatus can achieve the effects similar to those of the embodiments described above by referring to FIGS. 1 to 27 similarly to the case of the video set 1300.

Eighth Embodiment

In addition, the present technology can also be applied to a network system configured by a plurality of apparatuses. FIG. 36 depicts an example of a schematic configuration of a network system to which the present technology is applied.

The network system. 1600 depicted in FIG. 36 is a system in which apparatuses exchange the information regarding an image (moving image) through the network. A cloud service 1601 of the network system 1600 is a system for providing a service about an image (moving image) for a computer 1611, an AV (Audio Visual) apparatus 1612, a portable type information processing terminal 1613, an IoT (Internet of Things) device 1614 or the like which is transmissibly connected to the cloud service 1601. For example, the cloud service 1601 provides or supplies service of the contents of the image (moving image) like the so-called moving image delivery (on-demand or live delivery) for a terminal. In addition, for example, the cloud service 1601 provides a backup service for receiving contents of the image (moving image) from the terminal, and storing the contents thus received. In addition, for example, the cloud service 1601 provides a service for mediating the exchange of the contents of the image (moving image) between terminals.

A physical configuration of the cloud service 1601 is arbitrary. For example, the cloud service 1601 may have various kinds of services such as a server for preserving and managing a moving image, a server for delivering a moving image to a terminal, a server for acquiring the moving image from the terminals, and a server for managing users (terminals) and charges, and an arbitrary network such as the Internet or a LAN.

The computer 1611, for example, is configured by an information processing apparatus such as a personal computer, a server or a work station. An AV apparatus 1612, for example, is configured by an image processing apparatus such as a television receiver, a hard disk recorder, a game apparatus or a camera. The portable type information processing terminal 1613, for example, is configured by a portable type information processing apparatus such as a note type personal computer, a tablet terminal, a portable telephone, or a smart phone. The IoT device 1614, for example, is configured by an arbitrary object, for executing processing relating to an image, such as a machine, consumer electronics, furniture, other things, an IC tap, or a card type device. These terminals can have communication functions, respectively, and can be connected to the cloud service 1601 (a session is established), thereby performing the exchange of the information with the cloud service 1601 (performing the communication). In addition, each of the terminals can communicate with another terminal. The communication between the terminals may be performed through the cloud service 1601, or may be performed without going through the cloud service 1601.

When the present technology is applied to the network system 1600 as described above, and the data of the image (moving image) is exchanged between the terminals or between the terminal and the cloud service 1601, the image data may be encoded/decoded as described above in the embodiments. In a word, the terminals (the computer 1611 to the IoT device 1614), and the cloud service 1601 may have the function of the image encoding apparatus 100 or the image decoding apparatus 200 described above. By adopting such a procedure, the terminals (the computer 1611 to the IoT device 1614), or the cloud service 1601 exchanging the image data can achieve the effects similar to those of the embodiments described above by referring to FIGS. 1 to 27.

Incidentally, the various kinds of pieces of information regarding the encoded data (bit stream) may be multiplexed with the encoded data to be transmitted or recorded, or may be transmitted or recorded as different pieces of data associated with the encoded data without going through being multiplexed with the encoded data. Here, the term "be associated with," for example, means that when one piece of data is processed, the other data may be utilized (may be linked). In a word, the pieces of data associated with each other may be collected as one piece of data, or may be made individual pieces of data, respectively. For example, the information associated with the encoded data (image) may be transmitted in a transmission path different from that of the encoded data (image). In addition, for example, the information associated with the encoded data (image) may be recorded in a recording medium (or a different recoding area of the same recording medium) different from that for the encoded data (image). It should be noted that the wording "be associated with" may not corresponding to the entire data, but may be a part of the data. For example, the image and the information corresponding to that information may be associated with each other in an arbitrary unit such as a plurality of frames, one frame, or a part within a frame.

In addition, as described above, in the present description, the term such as "synthesize," "multiplex," "add," "integrate," "include," "store," "put in," "plug in," or "inserted into," for example, means that a plurality of things is collected into one thing such as that the encoded data and the meta data are collected into one piece of data, and means one method of "be associated with" described above.

It should be noted that the effects described in the present description are merely the exemplifications and are by no means limited, and other effects may also be offered.

In addition, the embodiments of the present disclosure are by no means limited to the embodiments described above, and various changes can be made without departing from the subject matter of the present disclosure.

For example, the stricture of each of the CU, the PU and the TU may be a Quad Tree shaped tree structure. In addition, the picture as the encoding target may not be the YCbCr image, but may be the RGB image. In this case, the luminance component Y, the color component Cb and the color component Cr in the explanation described above, for example, are replaced with a R (red) component, a G (green) component, and a B (blue) component, respectively.

In addition, the present disclosure can adopt a configuration of cloud computing in which one function is shared and collaborated by a plurality of apparatuses through a network to be processed.

In addition, Steps explained in the flow charts described above can be executed by one apparatus, and in addition thereto, can be shared by a plurality of apparatuses to be executed.

Moreover, in the case where a plurality of pieces of processing is included in one Step, the plurality of pieces of processing included in the one Step can be executed by one apparatus, and in addition thereto, can be shared by a plurality of apparatuses to be executed.

It should be noted that the present disclosure can also adopt the following constitutions.

(1)

An image processing apparatus, including an encoding section, in a case where a prediction mode of a luminance component of an image is an intra BC prediction mode, encoding information indicating a prediction mode of a color component of the image by using, as a context, that the prediction mode of the luminance component is the intra BC prediction mode.

(2)

The image processing apparatus according to (1) described above, in which in a case where it is used as the context that the prediction mode of the luminance component is the intra BC prediction mode, the encoding section, encodes the information indicating the prediction mode of the color component in such a way that in a case where the prediction mode of the color component is the intra BC prediction mode, an compression rate becomes high.

(3)

The image processing apparatus according to (1) or (2) described above, in which a configuration is made in such a way that the prediction mode of the color component is an inter prediction mode, an intra prediction mode, an intra BC prediction mode, an LMchroma prediction mode, or a Cross-Color prediction mode.

(4)

The image processing apparatus according to any one of (1) to (3) described above, in which a configuration is made in such a way that the information indicating the prediction mode of the color component is information indicating whether or not the prediction mode of the color component is identical to the prediction mode of the luminance component.

(5)

The image processing apparatus according to any one of (1) to (4) described above, in which a configuration is made in such a way that in a case where the intra BC prediction mode of the luminance component is valid, the encoding section encodes information indicating whether or not the intra BC prediction mode of the color component is valid.

(6)

The image processing apparatus according to any one of (1) to (5) described above, further including a generation section, in a case where the prediction mode of each of the luminance component and the color component is the intra BC prediction mode, generating motion vector information indicating a motion vector used in the prediction processing of the intra BC prediction mode of the color component based on a motion vector used in the prediction processing of the intra BC prediction mode of the luminance component.

(7)

The image processing apparatus according to (6) described above, in which a configuration is made in such a way that the motion vector information is information indicating that the motion vector used in the prediction processing of the intra BC prediction mode of the color component is identical to the motion vector used in the prediction processing of the intra BC prediction mode of the luminance component.

(8)

The image processing apparatus according to (6) described above, in which a configuration is made in such a way that the motion vector information is a difference between the motion vector used in the prediction processing of the intra BC prediction mode of the color component, and the motion vector used in the prediction processing of the intra BC prediction mode of the luminance component.

(9)

An image processing method executed by an image processing apparatus, including an encoding step of, in a case where a prediction mode of a luminance component of an image is an intra BC prediction mode, encoding information indicating a prediction mode of a color component of the image by using, as a context, that the prediction mode of the luminance component is the intra BC prediction mode.

(10)

An image processing apparatus, including a decoding section, in a case where a prediction mode of a luminance component of an image is an intra BC prediction mode, decoding information indicating a prediction mode of a color component of the image by using, as a context, that the prediction mode of the luminance component is the intra BC prediction mode.

(11)

The image processing apparatus according to (10) described above, in which a configuration is made is such a way that in a case where it is used as the context that the prediction mode of the luminance component is the intra BC prediction mode, the decoding section decodes information indicating the prediction mode of the color component which is encoded such that in a case where the prediction mode of the color component is the intra BC prediction mode, a compression rate becomes high.

(12)

The image processing apparatus according to (10) or (11) described above, in which a configuration is made in such a way that the prediction mode of the color component is as inter prediction mode, an intra prediction mode, an intra BC prediction mode, an LMchroma prediction mode, or a Cross-Color prediction mode.

(13)

The image processing apparatus according to any one of (10) to (12) described above, in which a configuration is made in such a way that the information indicating the prediction mode of the color component is information indicating whether or not the prediction mode of the color component is identical to the prediction mode of the luminance component.

(14)

The image processing apparatus according to any one of (10) to (13) described above, in which a configuration is made in such a way that in a case where the intra BC prediction mode of the luminance component is valid, the decoding section decodes information indicating whether or not the intra BC prediction mode of the color component is valid.

(15)

The image processing apparatus according to any one of (10) to (14) described above, further including an acquisition section, in a case where the prediction mode of each of the luminance component and the color component is the intra BC prediction mode, acquiring motion vector information indicating a motion vector used in the prediction processing of the intra BC prediction mode of the color component, the motion vector information being generated based on the motion vector used in the prediction processing of the intra BC prediction mode of the luminance component.

(16)

The image processing apparatus according to (15) described above, in which a configuration is made in such a way that the motion vector information is information indicating that the motion vector used in the prediction processing of the intra BC prediction mode of the color component is identical to the motion vector used in the prediction processing of the intra BC prediction mode of the luminance component, and
the acquisition section sets the motion vector used in the prediction processing of the intra BC prediction mode of the luminance component as the motion vector used in the prediction processing of the intra BC prediction mode of the color component based on the motion vector information.

(17)

The image processing apparatus according to (15) described above, in which a configuration is made in such a way that the motion vector information is a difference between the motion vector used in the prediction processing of the intra BC prediction mode of the color component and the motion vector used in the prediction processing of the intra BC prediction mode of the luminance component, and
the acquisition section sets an addition value of the difference, and the motion vector used in the prediction processing of the intra BC prediction mode of the luminance component as the motion vector used in the prediction processing of the intra BC prediction mode of the color component based on the motion vector information.

(18)

An image processing method executed by an image processing apparatus, including a decoding step of, in a case where a prediction mode of a luminance component of an image is an intra BC prediction mode, decoding information indicating a prediction mode of a color component of the image by using, as a context, that the prediction mode of the luminance component is the intra BC prediction mode.

REFERENCE SIGNS LIST

100 . . . Image encoding apparatus, 101 . . . Control section, 114 . . . Encoding section, 200 . . . Image decoding apparatus, 210 . . . Decoding section, 211 . . . section.

The invention claimed is:

1. An image processing apparatus, comprising:
 an encoding section, in a case where a prediction mode of a luminance component of an image is an intra BC prediction mode, encoding information indicating a prediction mode of a color component of the image by using, as a context, that the prediction mode of the luminance component is the intra BC prediction mode, wherein in a case where it is used as the context that the prediction mode of the luminance component is the intra BC prediction mode, the encoding section encodes the information indicating the prediction mode of the color component in such a way that in a case where the prediction mode of the color component is the intra BC prediction mode, a compression rate becomes high, and wherein the encoding section is implemented via at least one processor.

2. The image processing apparatus according to claim 1, wherein a configuration is made in such a way that the prediction mode of the color component is an inter prediction mode, an intra prediction mode, an intra BC prediction mode, an LMchroma prediction mode, or a CrossColor prediction mode.

3. The image processing apparatus according to claim 1, wherein a configuration is made in such a way that the information indicating the prediction mode of the color component is information indicating whether or not the prediction mode of the color component is identical to the prediction mode of the luminance component.

4. An image processing apparatus, comprising:

an encoding section, in a case where a prediction mode of a luminance component of an image is an intra BC prediction mode, encoding information indicating a prediction mode of a color component of the image by using, as a context, that the prediction mode of the luminance component is the intra BC prediction mode, wherein a configuration is made in such a way that in a case where the intra BC prediction mode of the luminance component is valid, the encoding section encodes information indicating whether or not the intra BC prediction mode of the color component is valid, and wherein the encoding section is implemented via at least one processor.

5. The image processing apparatus according to claim 1, further comprising:

a generation section, in a case where the prediction mode of each of the luminance component and the color component is the intra BC prediction mode, generating motion vector information indicating a motion vector used in the prediction processing of the intra BC prediction mode of the color component based on a motion vector used in the prediction processing of the intra BC prediction mode of the luminance component.

6. The image processing apparatus according to claim 5, wherein a configuration is made in such a way that the motion vector information is information indicating that the motion vector used in the prediction processing of the intra BC prediction mode of the color component is identical to the motion vector used in the prediction processing of the intra BC prediction mode of the luminance component.

7. The image processing apparatus according to claim 5, wherein a configuration is made in such a way that the motion vector information is a difference between the motion vector used in the prediction processing of the intra BC prediction mode of the color component and the motion vector used in the prediction processing of the intra BC prediction mode of the luminance component.

8. An image processing method executed by an image processing apparatus, the method comprising:

encoding, in a case where a prediction mode of a luminance component of an image is an intra BC prediction mode, information indicating a prediction mode of a color component of the image by using, as a context, that the prediction mode of the luminance component is the intra BC prediction mode, wherein in a case where it is used as the context that the prediction mode of the luminance component is the intra BC prediction mode, the information indicating the prediction mode of the color component is encoded in such a way that in a case where the prediction mode of the color component is the intra BC prediction mode, a compression rate becomes high.

9. An image processing apparatus, comprising:

a decoding section, in a case where a prediction mode of a luminance component of an image is an intra BC prediction mode, decoding information indicating a prediction mode of a color component of the image by using, as a context, that the prediction mode of the luminance component is the intra BC prediction mode, wherein a configuration is made in such a way that in a case where it is used as the context that the prediction mode of the luminance component is the intra BC prediction mode, the decoding section decodes information indicating the prediction mode of the color component which is encoded such that in a case where the prediction mode of the color component is the intra BC prediction mode, a compression rate becomes high, and wherein the decoding section is implemented via at least one processor.

10. The image processing apparatus according to claim 9, wherein a configuration is made in such a way that the prediction mode of the color component is an inter prediction mode, an intra prediction mode, an intra BC prediction mode, an LMchroma prediction mode, or a CrossColor prediction mode.

11. The image processing apparatus according to claim 9, wherein a configuration is made in such a way that the information indicating the prediction mode of the color component is information indicating whether or not the prediction mode of the color component is identical to the prediction mode of the luminance component.

12. An image processing apparatus, comprising:

a decoding section, in a case where a prediction mode of a luminance component of an image is an intra BC prediction mode, decoding information indicating a prediction mode of a color component of the image by using, as a context, that the prediction mode of the luminance component is the intra BC prediction mode, wherein a configuration is made in such a way that in a case where the intra BC prediction mode of the luminance component is valid, the decoding section decodes information indicating whether or not the intra BC prediction mode of the color component is valid, and wherein the decoding section is implemented via at least one processor.

13. The image processing apparatus according to claim 9, further comprising:

an acquisition section, in a case where the prediction mode of each of the luminance component and the color component is the intra BC prediction mode, acquiring motion vector information indicating a motion vector used in the prediction processing of the intra BC prediction mode of the color component, the motion vector information being generated based on the motion vector used in the prediction processing of the intra BC prediction mode of the luminance component.

14. The image processing apparatus according to claim 13, wherein
a configuration is made in such a way that the motion vector information is information indicating that the motion vector used in the prediction processing of the intra BC prediction mode of the color component is identical to the motion vector used in the prediction processing of the intra BC prediction mode of the luminance component, and
the acquisition section sets the motion vector used in the prediction processing of the intra BC prediction mode of the luminance component as the motion vector used in the prediction processing of the intra BC prediction mode of the color component based on the motion vector information.

15. The image processing apparatus according to claim 13, wherein
a configuration is made in such a way that the motion vector information is a difference between the motion vector used in the prediction processing of the intra BC prediction mode of the color component and the motion vector used in the prediction processing of the intra BC prediction mode of the luminance component, and
the acquisition section sets an addition value of the difference and the motion vector used in the prediction processing of the intra BC prediction mode of the luminance component as the motion vector used in the prediction processing of the intra BC prediction mode of the color component based on the motion vector information.

16. An image processing method executed by an image processing apparatus, comprising:
a decoding step of in a case where a prediction mode of a luminance component of an image is an intra BC prediction mode, decoding information indicating a prediction mode of a color component of the image by using, as a context, that the prediction mode of the luminance component is the intra BC prediction mode,
wherein a configuration is made in such a way that in a case where it is used as the context that the prediction mode of the luminance component is the intra BC prediction mode, the information indicating the prediction mode of the color component which is encoded is decoded such that in a case where the prediction mode of the color component is the intra BC prediction mode, a compression rate becomes high.

* * * * *